US009658491B2

(12) United States Patent
Moriwaki et al.

(10) Patent No.: US 9,658,491 B2
(45) Date of Patent: May 23, 2017

(54) OPTICAL APPARATUS AND DISPLAY APPARATUS PROVIDED WITH SAME

(71) Applicant: Sharp Kabushiki Kaisha, Osaka-shi, Osaka (JP)

(72) Inventors: Hiroyuki Moriwaki, Osaka (JP); Kazutaka Hanaoka, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 0 days.

(21) Appl. No.: 14/785,699

(22) PCT Filed: Feb. 27, 2014

(86) PCT No.: PCT/JP2014/054897
§ 371 (c)(1),
(2) Date: Oct. 20, 2015

(87) PCT Pub. No.: WO2014/174896
PCT Pub. Date: Oct. 30, 2014

(65) Prior Publication Data
US 2016/0085096 A1   Mar. 24, 2016

(30) Foreign Application Priority Data

Apr. 24, 2013  (JP) .................................. 2013-091363

(51) Int. Cl.
*G02F 1/1337*   (2006.01)
*G02F 1/1343*   (2006.01)
(Continued)

(52) U.S. Cl.
CPC .......... *G02F 1/1337* (2013.01); *G02F 1/1368* (2013.01); *G02F 1/133502* (2013.01);
(Continued)

(58) Field of Classification Search
CPC ................................................ G02F 1/134363
See application file for complete search history.

(56) References Cited

U.S. PATENT DOCUMENTS 6,429,914 B1 *  8/2002  Kubota ................. G02F 1/1334
349/141
6,665,042 B1   12/2003  Marshall et al.
(Continued)

FOREIGN PATENT DOCUMENTS

| JP | 2007-525580 A | 9/2007 |
| JP | 2009-282132 A | 12/2009 |
| JP | 2012-134475 A | 7/2012 |

OTHER PUBLICATIONS

Translation of 2009-282132 Dec. 2009.*
(Continued)

*Primary Examiner* — Phu Vu
(74) *Attorney, Agent, or Firm* — Keating & Bennett, LLP

(57) ABSTRACT

An optical device (100) includes a first substrate (10) and a second substrate (20), and an optical layer (30) interposed therebetween. The first substrate includes a first electrode (11) and a second electrode (12), to which respectively different potentials can be applied. The optical layer (30) contains a medium (31P) and anisotropically-shaped particles (32) whose alignment direction changes in accordance with the direction of an electric field applied to the optical layer. The medium is a liquid crystal material. When no electric field is applied to the optical layer, the anisotropically-shaped particles are aligned substantially vertically with respect to the substrate plane.

10 Claims, 42 Drawing Sheets

(51) Int. Cl.
*G02F 1/1335* (2006.01)
*G02F 1/1368* (2006.01)
*G02F 1/17* (2006.01)

(52) U.S. Cl.
CPC .. *G02F 1/133553* (2013.01); *G02F 1/134363* (2013.01); *G02F 1/172* (2013.01); *G02F 2001/133742* (2013.01)

(56) References Cited

U.S. PATENT DOCUMENTS

2007/0141275 A1 6/2007 Hikmet
2012/0138922 A1 6/2012 Yamazaki et al.

OTHER PUBLICATIONS

Official Communication issued in International Patent Application No. PCT/JP2014/054897, mailed on May 13, 2014.
Cox et al., "Modeling the Effects of Microencapsulation on the Electro-Optic Behavior of Polymer Cholesteric Liquid Crystal Flakes", LLE Review, University of Rochester Laboratory for Laser Energetics, vol. 118, Jan.-Mar. 2009, pp. 86-100.

* cited by examiner

FIG.5
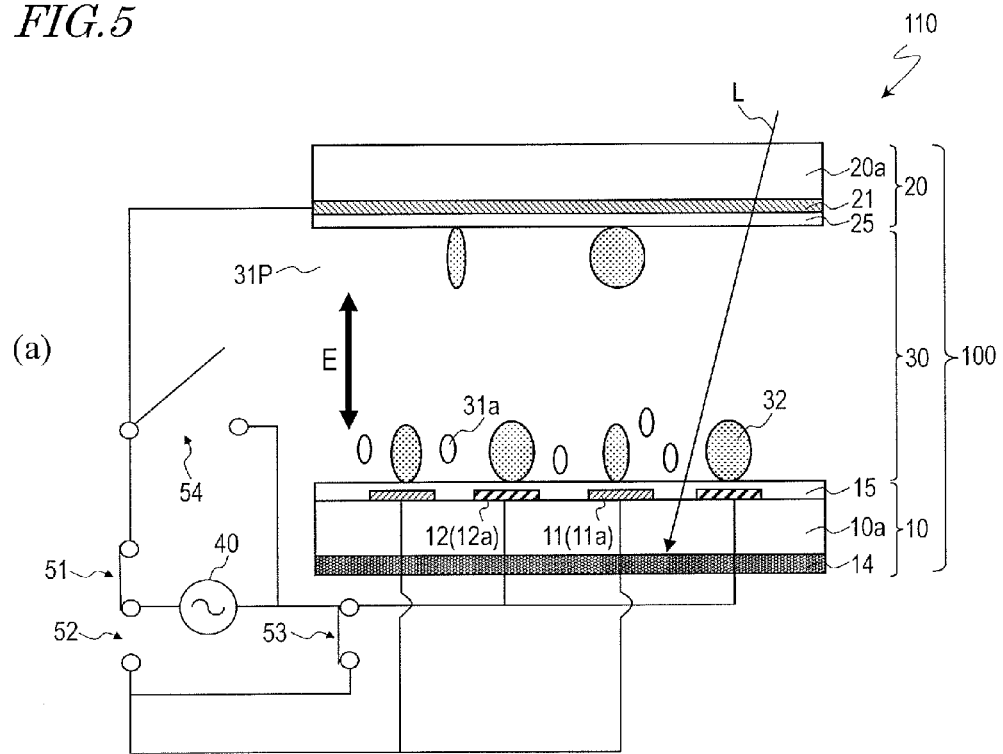
(a)
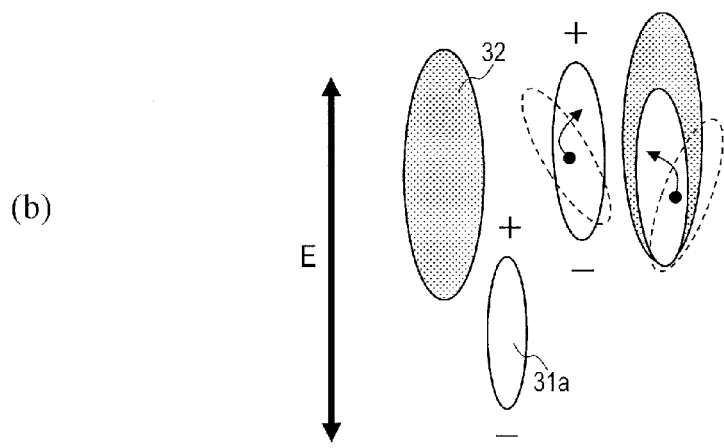
(b)

FIG. 8
(a) 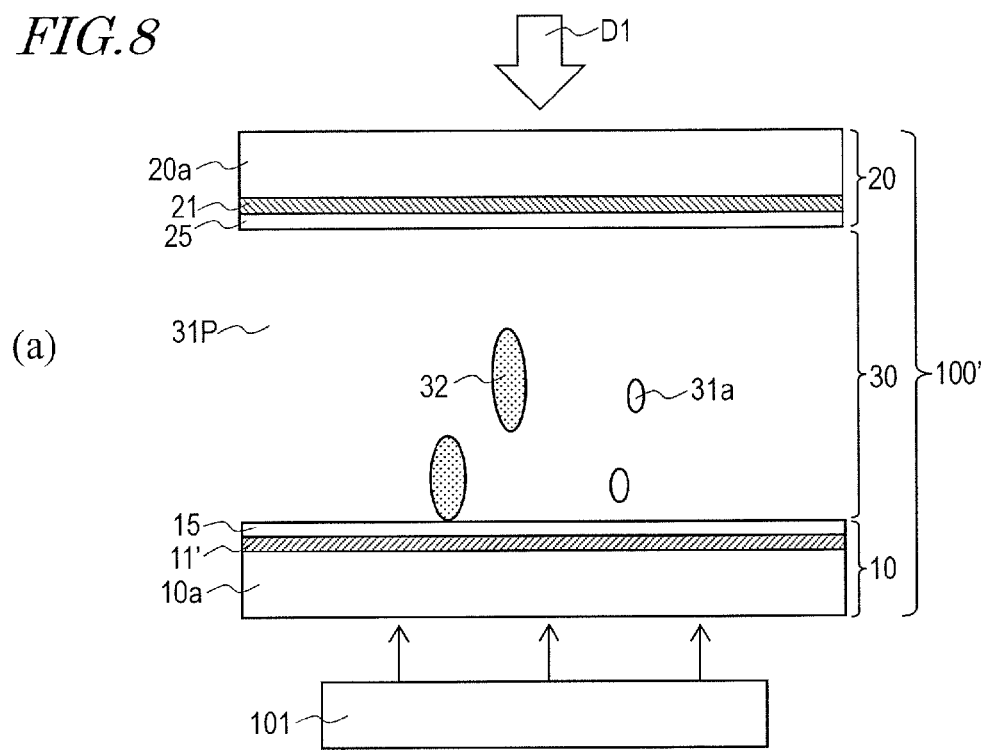
(b) 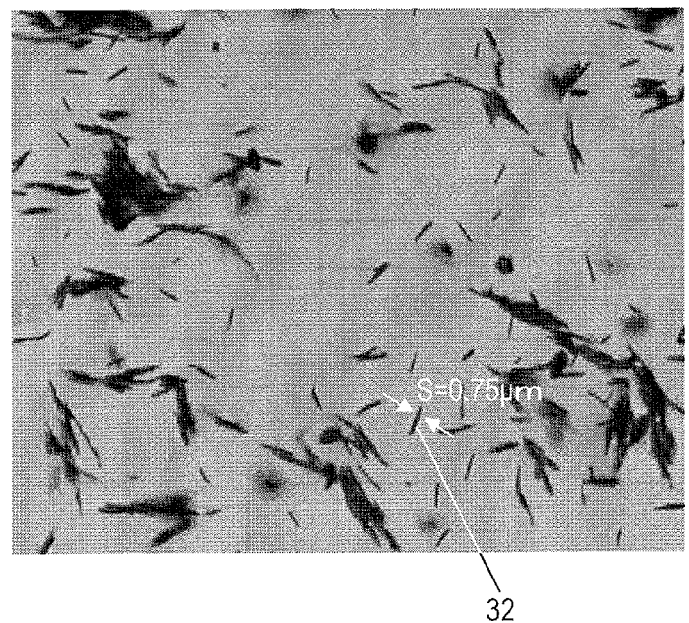

FIG.14
(a)
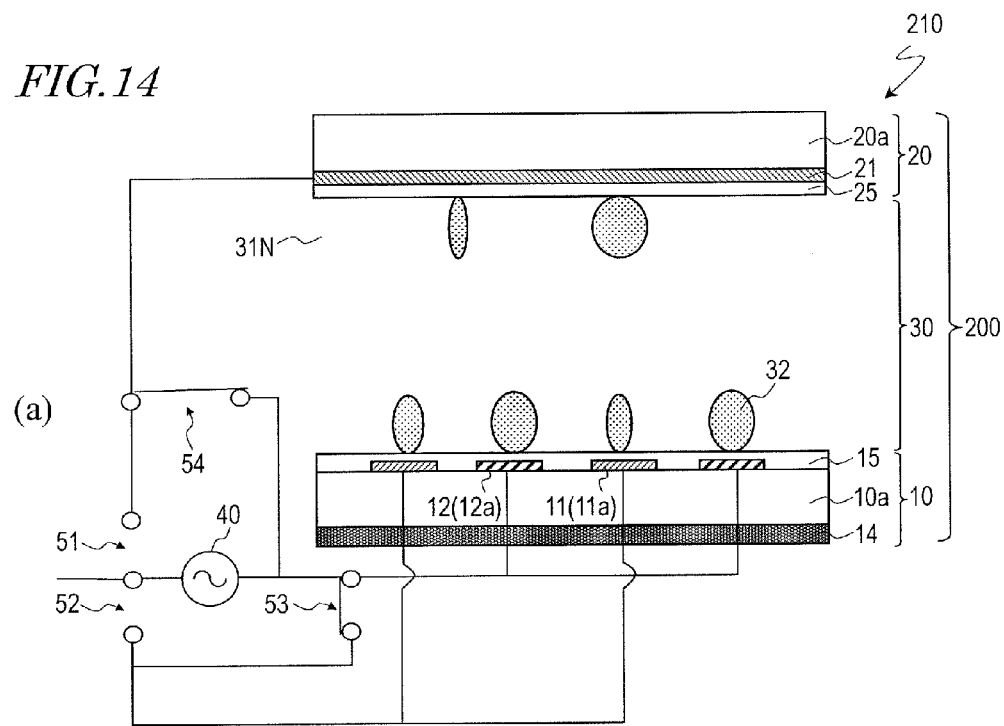
(b)
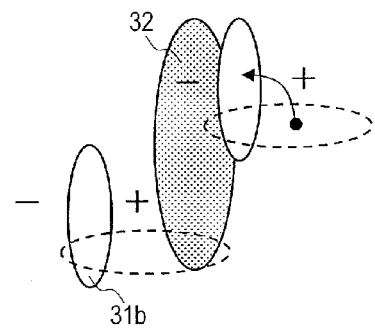

FIG.15
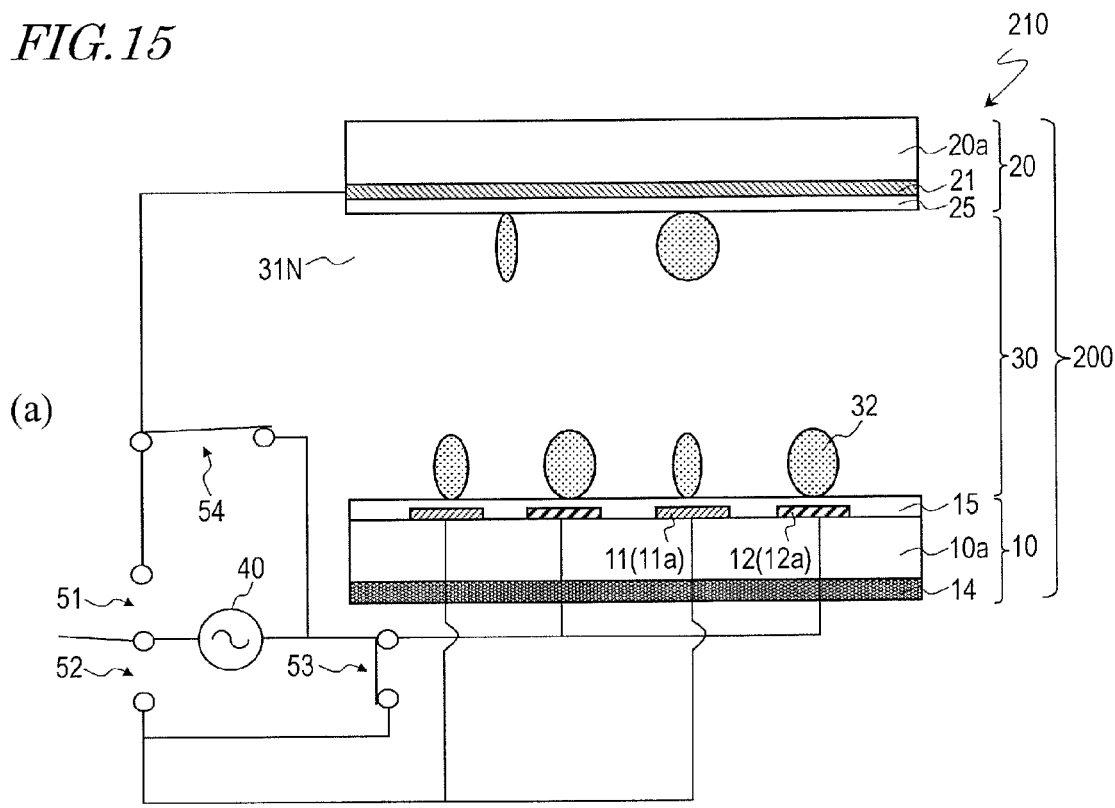
(a)
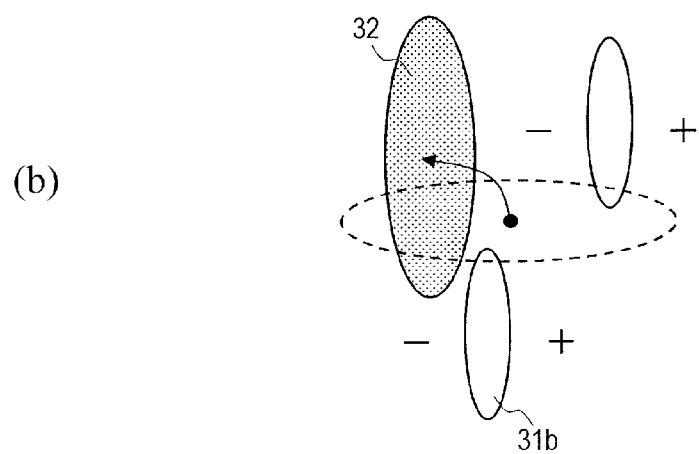
(b)

FIG.25
(a) 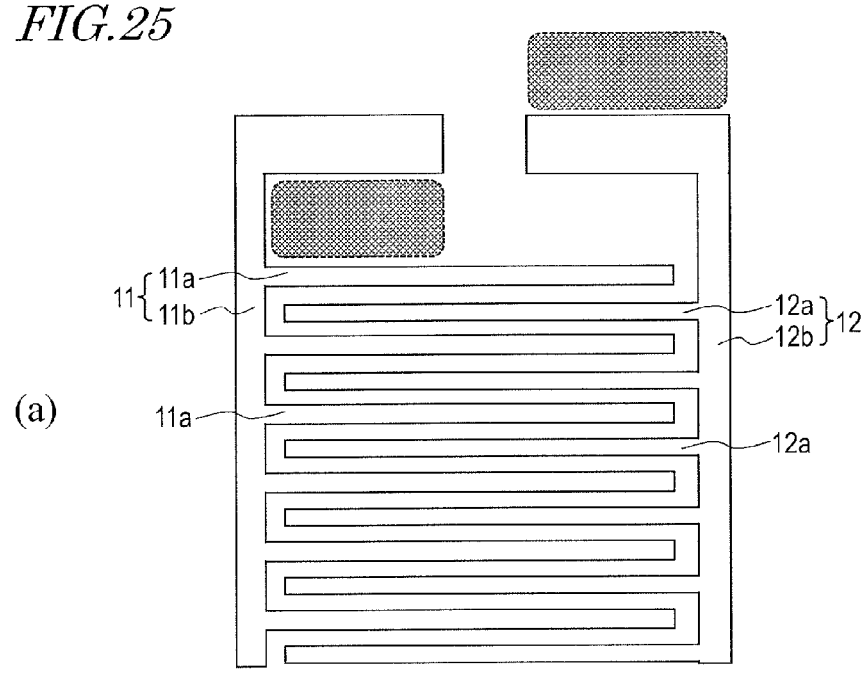
(b) 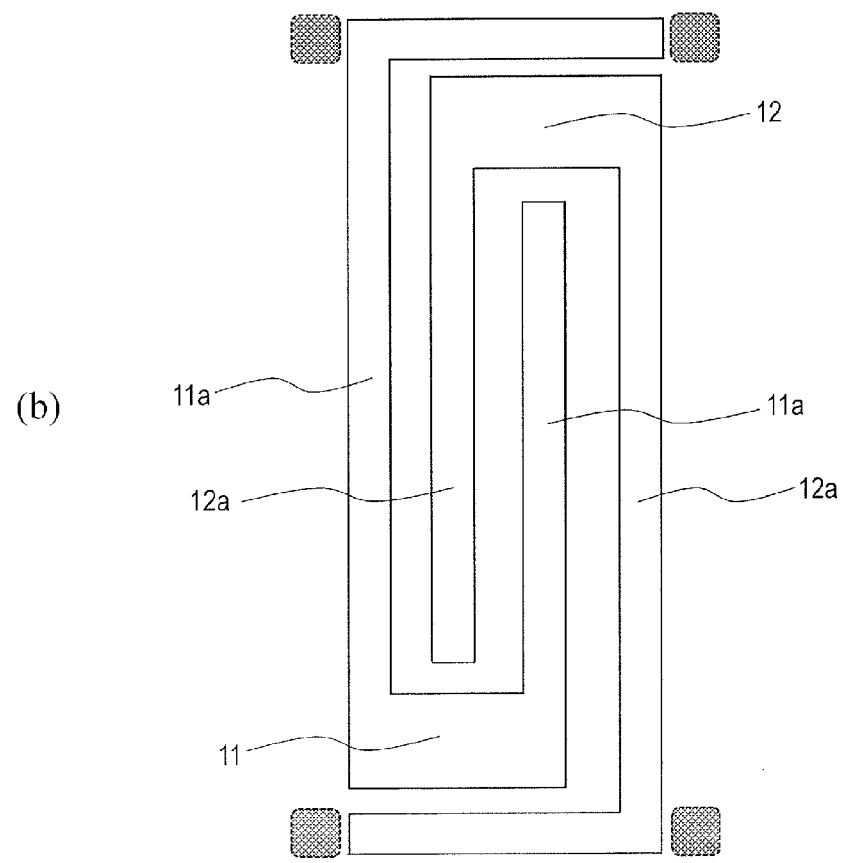

OPTICAL APPARATUS AND DISPLAY APPARATUS PROVIDED WITH SAME

TECHNICAL FIELD

The present invention relates to an optical device, and more particularly to an optical device including an optical layer which contains anisotropically-shaped particles. Moreover, the present invention relates to a display device including such an optical device.

BACKGROUND ART

An optical device which controls the transmittance (or reflectance) of incident light needs a high contrast ratio and a high efficiency of light utilization.

One well-known optical device for controlling transmittance of light with voltage application is the liquid crystal panel. A liquid crystal panel includes a pair of substrates and a liquid crystal layer which is provided between these substrates. In a liquid crystal panel, liquid crystal molecules within the liquid crystal layer undergo changes in their alignment depending on the level of voltage being applied across the liquid crystal layer, which results in changes in the transmittance of light entering the liquid crystal panel. Liquid crystal panels have a very high contrast ratio, and therefore are widely used in display devices.

However, many liquid crystal panels are of the type that employs polarizers; therefore, half or more of the light which is utilized for displaying is absorbed at the polarizers. This results in a low efficiency of light utilization. Accordingly, development of optical devices which do not require polarizers has been under way in the recent years.

Non-Patent Document 1 proposes a display cell which does not require polarizers. The display cell disclosed in Non-Patent Document 1 has a construction where a host fluid (medium) and polymer (resin-coated) flakes dispersed within the medium are interposed between a pair of electrodes. By applying an electric field between the pair of electrodes, the alignment directions of the polymer flakes are changed, thereby altering the optical characteristics (light reflectance) of the display cell. As a specific example of the medium, Non-Patent Document 1 discloses propylene carbonate and epoxy-terminated polydimethylsiloxane (DMS-E09).

Patent Document 1 discloses an optical device including a suspension layer which contains polymer flakes. In this optical device, the polymer flakes can be rotated with application of an electric field to the suspension layer, whereby the optical characteristics of the suspension layer are altered.

The display cell of Non-Patent Document 1 and the optical device of Patent Document 1 mentioned above do not require polarizers, and therefore can attain a higher efficiency of light utilization than that of a liquid crystal panel.

CITATION LIST

Patent Literature

[Patent Document 1] specification of U.S. Pat. No. 6,665,042

Non-Patent Literature

[Non-Patent Document 1] G. P. Cox, and five others, "Modeling the Effects of Microencapsulation on the Electro-Optic Behavior of Polymer Cholesteric Liquid Crystal Flakes", LLE Review, UNIVERSITY OF ROCHESTER LABORATORY FOR LASER ENERGETICS, January-March 2009, volume 118, p. 86-99

SUMMARY OF INVENTION

Technical Problem

Currently, active matrix driving is adopted as a driving method for liquid crystal panels. In a liquid crystal panel under active matrix driving, a thin film transistor (TFT) is provided for each pixel. A write to a given pixel occurs as that pixel is scanned and the TFT turns ON; thereafter, the TFT is kept OFF until that pixel is scanned the next time. Therefore, until the next write, the voltage applied to the liquid crystal layer is retained (i.e., the electric charge is retained in the pixel capacitor), whereby the alignment state of liquid crystal molecules in the liquid crystal layer is maintained.

In the display cell proposed in Non-Patent Document 1, it is difficult to perform active matrix driving. For example, in the case where propylene carbonate or DMS-E09 is used as the medium, these have a resistivity which is several digits lower than the resistivity of a commonly-used liquid crystal material (the resistivity of propylene carbonate is about $1\times 10$ Ω·cm, and the resistivity of DMS-E09 is about $1.1\times 10^7$ Ω·cm, as compared to the resistivity of commonly-used liquid crystal material being on the order of $1\times 10^{13}$ Ω·cm). Therefore, in a state where the TFT is OFF after a write to the pixel, the voltage retention rate significantly lowers due to an off-leak via the medium. This causes the polymer flakes, which would otherwise be aligned in the vertical direction, to be inclined toward the horizontal direction (i.e., a parallel direction to the substrate plane) due to their own weight. As a result, the pixel luminance changes, thereby making it difficult to perform active matrix driving.

Moreover, in the absence of applied voltage, polymer flakes cannot maintain their vertically aligned state, and will turn toward the horizontal direction due to their own weight. Therefore, the display cell of Non-Patent Document 1 does not have so-called memory ability, making it difficult to realize low power consumption. Furthermore, if the display cell becomes inclined, the polymer flakes will migrate within the cell due to their own weight, thus precipitating at the bottom side of the display cell.

On the other hand, Patent Document 1 describes an example (Example 6) where a nematic liquid crystal material is used as the medium of a suspension layer. In this Example, an alignment film (polyimide coating) is formed on each of a pair of substrates that each include a transparent electrode. The polymer flakes are aligned in parallel to the substrate plane when no electric field is generated in the suspension layer. On the other hand, when a longitudinal field is generated in the suspension layer, the polymer flakes will try to become aligned perpendicularly to the substrate plane.

The above Example of Patent Document 1 is considered to suppress lowering of the voltage holding ratio due to an off-leak via the medium. However, according to this Example, in actuality, the polymer flakes will stick to the surface of the alignment film, which is associated with a strong polarity; therefore, even if a longitudinal field is generated in the suspension layer, the polymer flakes near the alignment film will not be detached from the alignment film. As a result, most polymer flakes will remain aligned in parallel to the substrate plane. This makes it impossible to obtain a sufficiently large difference in light transmittance between presence of an applied electric field and absence of an applied electric field; thus, a sufficiently high contrast ratio cannot be realized. Moreover, in the optical device of Patent Document 1, the polymer flakes are transitioned from a state of being parallel to the substrate plane to a state of being perpendicular (or, from a state of being perpendicular to a state of being parallel) with the application of an electric field; however, the opposite transition occurs by way of thermal dispersion or gravity. This too is a problem because a sufficient response speed cannot be obtained, making difficult any application to a display device.

The present invention has been made in view of the above problems, and an objective thereof is to provide: an optical device which is capable of active matrix driving, excels in low power consumption characteristics, and realizes a high efficiency of light utilization and a high contrast ratio; and a display device including the same.

Solution to Problem

An optical device according to an embodiment of the present invention is an optical device comprising: a first substrate and a second substrate opposing each other; and an optical layer interposed between the first substrate and the second substrate, the first substrate including a first electrode and a second electrode, the first electrode and second electrode being capable of having respectively different potentials applied thereto, the optical layer containing a medium and anisotropically-shaped particles dispersed in the medium, the anisotropically-shaped particles having shape anisotropy, wherein, an alignment direction of the anisotropically-shaped particles changes in accordance with a direction of an electric field applied to the optical layer; the medium is a liquid crystal material; and when no electric field is applied to the optical layer, the anisotropically-shaped particles are aligned substantially vertically with respect to the substrate plane.

In one embodiment, at least one of the first substrate and the second substrate includes a vertical alignment film provided on the optical layer side.

In one embodiment, when a lateral field is generated in the optical layer by the first electrode and the second electrode, the anisotropically-shaped particles are aligned substantially in parallel to the substrate plane.

In one embodiment, the liquid crystal material has positive dielectric anisotropy.

In one embodiment, the liquid crystal material has negative dielectric anisotropy.

In one embodiment, the second substrate includes a third electrode opposing the first electrode and the second electrode.

In one embodiment, when a longitudinal field is generated in the optical layer by the first electrode and second electrode and the third electrode, the anisotropically-shaped particles are aligned substantially vertically with respect to the substrate plane.

In one embodiment, the second substrate includes no electrode opposing the first electrode or the second electrode.

In one embodiment, the first substrate is an active matrix substrate including a thin film transistor.

In one embodiment, the first substrate further includes a gate line and a source line which are electrically connected to the thin film transistor; and a voltage which is supplied from the source line to the thin film transistor is inverted in polarity with a predetermined cycle.

In one embodiment, the first substrate is an active matrix substrate including a thin film transistor, further including a gate line and a source line which are electrically connected to the thin film transistor; a voltage which is supplied from the source line to the thin film transistor is inverted in polarity with a predetermined cycle; and a voltage which is supplied to the third electrode is inverted in polarity with the predetermined cycle.

In one embodiment, the thin film transistor comprises an oxide semiconductor layer.

In one embodiment, the oxide semiconductor layer is made of an In—Ga—Zn—O-type semiconductor.

A display device according to an embodiment of the present invention comprises an optical device having the above construction.

In one embodiment, the display device having the above construction is capable of displaying in a reflection mode by utilizing light which is incident from the exterior.

In one embodiment, the anisotropically-shaped particles are light reflective; and one of the first substrate and the second substrate that is located on a rear face side includes an optical absorption layer which absorbs light.

Advantageous Effects of Invention

According to an embodiment of the present invention, there is provided and optical device which is capable of active matrix driving, excels in low power consumption characteristics, and realizes a high efficiency of light utilization and a high contrast ratio, as well as a display device including the same.

BRIEF DESCRIPTION OF DRAWINGS

FIG. 5 (a) is a diagram schematically showing a display device 110 in the case where a longitudinal field is applied to the optical layer 30; and (b) is a diagram showing alignment directions of anisotropically-shaped particles 32 and liquid crystal molecules 31a in that case.

FIG. 8 (a) is a diagram schematically showing a prototyped display panel 100'; and (b) is an optical micrograph where the optical layer 30 of the display panel 100' in the absence of applied voltage is observed from the normal direction of the substrate plane.

FIGS. 14 (a) and (b) are diagrams showing alignment states of anisotropically-shaped particles 32 and liquid crystal molecules 31b when voltage is reset after a longitudinal field is applied to the optical layer 30.

FIGS. 15 (a) and (b) are diagrams showing alignment states of anisotropically-shaped particles 32 and liquid crystal molecules 31b when voltage is reset after a lateral field is applied to the optical layer 30.

FIG. 25 (a) is a diagram showing regions where a lateral field cannot be applied in the case where interdigitated electrodes are used as the first electrode 11 and the second electrode 12; and (b) is a diagram showing regions where a lateral field cannot be applied in the case where spiral electrodes are used as the first electrode 11 and the second electrode 12.

DESCRIPTION OF EMBODIMENTS

Hereinafter, embodiments of the present invention will be described with reference to the drawings. Note that the present invention is not limited to the following embodiments.

Embodiment 1

Figure 1:
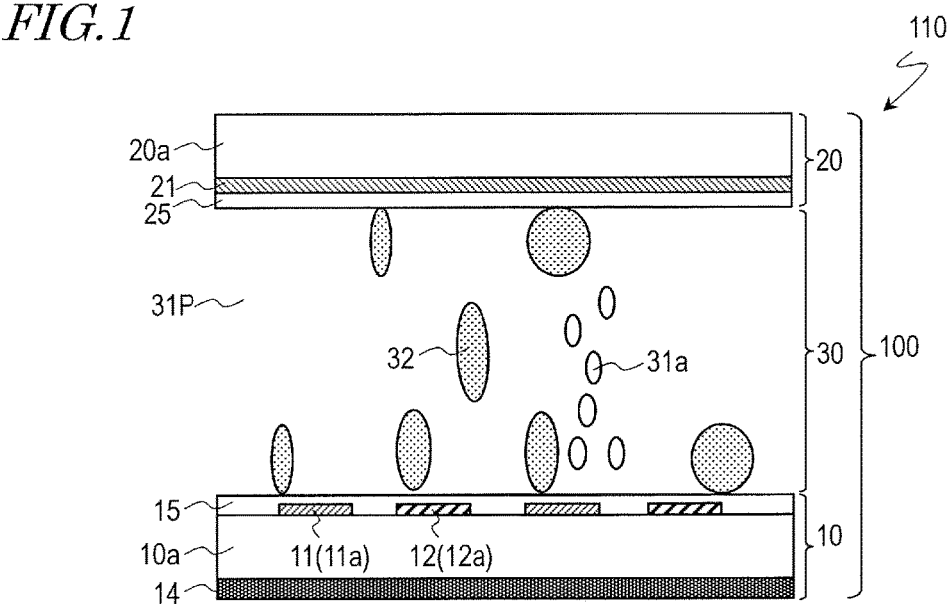
FIG. 1 A cross-sectional view schematically showing a display device 110 according to an embodiment of the present invention.

FIG. 1 shows a display device 110 according to the present embodiment. FIG. 1 is a cross-sectional view schematically showing the display device 110.

The display device 110 is a reflection type display device that can perform displaying in a reflection mode by utilizing light which is incident from the exterior (ambient light). As shown in FIG. 1, the display device 110 includes a display panel (optical device) 100, and has a plurality of pixels in a matrix array.

The display panel 100 includes a first substrate 10 and a second substrate 20 opposing each other, and an optical layer (display medium layer) 30 which is provided between the first substrate 10 and the second substrate 20. Between the first substrate 10 and the second substrate 20, the first substrate 10 that is relatively located on the rear face side may hereinafter be referred to as the "rear substrate", whereas the second substrate 20 that is relatively located on the front face side (i.e., the viewer's side) may hereinafter be referred to as the "front substrate".

Figure 2:
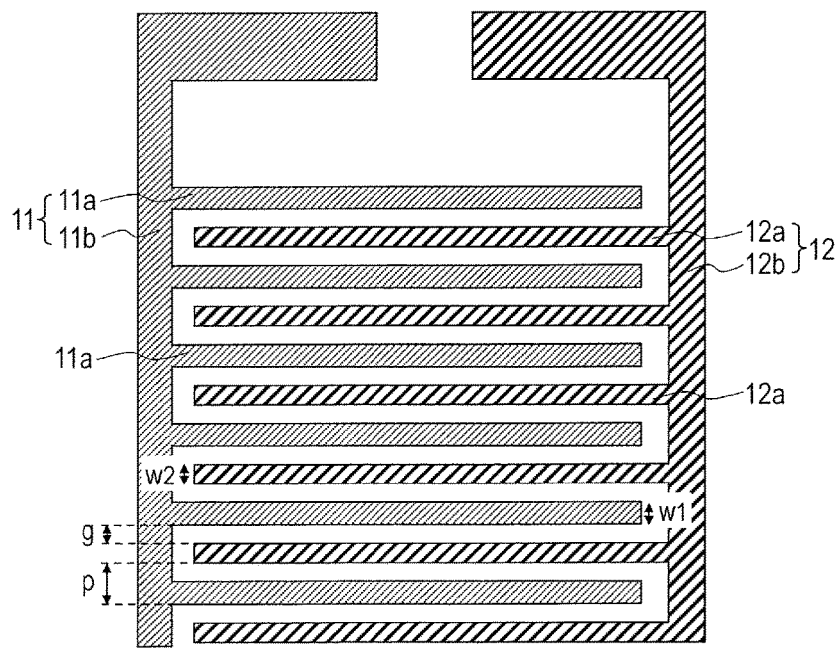
FIG. 2 A plan view schematically showing a first electrode 11 and a second electrode 12 of the display device 110.

The first substrate (rear substrate) 10 includes first electrodes 11 and second electrodes 12, to which respectively different potentials may be supplied. A first electrode 11 and a second electrode 12 are provided for each of the plurality of pixels. Having a plurality of branches 11a and 12a, each first electrode 11 and each second electrode 12 constitute interdigitated electrodes. FIG. 2 shows a planar structure of a first electrode 11 and a second electrode 12.

As shown in FIG. 2, each first electrode 11 includes a stem 11b and a plurality of branches 11a extending from the stem 11b. Similarly, each second electrode 12 includes a stem 12b and a plurality of branches 12a extending from the stem 12b. The first electrode 11 and the second electrode 12 are disposed so that their respective branches 11a and 12a mesh with one another via a predetermined interspace (which hereinafter may be referred to as the "interelectrode distance") g.

There is no particular limitation as to the interelectrode distance g. The interelectrode distance g may be e.g. 10 μm. There is also no particular limitation as to the width $w_1$ of each branch 11a of the first electrode 11 and the width $w_2$ of each branch 12a of the second electrode 12. The width $w_1$ of each branch 11a of the first electrode 11 and the width $w_2$ of each branch 12a of the second electrode 12 may be equal or different. The width $w_1$ of each branch 11a of the first electrode 11 and the width $w_2$ of each branch 12a of the second electrode 12 is e.g. 10 μm.

Moreover, the first substrate 10 is an active matrix substrate, including a thin film transistor (TFT) provided for each pixel and various wiring lines (e.g., gate lines and source lines electrically connected to the TFTs)(neither of them is shown here). The first electrode 11 and the second electrode 12 are each electrically connected a corresponding TFT so as to receive a voltage corresponding to a source signal via the TFT.

The first substrate 10 further includes an optical absorption layer 14 that absorbs light. There is no particular limitation as to the material of the optical absorption layer 14. As the material of the optical absorption layer 14, pigments can be used, for example, which are used as the material of a black matrix, etc., that is included in the color filters of a liquid crystal display device or the like. Alternatively, as the optical absorption layer 14, a low-reflection chromium film of double-layer structure (i.e., having a structure in which a chromium layer and a chromium oxide layer are stacked) can also be used.

The component elements of the first substrate 10 (i.e., the aforementioned first electrodes 11, second electrodes 12, optical absorption layer 14, and so on) are supported by a substrate 10a which is electrically insulative (e.g., a glass substrate). Although FIGS. 1(a) and (b) illustrate the optical absorption layer 14 as being provided at the rear face side of the substrate 10a, the optical absorption layer 14 may alternatively be provided on the optical layer 30 side of the substrate 10a.

The second substrate (front substrate) 20 includes a third electrode(s) 21 opposing the first electrodes 11 and the second electrodes 12. The third electrode(s) 21 may be a so-called spread electrode that does not have any slits or bevels formed therein. It is not necessary that an electrically independent third electrode 21 be provided for each pixel, but a single continuous electrically conductive film may commonly be provided for all of the pixels (i.e., a common electrode). In the case where the third electrode 21 is a spread electrode that is common to all pixels, patterning by a photolithography technique is not needed, so that the production cost can be reduced. In the case of conducting multicolor displaying, the second substrate 20 further includes color filters (not shown).

The component elements of the second substrate 20 (the aforementioned third electrode(s) 21 and the like) are supported on an electrically insulative substrate (e.g., glass substrate) 20a.

The first electrodes 11, the second electrodes 12, and the third electrode(s) 21 are each made of a transparent electrically conductive material such as ITO (indium tin oxide) or IZO (indium zinc oxide). There is no particular limitation as to the method of depositing the electrically conductive films to become these electrodes; various known methods, such as a sputtering technique, a vacuum vapor deposition technique, and a plasma CVD technique, can be used. Also, there is no particular limitation as to the method of patterning electrically conductive films to form the first electrodes 11 and the second electrodes 12 which are interdigitated electrodes; known patterning methods such as photolithography can be used. The thicknesses of the first electrodes 11, the second electrodes 12, and the third electrode(s) 21 are e.g. 100 nm.

The optical layer (display medium layer) 30 includes: a medium 31P in liquid form; and particles having shape anisotropy (hereinafter referred to as "anisotropically-shaped particles") 32, which are dispersed in the medium 31P. The aforementioned first substrate 10 and second substrate 20 are attached together via a sealing portion (not shown here) which is formed around the displaying region, such that the medium 31P and the anisotropically-shaped particles 32 are contained within a region that is surrounded by the sealing portion (i.e., the displaying region). There is no particular limitation as to the thickness (cell gap) of the optical layer 30. The optical layer 30 may have a thickness of e.g. 50 μm to 100 μm.

The anisotropically-shaped particles 32 are light reflective. The anisotropically-shaped particles 32 are in flake form (thin-strip shaped), for example.

The anisotropically-shaped particles 32 change their alignment directions in accordance with the direction of an electric field which is applied to the optical layer 30. In other words, the anisotropically-shaped particles 32 take different alignment directions depending on whether a longitudinal field is generated in the optical layer 30 by a first electrode 11 and a second electrode 12 and the third electrode 21, or a lateral field is generated in the optical layer 30 by a first electrode 11 and a second electrode 12. Since the anisotropically-shaped particles 32 have shape anisotropy, if the alignment direction of the anisotropically-shaped particles 32 changes, the projected area of each anisotropically-shaped particle 32 onto the substrate plane (the substrate plane of the first substrate 10) also changes, whereby the optical characteristics (i.e., reflectance herein) of the optical layer 30 changes accordingly. The display device 110 of the present embodiment takes advantage of this to perform displaying. The reason why the alignment direction of the anisotropically-shaped particles 32 changes in accordance with the direction of an applied field will be described later in detail.

In the display device 110 of the present embodiment, the medium 31P is a liquid crystal material, containing liquid crystal molecules 31a. Herein, the liquid crystal material has positive dielectric anisotropy. That is, the medium 31P is a liquid crystal material of a so-called positive type, such that the dielectric constant $\in_{//}$ of the liquid crystal molecules 31a along the major axis direction is greater than the dielectric constant $\in_{\perp}$ along the minor axis direction.

The first substrate 10 and the second substrate 20 include, respectively, vertical alignment films 15 and 25 provided at the optical layer 30 side. As will be described in detail later, the vertical alignment films 15 and 25 possess an alignment regulating force for aligning the anisotropically-shaped particles 32 substantially vertically with respect to the substrate plane (the substrate plane of the first substrate 10 or the second substrate 20). Moreover, herein, the vertical alignment films 15 and 25 also possess an alignment regulating force for aligning the liquid crystal molecules 31a contained in the medium (liquid crystal material) 31P substantially vertically with respect to substrate plane (the substrate plane of the first substrate 10 or the second substrate 20). Note that it is not necessary for both of the first substrate 10 and the second substrate 20 to have vertical alignment films provided thereon; only one of them (e.g., only the first substrate 10) may have a vertical alignment film provided thereon.

Figure 3:
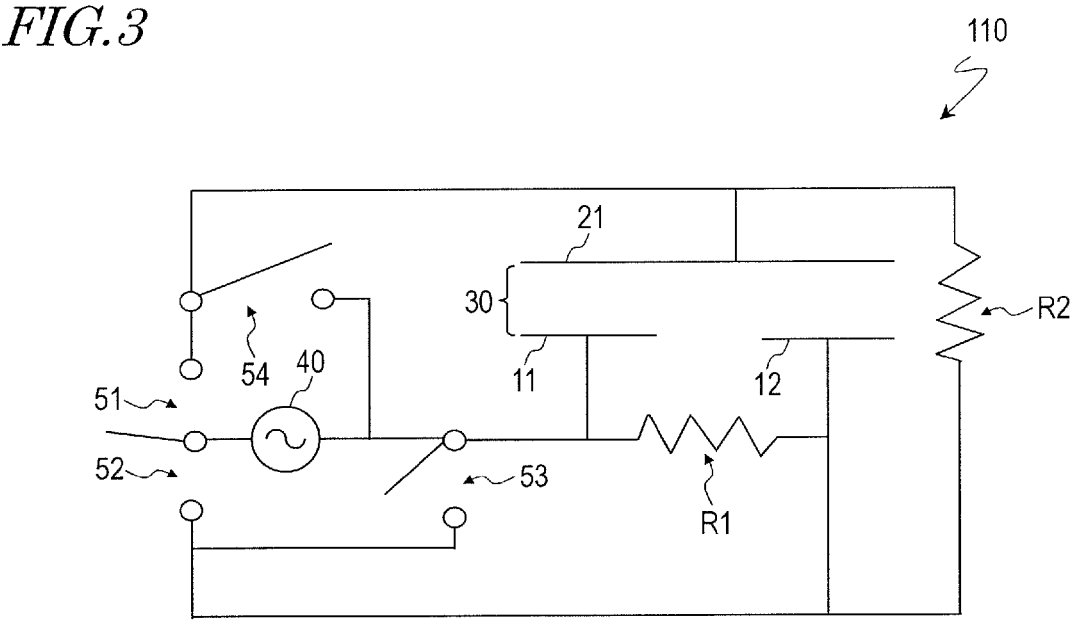
FIG. 3 A diagram showing an equivalent circuit of the display device 110.
Figure 4:
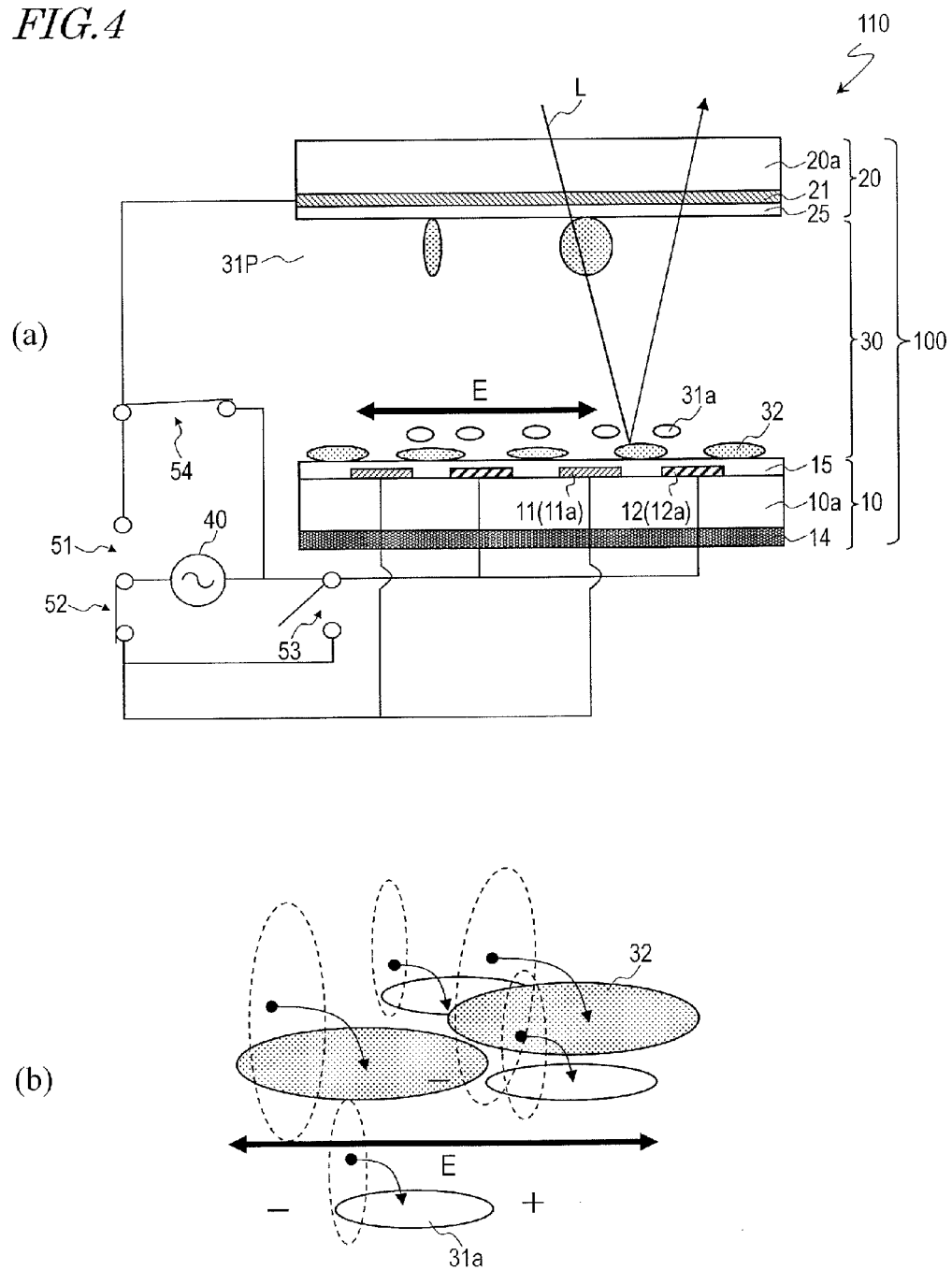
FIG. 4 (a) is a diagram schematically showing the display device 110 when a lateral field is applied to the optical layer 30; and (b) is a diagram showing alignment directions of anisotropically-shaped particles 32 and liquid crystal molecules 31a in that case.

Hereinafter, with reference also to FIG. 3, FIG. 4, and FIG. 5, the reason why the alignment direction of the anisotropically-shaped particles 32 changes in accordance with the direction of an applied field will be described more specifically. FIG. 3 is a diagram showing an equivalent circuit of the display device 110. FIG. 4(a) is a diagram schematically showing the display device 110 when a lateral field is applied to the optical layer 30, and FIG. 4(b) is a diagram showing alignment directions of anisotropically-shaped particles 32 and liquid crystal molecules 31a in that case. FIG. 5(a) is a diagram schematically showing the display device 110 when a longitudinal field is applied to the optical layer 30, and FIG. 5(b) is a diagram showing alignment directions of anisotropically-shaped particles 32 and liquid crystal molecules 31a in that case.

As shown in FIG. 3, the display device 110 further includes a power source 40, a first switch 51, a second switch 52, a third switch 53, and a fourth switch 54. The power source 40 is the sole power source for controlling the electric field to be applied to the optical layer 30. The first switch 51, the second switch 52, the third switch 53, and the fourth switch 54 switch the electrical interconnection between the first electrode 11, second electrode 12 and third electrode 13 and the power source 40. Note that a resistor R1 shown in FIG. 3 represents the resistance within the display panel 100 when a lateral field is applied to the optical layer 30, whereas a resistor R2 shown in FIG. 3 represents the resistance within the display panel 100 when a longitudinal field is applied to the optical layer 30.

When no electric field is applied to the optical layer 30, as shown in FIG. 1, the anisotropically-shaped particles 32 are aligned so that they are (i.e., their longitudinal directions are) substantially perpendicular to the substrate plane of the first substrate 10 (i.e., taking a vertical alignment state) due to the alignment regulating forces of the vertical alignment films 15 and 25. Moreover, the liquid crystal molecules 31a becoming aligned substantially vertically with respect to the substrate plane, due to the alignment regulating forces of the vertical alignment films 15 and 25, acts to assist in the anisotropically-shaped particles 32 taking a vertical alignment state. In the present specification, that "the anisotropically-shaped particles 32 are aligned substantially vertically with respect to the substrate plane" refers to a state where the anisotropically-shaped particles 32 are aligned at angles exhibiting substantially similar optical characteristics to those in a state where they are aligned strictly vertically with respect to the substrate plane: specifically, a state where the anisotropically-shaped particles 32 are aligned at angles of 75° or more with respect to the substrate plane. As will be described later, when voltage is reset after a longitudinal field is applied to the optical layer 30, the anisotropically-shaped particles 32 will also take a vertical alignment state for the same reason.

As shown in FIG. 4(a), when the fourth switch 54 is turned ON, the first switch 51 OFF, the third switch 53 OFF, and the second switch 52 ON, the first electrode 11 becomes connected to one end of the power source 40 while the second electrode 12 and the third electrode 21 become connected to the other end of the power source 40. As a result, a predetermined voltage (e.g., an AC voltage of Vpp=70 V (±35V) with a duty ratio of 50% and a frequency of 60 Hz) is applied between the first electrode 11 and the second electrode 12, whereby a lateral field is generated in the optical layer 30. In FIGS. 4(a) and (b), the direction of the electric field is indicated with arrow E. As can be seen from FIG. 4(a), the direction E of the electric field is substantially parallel to the substrate plane of the first substrate 10 (i.e., substantially perpendicular to the thickness direction of the optical layer 30).

At this time, as shown in FIGS. 4(a) and (b), the anisotropically-shaped particles 32 are aligned so that they are (i.e., their longitudinal directions are) substantially parallel to the substrate plane of the first substrate 10 (i.e., taking a horizontal alignment state). The liquid crystal molecules 31a also are aligned substantially in parallel to the substrate plane of the first substrate 10. In this state, a large part of the incident ambient light L is reflected by the anisotropically-shaped particles 32 in the optical layer 30. That is, the optical layer 30 takes a reflecting state; this state achieves white displaying. Moreover, gray scale displaying also becomes possible by applying a relatively low voltage. Although anisotropically-shaped particles 32 remaining aligned substantially vertically with respect to the substrate plane may exist near the second substrate 20, white displaying (or gray scale displaying) can be performed without problems.

On the other hand, as shown in FIG. 5(a), when the fourth switch 54 is turned OFF, the second switch 52 OFF, the third switch 53 ON, and the first switch 51 ON, the third electrode 21 becomes connected to one end of the power source 40 while the first electrode 11 and the second electrode 12 become connected to the other end of the power source 40. As a result, a predetermined voltage (e.g., an AC voltage of 70 V with a duty ratio of 50% and a frequency of 60 Hz) is applied between the first electrode 11 and second electrode 12 and the third electrode 21, whereby a longitudinal field is generated in the optical layer 30. In FIGS. 5(a) and (b), the direction of the electric field is indicated with arrow E. As can be seen from FIG. 5(a), the direction E of the electric field is substantially perpendicular to the substrate plane of the first substrate 10 (i.e., substantially parallel to the thickness direction of the optical layer 30).

In this case, the anisotropically-shaped particles 32 are aligned so that they are (i.e., their longitudinal directions are) substantially perpendicular to the substrate plane of the first substrate 10 (i.e., taking a vertical alignment state), as shown in FIGS. 5(a) and (b). The liquid crystal molecules 31a also are aligned substantially vertically with respect to the substrate plane of the first substrate 10. In this state, a large part of the incident ambient light L is transmitted through the optical layer 30. That is, the optical layer 30 takes a transparent state. Since the ambient light which is transmitted through the optical layer 30 is absorbed by the optical absorption layer 14, this state achieves black displaying.

Figure 6:
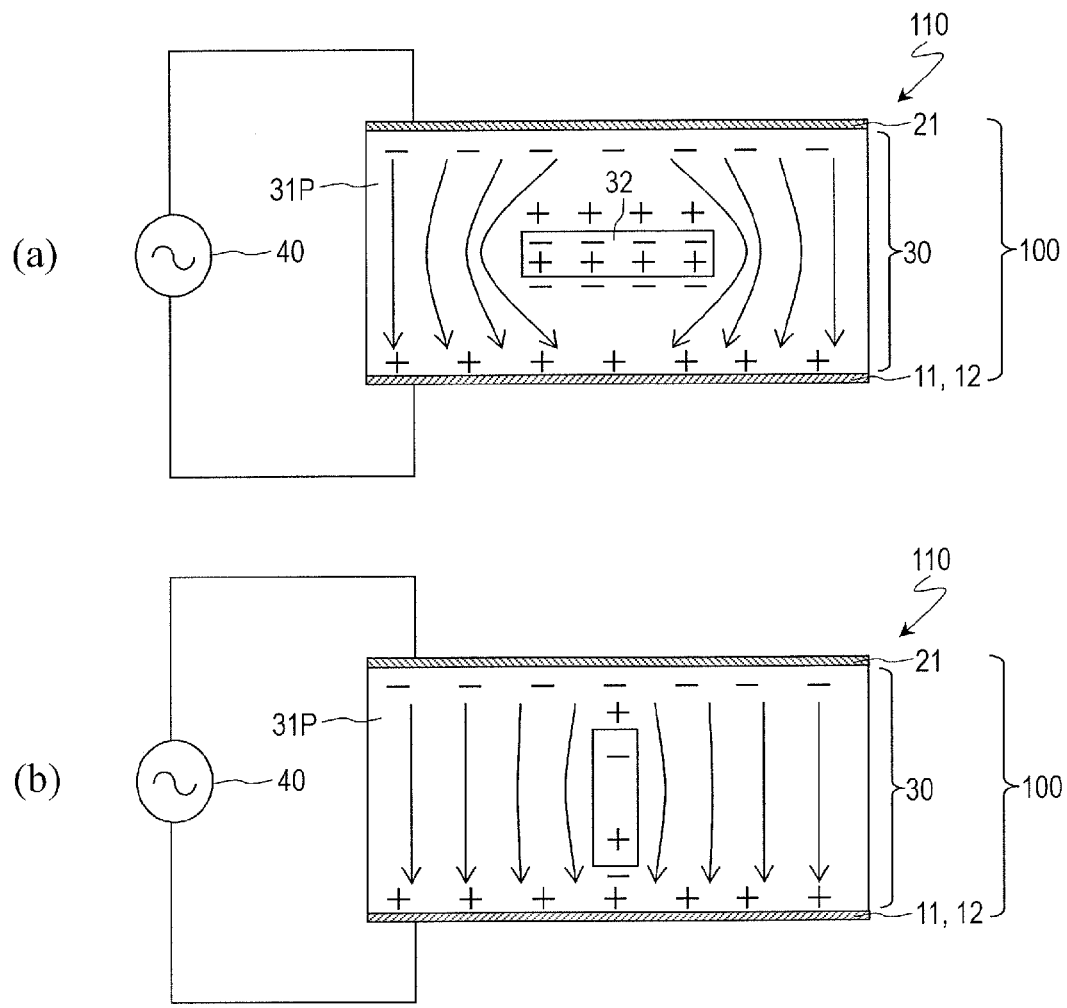
FIG. 6 (a) is a diagram showing how the optical layer 30 may appear immediately after the electric field being applied to the optical layer 30 is changed from a lateral field to a longitudinal field; and (b) is a diagram showing how the optical layer 30 may appear after the lapse of a sufficient time therefrom.

Such changes in the alignment of the anisotropically-shaped particles 32 are ascribable to a dielectrophoretic force due to interaction between an electric field and an electric dipole moment induced thereby. Hereinafter, with reference to FIGS. 6(a) and (b), this will be described more specifically. FIGS. 6(a) and (b) are diagrams showing how the optical layer 30 may appear (in terms of electric charge distribution and electric lines of force) immediately after the electric field being applied to the optical layer 30 is changed from a lateral field to a longitudinal field, and after the lapse of a sufficient time therefrom.

In the case where the dielectric constant of anisotropically-shaped particles 32 is unequal to the dielectric constant of the medium 31P, if the direction of an applied field to the optical layer 30 changes, a large distortion occurs in the electric lines of force, as shown in FIG. 6(a). Therefore, as shown in FIG. 6(b), the anisotropically-shaped particles 32 rotate so as to result in the smallest energy.

Generally speaking, a dielectrophoretic force $F_{dep}$ acting on particles which are dispersed in a medium is expressed by eq. (1) below, where $\in_p$ is the dielectric constant of the particles, E m is the dielectric constant of the medium, a is the radius of the particles, and E is the intensity of the electric field. Note that Re in eq. (1) is an operator for extracting the real part. In the present embodiment, the medium 31P is a liquid crystal material, having dielectric anisotropy. That is, the dielectric constant $\in_{//}$ along the major axis direction of the liquid crystal molecules 31a is unequal to the dielectric constant $\in_\perp$ along their minor axis direction, presumably $\in_m = \in_{//} - \in_\perp = \Delta\in$.

[math. 1]

$$F_{dep} = 2\pi\varepsilon_m \cdot a^3 \cdot \text{Re} \cdot \left(\frac{\varepsilon_p - \varepsilon_m}{\varepsilon_p + 2\varepsilon_m}\right) \cdot \nabla |E|^2 \qquad (1)$$

Moreover, as will be seen from what has already been described, in addition to the aforementioned dielectrophoretic force, assistance from the alignment regulating forces of the vertical alignment films 15 and 25 and the liquid crystal molecules 31a are at work in allowing the anisotropically-shaped particles 32 to assume a vertical alignment state, whereby switching between a vertical alignment operation and a horizontal alignment operation of the anisotropically-shaped particles 32 can suitably occur.

As described above, the display device 110 of the present embodiment performs displaying by switching between a state in which a longitudinal field is generated in the optical layer 30 and a state in which a lateral field is generated in the optical layer 30. The transition from the former state to the latter state, and the transition from the latter state to the former state, are both effected by changing the direction of an applied field, and thus a sufficient response speed can be realized, unlike in the optical device of Patent Document 3. Moreover, the display device 110 does not require polarizers and therefore can achieve a high efficiency of light utilization.

Furthermore, in the display device 110, a liquid crystal material is used as the medium 31P. Generally speaking, a liquid crystal material has a resistivity which is several digits higher than those of the media (propylene carbonate, etc.) which are mentioned as examples in Patent Documents 1 and 2. Therefore, in the display device 110, in a state where the TFT is OFF after a write to a pixel, an off-leak is prevented from occurring via the medium 31P. As a result, a high voltage holding ratio is obtained, and active matrix driving can be suitably performed. Moreover, power consumption can be reduced because of there being little leak current. The power consumption P of the display device 110 is expressed by eq. (2) below, where C is the capacitance of the display panel 100, V is the applied voltage to the optical layer 30, f is the driving frequency, and I is the leak current.

$$P = C \cdot V \cdot f + I \cdot V \qquad (2)$$

The first term on the right-hand side of eq. (2) is what may be called a pixel capacitor term, and the second term is what may be called a leak current term. In other words, the power consumption P can be discussed separately in terms of a pixel capacitor component and a leak current component. When the resistivity of the medium 31P is high, the leak current I will decrease, so that the power consumption P can be reduced, as will also be clear from eq. (2).

Moreover, the alignment films used in the display device 110 are vertical alignment films 15 and 25; that is, when no electric field is applied to the optical layer 30, alignment regulating forces exist that cause the anisotropically-shaped particles 32 to be aligned substantially vertically with respect to the substrate plane, thereby preventing the anisotropically-shaped particles 32 from sticking to the alignment films while in their horizontal state. Thus, when a longitudinal field is generated in the optical layer 30, a large number of anisotropically-shaped particles 32 will take a vertical alignment state. This realizes a high contrast ratio.

Furthermore, after an electric field is applied to the optical layer 30 in the display device 110, even if the electric field is removed (i.e., voltage is reset), the alignment state of the anisotropically-shaped particles 32 will be maintained. In other words, the display device 110 has memory ability.

FIG. 7(a) shows an alignment state of the anisotropically-shaped particles 32 when voltage is reset after a longitudinal field is applied to the optical layer 30. As shown in FIG. 7(a), even if voltage is reset, the anisotropically-shaped particles 32 maintain a state of being aligned substantially vertically with respect to the substrate plane. This is due to the alignment regulating forces of the vertical alignment films 15 and 25. Note that voltage resetting can be achieved by switching the ON/OFF state of the first switch 51, the second switch 52, the third switch 53, and the fourth switch 54 as illustrated in FIG. 7(a). When the first switch 51 is turned OFF, the second switch 52 OFF, the third switch 53 ON, the fourth switch 54 ON, the first electrode 11, the second electrode 12, and the third electrode 21 will conduct with one another, whereby voltage is reset.

FIG. 7(b) shows an alignment state of the anisotropically-shaped particles 32 when voltage is reset after a lateral field is applied to the optical layer 30. As shown in FIG. 7(b), even if voltage is reset, the anisotropically-shaped particles 32 will maintain a state of being aligned substantially in parallel to the substrate plane. The reason thereof will be described later.

Thus, since the display device 110 has memory ability, hardly any voltage needs to be supplied unless during a rewrite. Therefore, further reduction in power consumption can be achieved.

Moreover, in the display device 110, the alignment regulating forces of the vertical alignment films 15 and 25 prevent the anisotropically-shaped particles 32 from precipitating (while being oriented in the horizontal direction) due to their own weight.

As described above, in the display panel (optical device) 100 of the present embodiment, a liquid crystal material is used as the medium 31P, and vertical alignment films 15 and 25 are provided on the optical layer 30 side of the first substrate 10 and the second substrate 20, whereby the display panel 100 is capable of active matrix driving, excels in low power consumption characteristics, and realizes a high efficiency of light utilization and a high contrast ratio.

Moreover, when the liquid crystal material is of a positive type as in the present embodiment, the behavior of the anisotropically-shaped particles 32 matches the behavior of the liquid crystal molecules 31a when an electric field is applied to the optical layer 30. For example, if the electric field being applied to the optical layer 30 is switched from a lateral field to a longitudinal field, the anisotropically-shaped molecules 32 will try to transition from a horizontal alignment state to a vertical alignment state, and the liquid crystal molecules 31a will also try to transition from a horizontal alignment state to a vertical alignment state. This increases the number (probability of existence) of anisotropically-shaped particles 32 that will be vertically aligned as intended, whereby an even higher contrast ratio can be realized.

Furthermore, the liquid crystal material being of a positive type makes it possible to realize memory ability not only in a state where the anisotropically-shaped particles 32 are vertically aligned, but also in a state where the anisotropically-shaped particles 32 are horizontally aligned (see FIG. 7(b)), thereby enabling further reduction in power consumption.

Moreover, there being only one power source 40 for controlling the electric field to be applied to the optical layer 30 as in the present embodiment makes it possible to reduce the cost of the parts. In the case where power circuitry is made onto the first substrate 10, there being only one power source 40 makes it possible to decrease the circuit scale, whereby the frame region can be made smaller.

There is no particular limitation as to the specific shape and material of the anisotropically-shaped particles 32, so long as their projected area onto the substrate plane changes in accordance with the direction of an applied field in the manner described above. The anisotropically-shaped members 32 may be in flake form (thin-strip shaped), or cylindrical or ellipsoidal form, etc. From the standpoint of realizing a high contrast ratio, preferably the anisotropically-shaped particles 32 are shaped so that the ratio between the maximum projected area and the minimum projected area is 2:1 or more.

As the material of the anisotropically-shaped particles 32, metal material, a semiconductor material, a dielectric material, or a composite material thereof can be used. The anisotropically-shaped particles 32 may be a multilayer dielectric film, or composed of a cholesteric resin material. In the case where a metal material is used as the material of the anisotropically-shaped particles 32, an insulating layer (dielectric layer) is preferably formed on the surface of the anisotropically-shaped particles 32. Although the dielectric constant of a metal alone would be an imaginary number, forming an insulating layer (e.g., a resin layer or a metal oxide layer) on its surface will allow the anisotropically-shaped particles 32 made of the metal material to be treated as a dielectric. An insulating layer being formed on the surface will also provide the effects of preventing electrical conduction due to contact between anisotropically-shaped particles 32 being made of the metal material, coagulation due to physical interactions, and so on. As such anisotropically-shaped particles 32, for example, aluminum flakes whose surface is coated with a resin material (e.g., an acrylic resin) can be used. The optical layer 30 has an aluminum flake content of e.g., 3 weight %. Alternatively, aluminum flakes having an $SiO_2$ layer formed on their surface, aluminum flakes having an aluminum oxide layer formed on their surface, and so on can also be used. It will be appreciated that metal materials other than aluminum may also be used as the metal material. Moreover, the anisotropically-shaped particles 32 may be colored.

There is no particular limitation as to the length of the anisotropically-shaped particles 32. Typically, the length of the anisotropically-shaped particles 32 is on the order of several mm to several dozen mm (e.g., 10 μm in the case where the electrode pitch p (see FIG. 2) is 10 μm; or 4 μm in the case where the electrode pitch p is 4 μm). Moreover, in a reflection type display device such as that of the present embodiment, in order to cover the entire substrate plane with the anisotropically-shaped particles 32 in a horizontal alignment state for achieving high reflectance, it is preferable that the length of the anisotropically-shaped particles 32 is equal to or greater than the electrode pitch p. Also, there is no particular limitation as to the thickness of the anisotropically-shaped particles 32. However, the smaller the thickness of the anisotropically-shaped particles 32 is, the higher the transmittance of the optical layer 30 in a transparent state can be. Therefore, the thickness of the anisotropically-shaped particles 32 is preferably smaller than the interelectrode distance g (e.g., 4 μm or less), and more preferably equal to or less than the wavelength of light (e.g., 0.5 μm or less).

The specific gravity of the anisotropically-shaped particles 32 is preferably 11 $g/cm^3$ or less, more preferably 3 $g/cm^3$ or less, and further more preferably about the same specific gravity as that of the medium 31P. This is because, if the specific gravity of the anisotropically-shaped particles 32 is significantly different from the specific gravity of the medium 31P, a problem may occur in that the anisotropically-shaped particles 32 may precipitate or float around.

As a positive type liquid crystal material which is the medium 31P, a wide range of liquid crystal materials for use in liquid crystal display devices can be suitably used. For example, a fluorine-type liquid crystal material having fluorine introduced in a side chain thereof can be suitably used. Fluorine-type liquid crystal materials, which are often used in passive matrix-driven liquid crystal display devices, have large dielectric anisotropy and high resistivity. Specifically, for example, a liquid crystal material whose dielectric constant $\in_{//}$ along the major axis direction is 24.7, dielectric constant $\in_{\perp}$ along the minor axis direction is 4.3, and resistivity ρ is $6\times10^{13}$ Ω·cm can be used. It will be appreciated that the dielectric constant and resistivity of the liquid crystal material are not limited to those mentioned here. From the standpoint of sufficiently restraining an off-leak from occurring via the medium 31P, the resistivity of the liquid crystal material is preferably $1\times10^{11}$ to $^{12}$ Ω·cm or more. Moreover, the dielectric anisotropy Δ∈ of the liquid crystal material is preferably greater than 10 (Δ∈>10).

As the vertical alignment films 15 and 25, vertical alignment films for use in VA (Vertical Alignment) mode liquid crystal display devices (e.g. polyimide-type or polyamic acid-type vertical alignment films manufactured by JSR CORPORATION or NISSAN CHEMICAL INDUSTRIES, LTD.) can be suitably used. In order to vertically align a positive type liquid crystal material having a high dielectric constant, it is preferable to use vertical alignment films having a hydrophobic structure such as an alkyl group or a fluorine-containing group relatively abundantly introduced in a side chain thereof. The vertical alignment films 15 and 25 each have a thickness of e.g. 100 nm. Of course, this is not a limitation.

Thus, a vertical alignment film for use in liquid crystal display devices is able to exhibit an alignment regulating force also for the anisotropically-shaped particles 32. Hereinafter, a result of verifying this by actually prototyping a display panel will be described. FIG. 8(*a*) is a diagram schematically showing a prototyped display panel 100', and FIG. 8(*b*) is an optical micrograph where the optical layer 30 of the display panel 100' in the absence of applied voltage is observed from the normal direction of the substrate plane.

A display panel 100' shown in FIG. 8(*a*) differs from the display panel 100 shown in FIG. 1, etc., in that, instead of a first electrode 11 and a second electrode 12 (which would be interdigitated electrodes), the first substrate 10 includes a spread electrode 11'. In the prototyped display panel 100', the optical layer 30 has a thickness (cell gap) of 50 μm. As the anisotropically-shaped particles 32, disk-shaped aluminum flakes whose surface was coated with a resin material were used. The aluminum flakes had a length (diameter) of about 5 μm, and a thickness of about 0.1 μm. No optical absorption layer 14 was provided on the first substrate 10 of the display panel 100'; observation with an optical microscope was made by placing a light source 101 behind the first substrate 10 and observing the display panel 100' through the front face (in a direction D1 in FIG. 8(*a*)).

In the absence of applied voltage to the optical layer 30, as can be seen from FIG. 8(*b*), a large number of anisotropically-shaped particles 32 are aligned substantially vertically with respect to the substrate plane. For example, an anisotropically-shaped particle 32 that is indicated with a reference numeral in FIG. 8(*b*) has a surface of projection with a width (size S in FIG. 8(*b*)) of about 0.75 μm on the substrate plane. Therefore, the angle θ that this anisotropically-shaped particle 32 constitutes with the substrate plane is about 81° ($=\tan^{-1}(5/0.75)$).

From the standpoint of increasing reflectance, it is preferable that as many anisotropically-shaped particles 32 as possible are aligned substantially vertically with respect to the substrate plane. For example, within each pixel, preferably 50% or more anisotropically-shaped particles 32 are aligned at angles of 800 or more with respect to the substrate plane. Alternatively, in a region measuring 150 μm×150 μm (i.e., 150 μm on all sides) at the central portion of the display surface, preferably 80% or more anisotropically-shaped particles 32 are aligned at angles of 80° or more with respect to the substrate plane. In the example shown in FIG. 8(*b*), in a region of about 100 μm×100 μm, 90% or more anisotropically-shaped particles 32 are aligned at angles of 80° or more with respect to the substrate plane.

Presumably, the reason why the anisotropically-shaped particles 32 are vertically aligned in the absence of applied voltage has to do with the surface tension of the vertical alignment films 15 and 25 and macroscopic changes in the alignment of the liquid crystal molecules 31*a*.

As the vertical alignment films 15 and 25, those which will vertically align both a positive type liquid crystal material and a negative type liquid crystal material may be used, or those which will only vertically align either a positive type liquid crystal material or a negative type liquid crystal material may be used. In the present embodiment, the medium 31P is a positive type liquid crystal material; however, as the vertical alignment films 15 and 25, those which will vertically align a negative type liquid crystal material but will not vertically align a positive type liquid crystal material may be used. In other words, it suffices if the vertical alignment films 15 and 25 align the anisotropically-shaped particles 32 substantially vertically with respect to the substrate plane.

Figure 7:
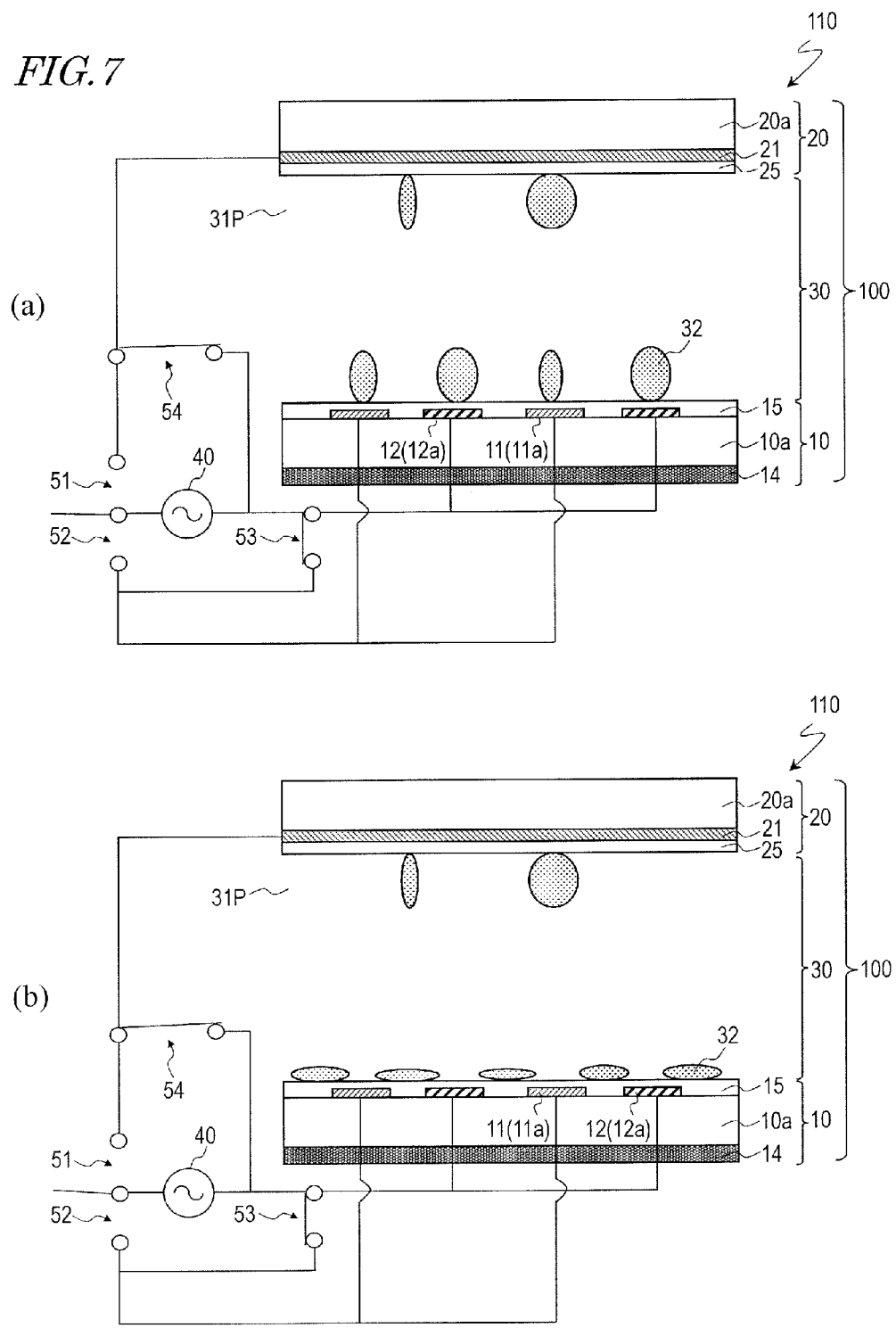
FIG. 7 (a) is a diagram showing an alignment state of anisotropically-shaped particles 32 when voltage is reset after a longitudinal field is applied to the optical layer 30; and (b) is a diagram showing an alignment state of anisotropically-shaped particles 32 when voltage is reset after a lateral field is applied to the optical layer 30.

It has been found through the inventors' verification that the memory ability which has been described with reference to FIG. 7(*b*) (the memory ability when voltage is reset after a lateral field is applied) is mainly obtained when a medium 31P which is a positive type liquid crystal material is combined with vertical alignment films which will vertically align a negative type liquid crystal material but will not vertically align a positive type liquid crystal material. This is presumably due to the following reason. When the anisotropically-shaped particles 32 are in a horizontal alignment state (a state shown in FIGS. 4(*a*) and (*b*)), the anisotropically-shaped particles 32 and the first electrode 11 and the second electrode 12 are in a charged state. The alignment regulating forces which are directly exerted on the anisotropically-shaped particles 32 by the vertical alignment films alone will not be enough to eliminate this state; rather, assistance from the liquid crystal molecules 31*a* becoming vertically aligned will be needed. In the aforementioned combination, no assistance due to the liquid crystal molecules 31*a* becoming vertically aligned exists, thus allowing the memory ability to be exhibited.

Although the above description illustrates a construction where the first substrate 10 being an active matrix substrate is provided on the rear face side, the positioning of the first substrate 10 is not limited to this. The first substrate 10 may be provided on the front face side. The first substrate 10, being an active matrix substrate, contains component elements which are made of a material having light-shielding property; therefore, adopting a construction where the first substrate 10 is provided on the rear face side will make utmost use of the reflection effect of the anisotropically-shaped particles 32.

Figure 9:
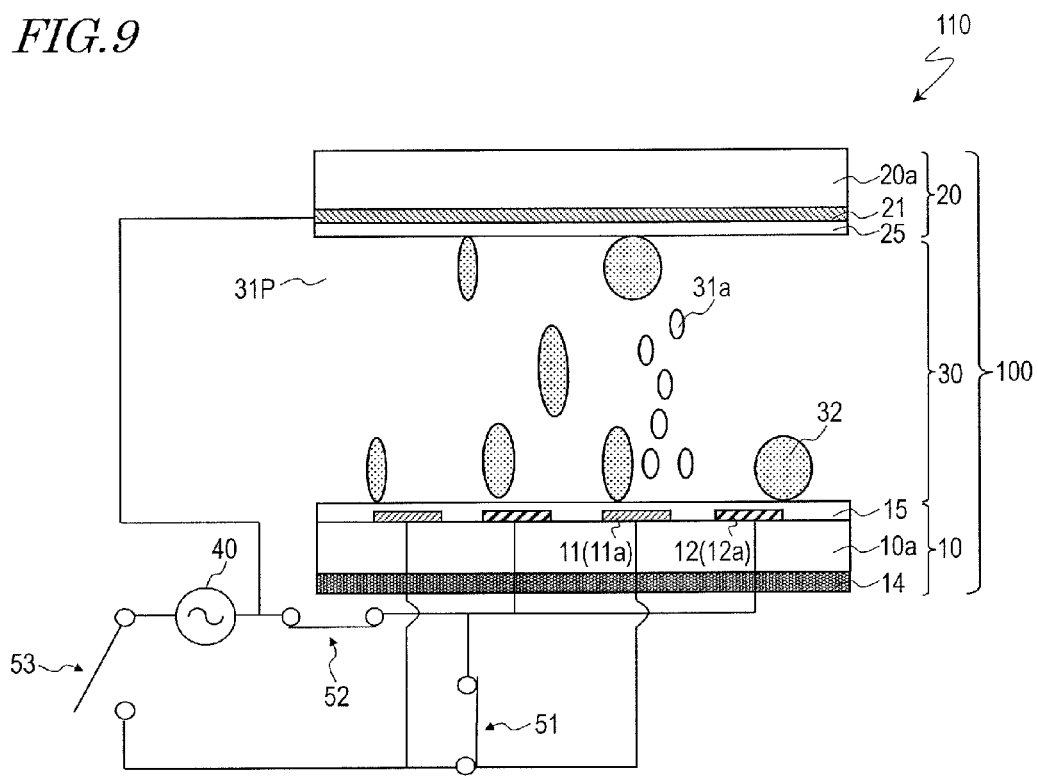
FIG. 9 A diagram showing another exemplary circuit construction of the display device 110.

Moreover, the specific circuit construction (the number of switches and power sources interconnection between them) for switching the direction of the electric field to be applied to the optical layer 30 is not limited to what is illustrated in FIG. 3 and the like. For example, a circuit construction as shown in FIG. 9 may be adopted.

In the construction shown in FIG. 3 and the like, four switches (the first switch 51, the second switch 52, the third switch 53, and the fourth switch 54) are provided. On the other hand, in the construction shown in FIG. 9, three switches are provided: a first switch 51, a second switch 52, and a third switch 53. By adopting such a construction, too, it is possible to switch the direction of the electric field to be applied to the optical layer 30.

Figure 10:
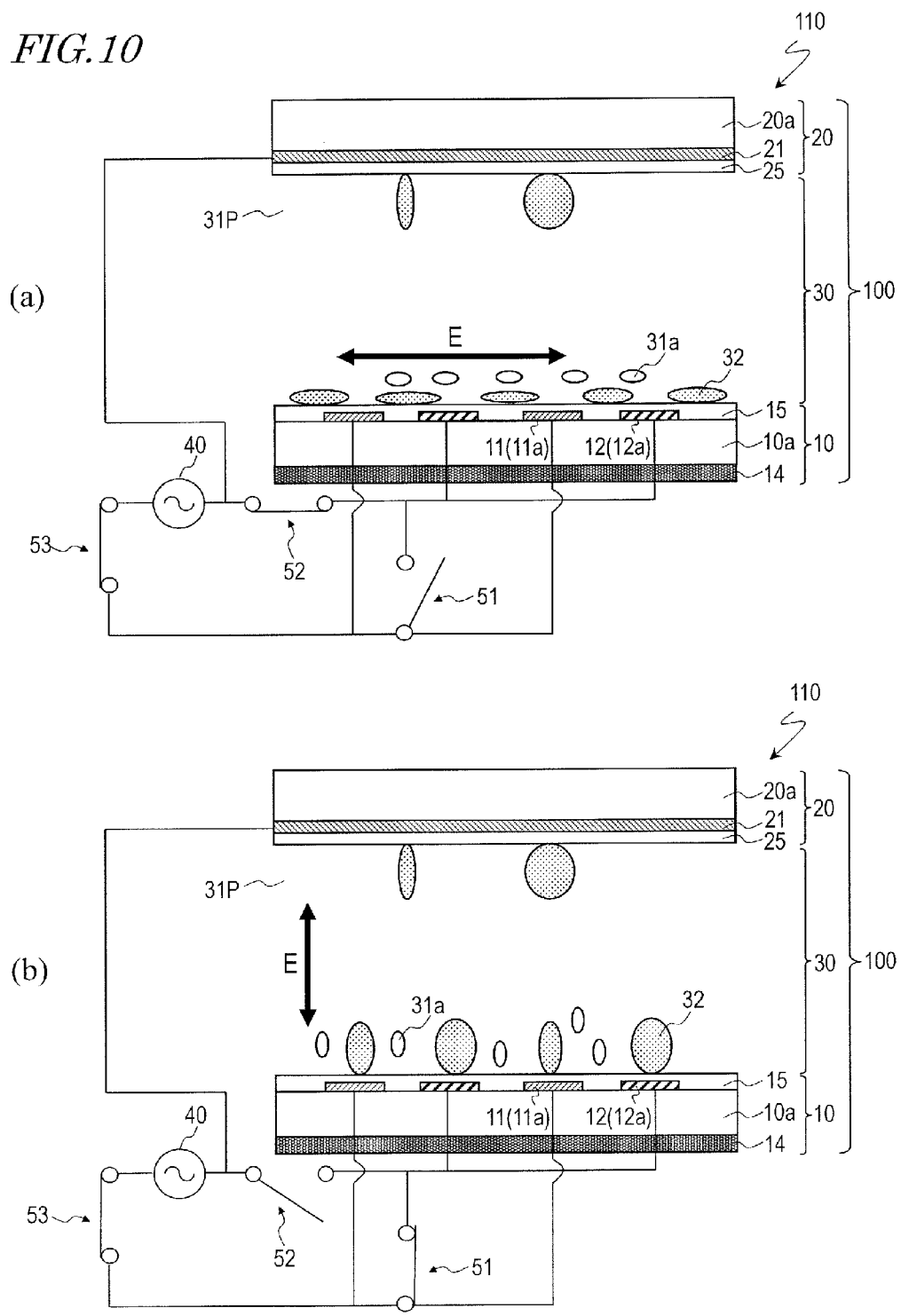
FIG. 10 (a) is a diagram schematically showing the display device 110 when a lateral field is applied to the optical layer 30; and (b) is a diagram schematically showing the display device 110 when a longitudinal field is applied to the optical layer 30.

Specifically, in the case of generating a lateral field in the optical layer 30, as shown in FIG. 10(*a*), the second switch 52 may be turned ON, the first switch 51 OFF, and the third switch 53 ON. As a result, the first electrode 11 becomes connected to one end of the power source 40 while the second electrode 12 and the third electrode 21 become connected to the other end of the power source 40. Thus, a predetermined voltage is applied between the first electrode 11 and the second electrode 12, and a lateral field is generated in the optical layer 30.

In the case of generating a longitudinal field in the optical layer 30, as shown in FIG. 10(b), the second switch 52 may be turned OFF, the third switch 53 ON, and the first switch 51 ON. As a result, the first electrode 11 and the second electrode 12 become connect to one end of the power source 40 while the third electrode 21 becomes connected to the other end of the power source 40. As a result, a predetermined voltage is applied between the first electrode 11 and second electrode 12 and the third electrode 21, whereby a longitudinal field is generated in the optical layer 30.

In the case of resetting voltage, as shown in FIG. 9, the third switch 53 may be turned OFF, the first switch 51 ON, and the second switch 52 ON. As a result, the first electrode 11, the second electrode 12, and the third electrode 21 will conduct with one another, whereby voltage is reset.

Embodiment 2

Figure 11:
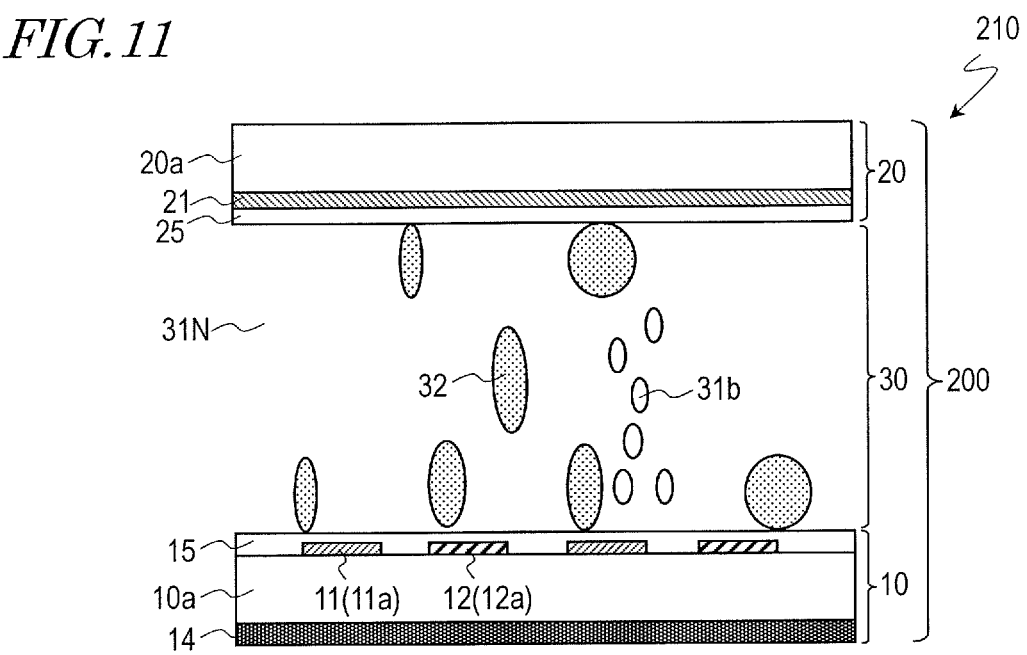
FIG. 11 A cross-sectional view schematically showing a display device 210 according to an embodiment of the present invention.

FIG. 11 shows a display device 210 according to the present embodiment. FIG. 11 is a cross-sectional view schematically showing the display device 210. Hereinafter, differences of the display device 210 of the present embodiment from the display device 110 of Embodiment 1 will be mainly described.

The display panel 100 of the display device 110 of Embodiment 1 includes a positive type liquid crystal material as the medium 31P. On the other hand, a display panel 200 of the display device 210 of the present embodiment includes a so-called negative type liquid crystal material as a medium 31N. In other words, the medium 31N is a liquid crystal material having negative dielectric anisotropy, such that the dielectric constant $\in_\perp$ of the liquid crystal molecules 31b along the minor axis direction is greater than the dielectric constant $\in_{//}$ along the major axis direction.

Figure 12:
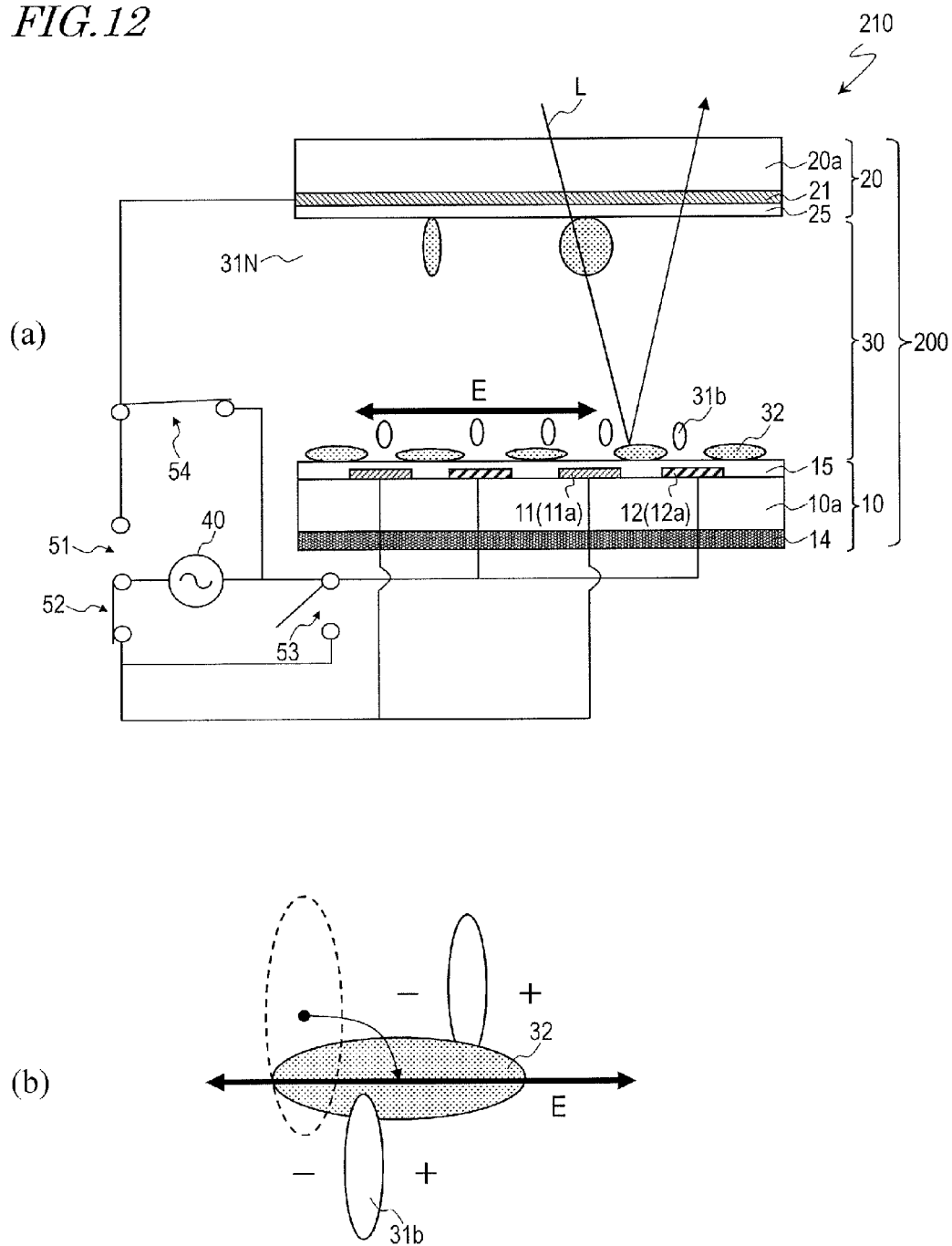
FIG. 12 (a) is a diagram schematically showing the display device 210 when a lateral field is applied to the optical layer 30; and (b) is a diagram showing alignment directions of anisotropically-shaped particles 32 and liquid crystal molecules 31b in that case.
Figure 13:
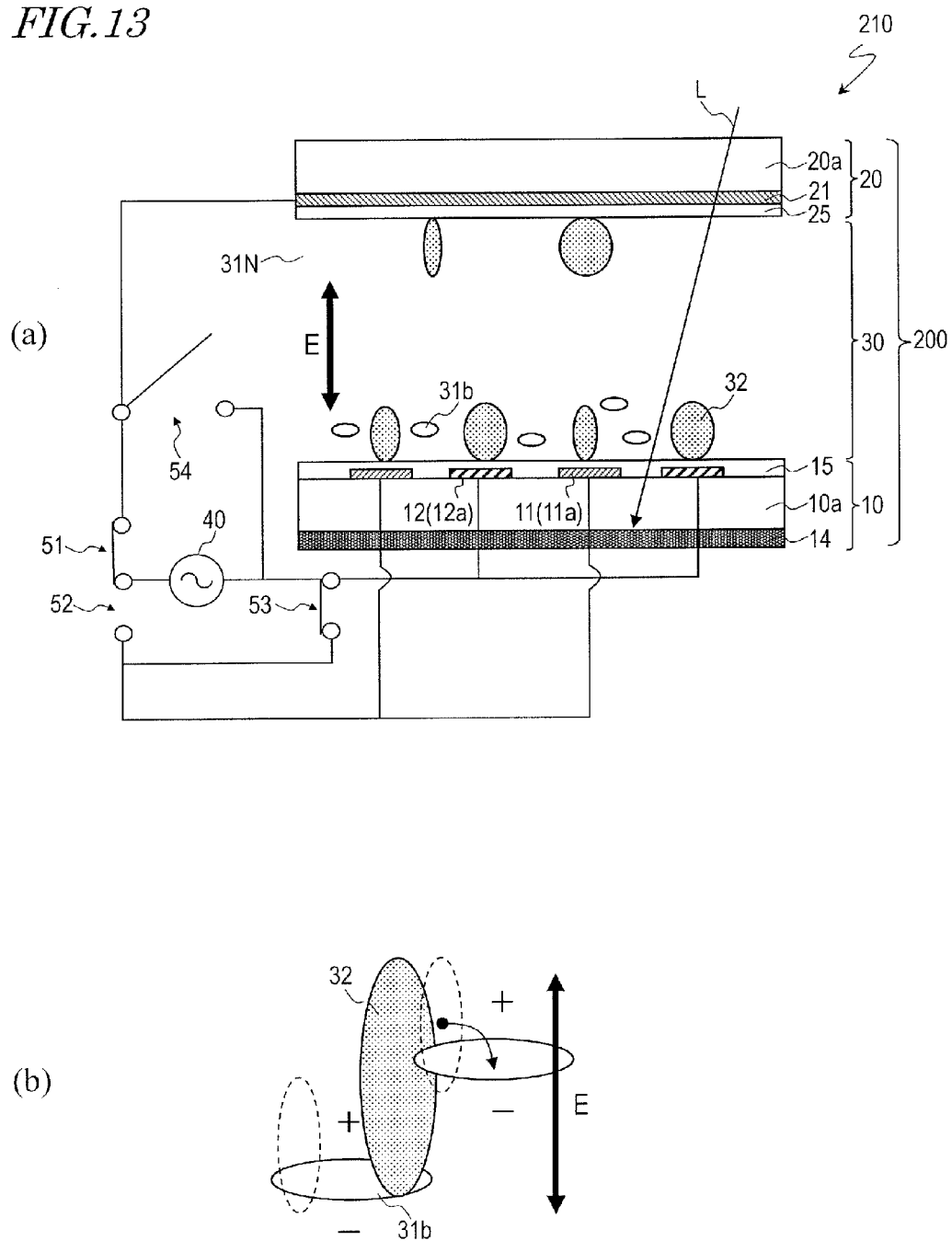
FIG. 13 (a) is a diagram schematically showing the display device 210 when a longitudinal field is applied to the optical layer 30; and (b) is a diagram showing alignment directions of anisotropically-shaped particles 32 and liquid crystal molecules 31b in that case.

Now, with reference also to FIG. 12 and FIG. 13, changes in the alignment direction of anisotropically-shaped particles 32 in accordance with the applied field will be described. FIG. 12(a) is a diagram schematically showing the display device 210 when a lateral field is applied to the optical layer 30, and FIG. 12(b) is a diagram showing alignment directions of anisotropically-shaped particles 32 and liquid crystal molecules 31b in that case. FIG. 13(a) is a diagram schematically showing the display device 210 when a longitudinal field is applied to the optical layer 30, and FIG. 13(b) is a diagram showing alignment directions of anisotropically-shaped particles 32 and liquid crystal molecules 31b in that case.

When no electric field is applied to the optical layer 30, the anisotropically-shaped particles 32 are aligned so that they are (i.e., their longitudinal directions are) substantially perpendicular to the substrate plane of the first substrate 10, as shown in FIG. 11.

As shown in FIG. 12(a), when the fourth switch 54 is turned ON, the first switch 51 OFF, the third switch 53 OFF, and the second switch 52 ON, the first electrode 11 becomes connected to one end of the power source 40 while the second electrode 12 and the third electrode 21 become connected to the other end of the power source 40. As a result, a predetermined voltage (e.g., an AC voltage of Vpp=70 V with a duty ratio of 50% and a frequency of 60 Hz) is applied between the first electrode 11 and the second electrode 12, whereby a lateral field is applied to the optical layer 30.

At this time, as shown in FIGS. 12(a) and (b), the anisotropically-shaped particles 32 are aligned so that they are (i.e., their longitudinal directions are) substantially parallel to the substrate plane of the first substrate 10 (i.e., taking a horizontal alignment state). Moreover, the liquid crystal molecules 31b are aligned substantially vertically with respect to the substrate plane of the first substrate 10. In this state, a large part of the incident ambient light L is reflected by the anisotropically-shaped particles 32 in the optical layer 30. That is, the optical layer 30 takes a reflecting state; this state achieves white displaying. Moreover, gray scale displaying also becomes possible by applying a relatively low voltage.

On the other hand, as shown in FIG. 13(a), when the fourth switch 54 is turned OFF, the second switch 52 OFF, the third switch 53 ON, and the first switch 51 ON, the third electrode 21 becomes connected to one end of the power source 40 while the first electrode 11 and the second electrode 12 become connected to the other end of the power source 40. As a result, a predetermined voltage (e.g., an AC voltage of Vpp=70 V with a duty ratio of 50% and a frequency of 60 Hz) is applied between the first electrode 11 and second electrode 12 and the third electrode 21, whereby a longitudinal field is applied to the optical layer 30.

In this case, the anisotropically-shaped particles 32 are aligned so that they are (i.e., their longitudinal directions are) substantially perpendicular to the substrate plane of the first substrate 10 (i.e., taking a vertical alignment state), as shown in FIGS. 13(a) and (b). The liquid crystal molecules 31a are aligned substantially in parallel to the substrate plane of the first substrate 10. In this state, a large part of the incident ambient light L is transmitted through the optical layer 30. That is, the optical layer 30 takes a transparent state. Since the ambient light which is transmitted through the optical layer 30 is absorbed by the optical absorption layer 14, this state achieves black displaying.

As described above, the display device 210 of the present embodiment performs displaying by switching between a state in which a longitudinal field is generated in the optical layer 30 and a state in which a lateral field is generated in the optical layer 30. The transition from the former state to the latter state, and the transition from the latter state to the former state, are both effected by changing the direction of an applied field, and thus a sufficient response speed can be realized. Moreover, the display device 210 does not require polarizers and therefore can achieve a high efficiency of light utilization.

Furthermore, since a liquid crystal material is used as the medium 31N in the display device 210, in a state where the TFT is OFF after a write to a pixel, an off-leak is prevented from occurring via the medium 31N. As a result, a high voltage holding ratio is obtained, and active matrix driving can be suitably performed.

Moreover, the alignment films used in the display device 210 are vertical alignment films 15 and 25, thereby preventing the anisotropically-shaped particles 32 from sticking to the alignment films while in their horizontal state. Thus, when a longitudinal field is generated in the optical layer 30, a large number of anisotropically-shaped particles 32 will take a vertical alignment state. This realizes a high contrast ratio.

Furthermore, the display device 210 has memory ability. FIGS. 14(a) and (b) show alignment states of anisotropically-shaped particles 32 and liquid crystal molecules 31b when voltage is reset after a longitudinal field is applied to the optical layer 30. As shown in FIGS. 14(a) and (b), even if voltage is reset, the anisotropically-shaped particles 32 maintain a state of being aligned substantially vertically with respect to the substrate plane. This is due to the alignment regulating forces of the vertical alignment films 15 and 25. Note that voltage resetting can be achieved by switching the ON/OFF state of the first switch 51, the second switch 52, the third switch 53, and the fourth switch 54 as illustrated in FIG. 14(a). When the first switch 51 is turned OFF, the second switch 52 OFF, the third switch 53 ON, and the fourth switch 54 ON, the first electrode 11, the second electrode 12, and the third electrode 21 will conduct with one another, whereby voltage is reset.

Thus, the display device 110 has memory ability, whereby further reduction in power consumption can be achieved.

However, in the display device 210 of the present embodiment, memory ability is realized in a state where the anisotropically-shaped particles 32 are vertically aligned, but not in a state where the anisotropically-shaped particles 32 are horizontally aligned.

FIGS. 15(a) and (b) show alignment states of anisotropically-shaped particles 32 and liquid crystal molecules 31b when voltage is reset after a lateral field is applied to the optical layer 30. As shown in FIGS. 15(a) and (b), when voltage is reset, the anisotropically-shaped particles 32 will return to a vertical alignment state.

As described above, in the display panel (optical device) 200 of the present embodiment, a liquid crystal material is used as the medium 31N, and vertical alignment films 15 and 25 are provided on the optical layer 30 side of the first substrate 10 and the second substrate 20, whereby the display panel 200 is capable of active matrix driving, excels in low power consumption characteristics, and realizes a high efficiency of light utilization and a high contrast ratio.

In the case where the liquid crystal material is a negative type, memory ability is not realized in a state where the anisotropically-shaped particles 32 are horizontally aligned (see FIG. 15). Therefore, from the standpoint of reducing power consumption, it may be preferable to use a positive type liquid crystal material as the medium 31P, as in the case of the display device 110 of Embodiment 1.

On the other hand, the following advantages will result when the liquid crystal material is a negative type.

As has already been described, when the liquid crystal material is a negative type, if voltage is reset after a lateral field is applied to the optical layer 30, the anisotropically-shaped particles 32 will return to a vertical alignment state. In other words, without applying a longitudinal field to the optical layer 30, the anisotropically-shaped particles 32 can transition from a horizontal alignment state to a vertical alignment state. This allows the third electrode 21 to be omitted, as in a display device 210A shown in FIG. 16.

Figure 16:
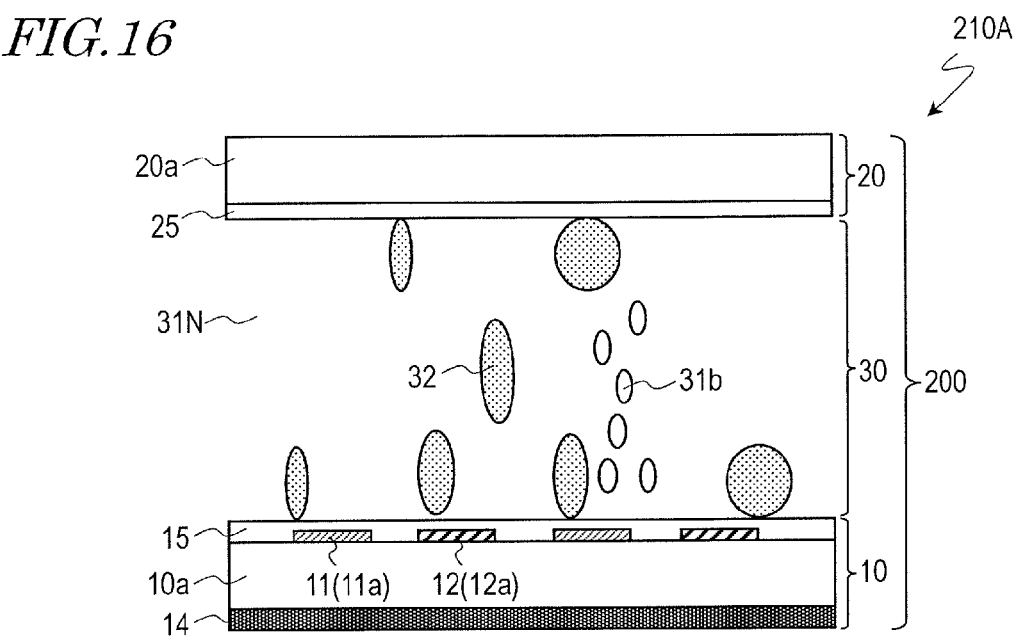
FIG. 16 A cross-sectional view schematically showing a display device 210A according to an embodiment of the present invention.

The display device 210A shown in FIG. 16 differs from the display device 210 shown in FIG. 11, etc., in that the third electrode 21 is omitted (i.e., the second substrate 20 lacks an electrode opposing the first electrode 11 and the second electrode 12). The display device 210A performs displaying by switching between applying and not applying a lateral field to the optical layer 30. In the display device 210A, omission of the third electrode 21 belonging to the display device 210 permits reduction in the production cost.

As a negative type liquid crystal material which is the medium 31N, a wide range of liquid crystal materials for use in liquid crystal display devices can be suitably used. For example, a liquid crystal material whose dielectric constant $\in_{//}$ along the major axis direction is 3.7, dielectric constant $\in_{\perp}$ along the minor axis direction is 7.8, and resistivity $\rho$ is $1\times10^{12}$ Ω·cm can be used. It will be appreciated that the dielectric constant and resistivity of the liquid crystal material are not limited to those mentioned here. From the standpoint of sufficiently restraining an off-leak from occurring via the medium 31N, the resistivity of the liquid crystal material is preferably $1\times10^{11}$ to $^{12}$ Ω·cm or more.

Embodiment 3

Figure 17:
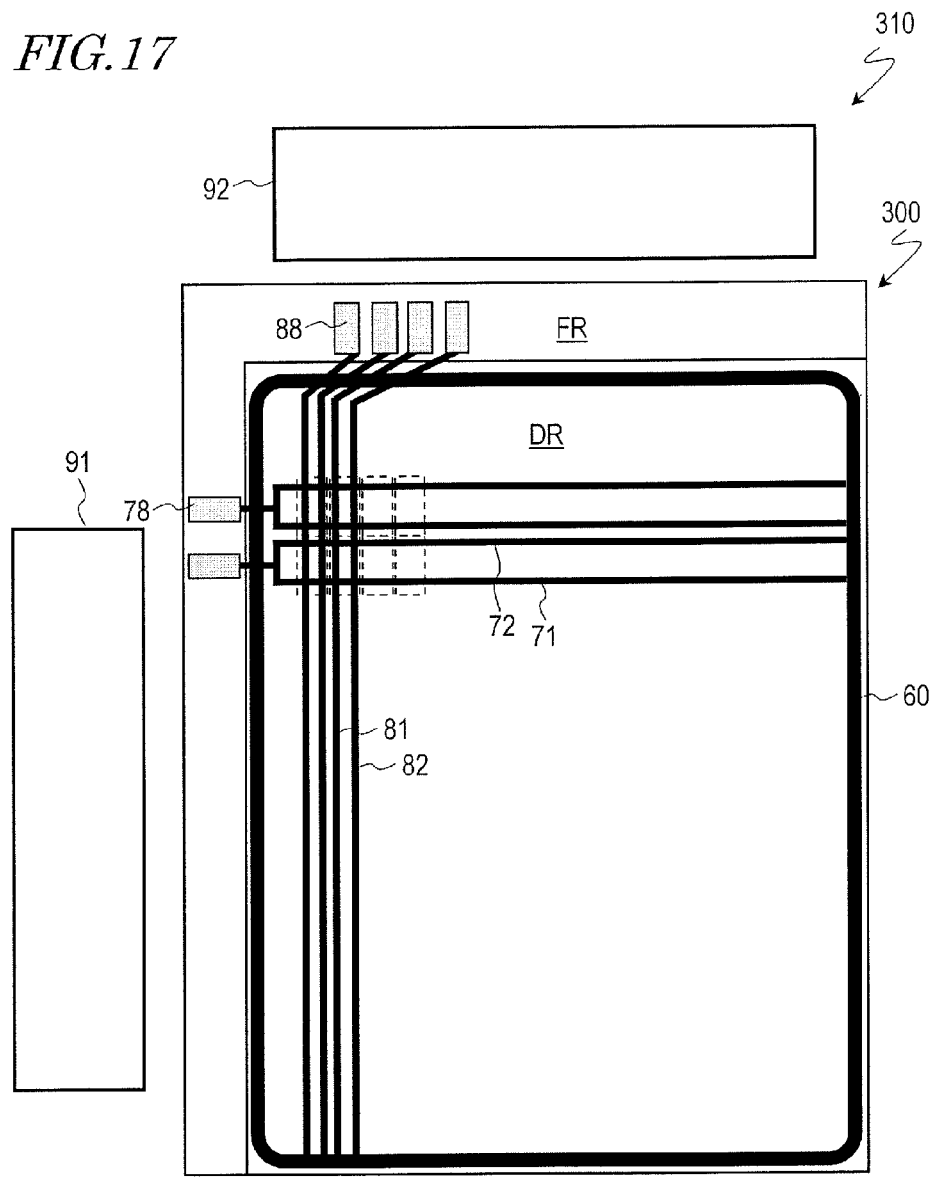
FIG. 17 A plan view schematically showing a display device 310 (in its entirety) according to an embodiment of the present invention.
Figure 18:
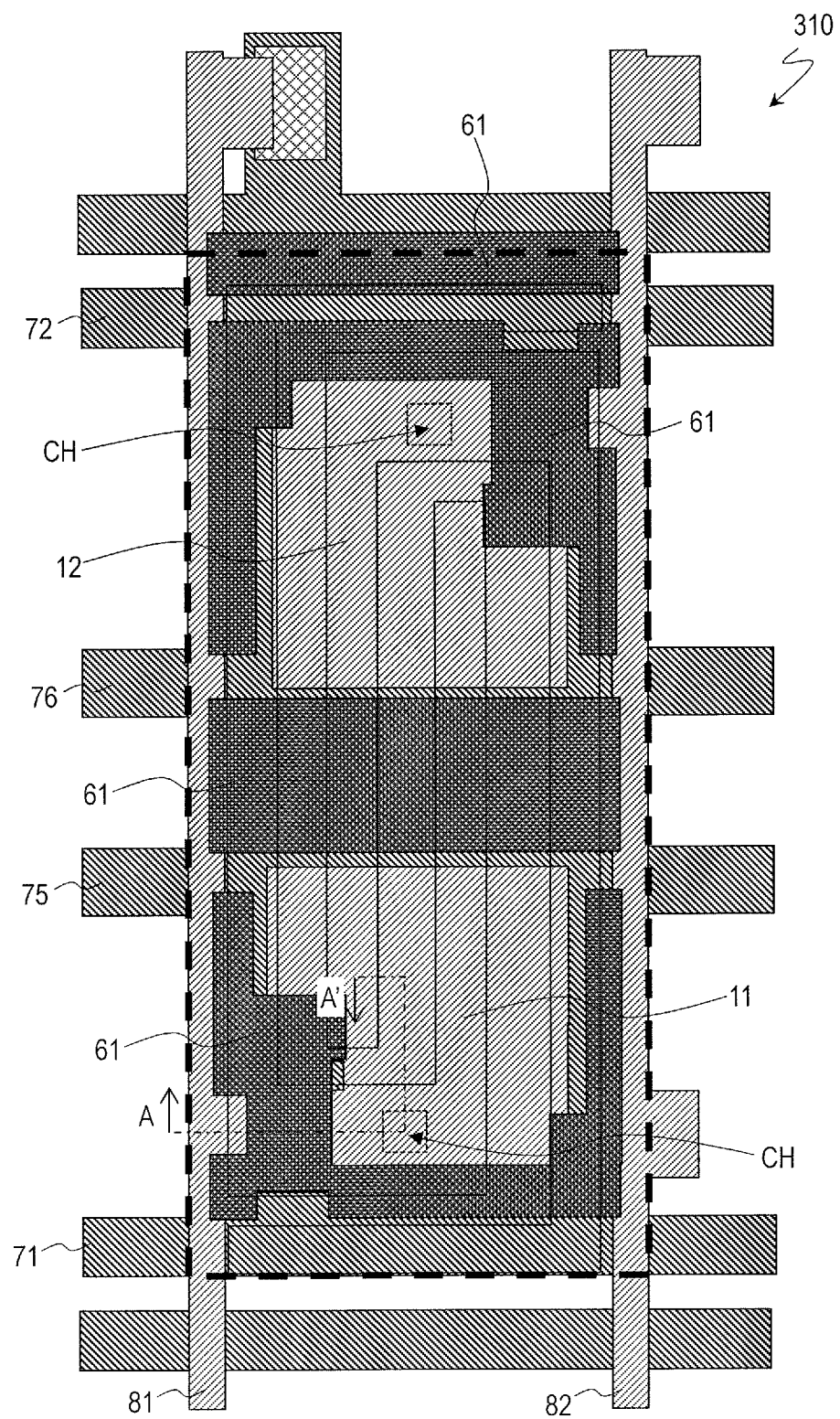
FIG. 18 A plan view schematically showing a region corresponding to one pixel of the display device 310.
Figure 19:
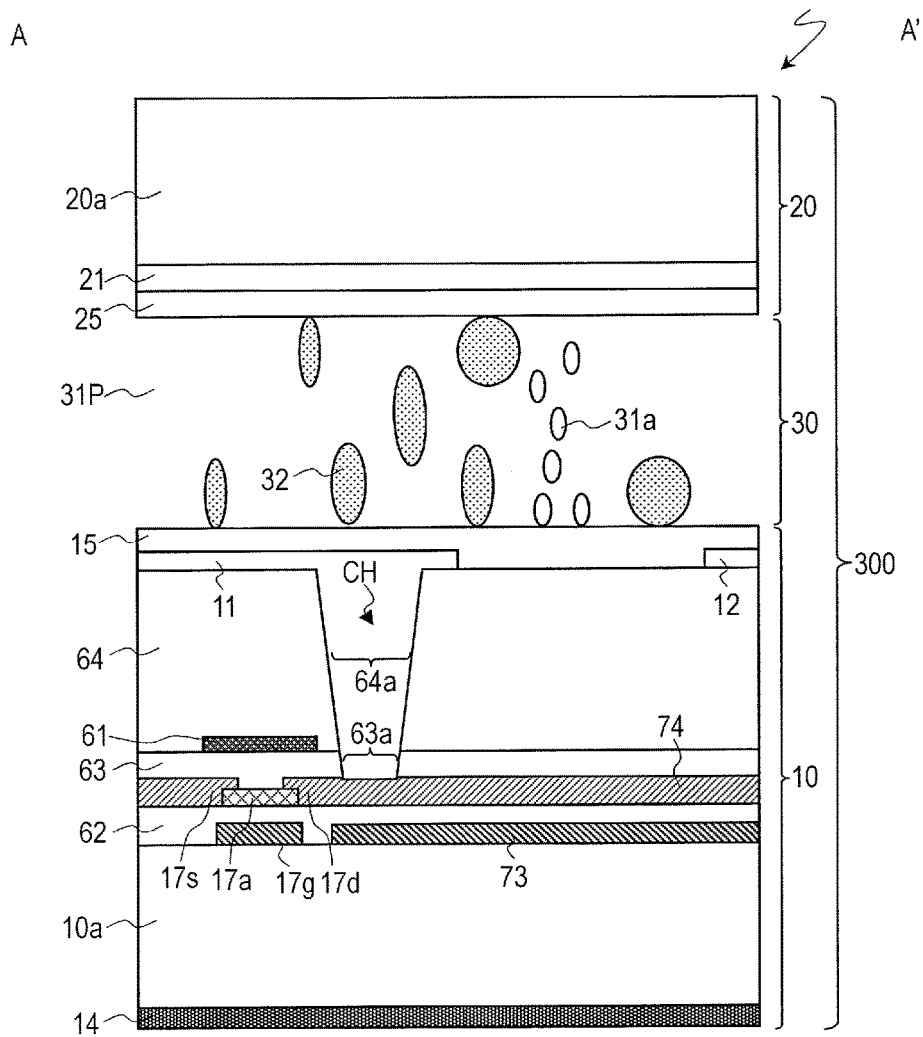
FIG. 19 A cross-sectional view taken along line A-A' in FIG. 18.
Figure 20:
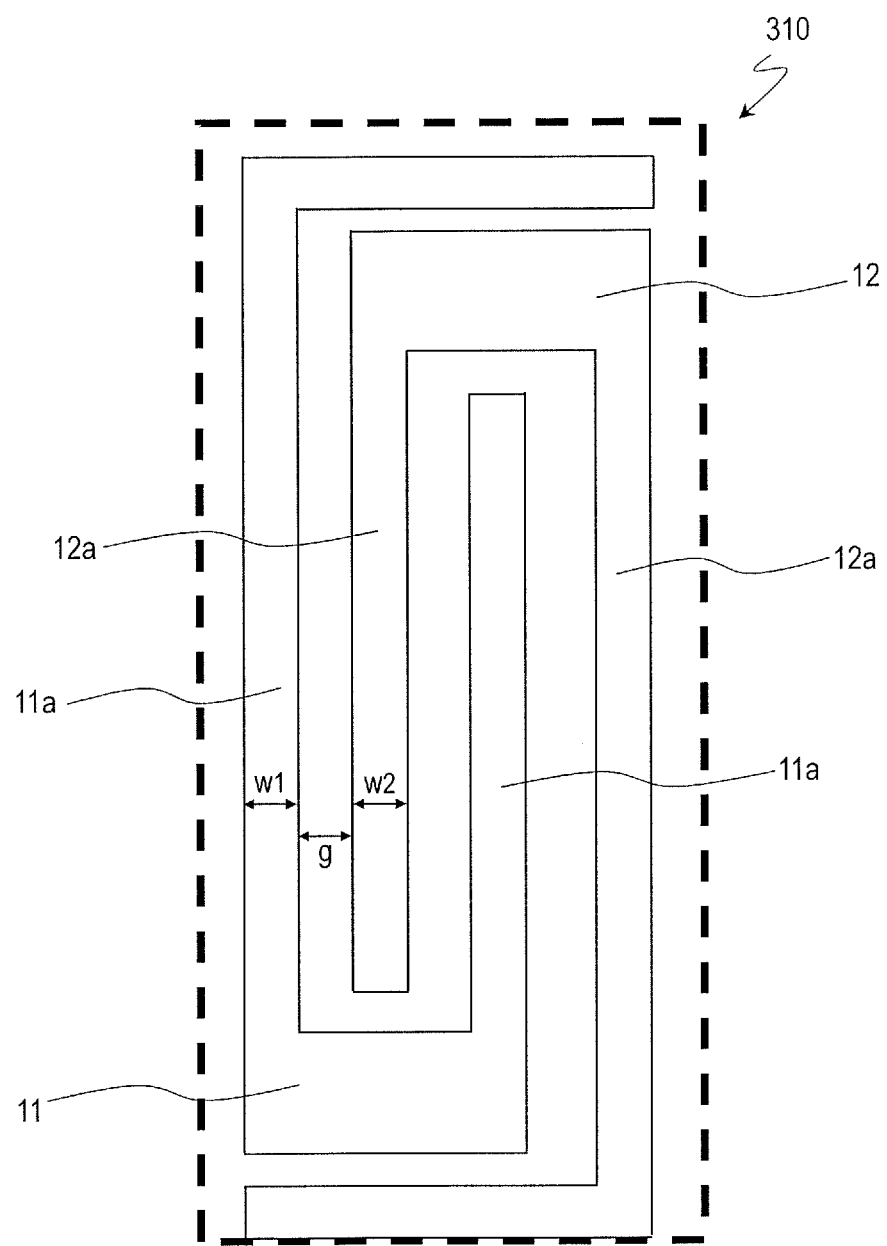
FIG. 20 A plan view showing only the first electrode 11 and the second electrode 12 among the component elements of the display device 310 shown in FIG. 18.
Figure 21:
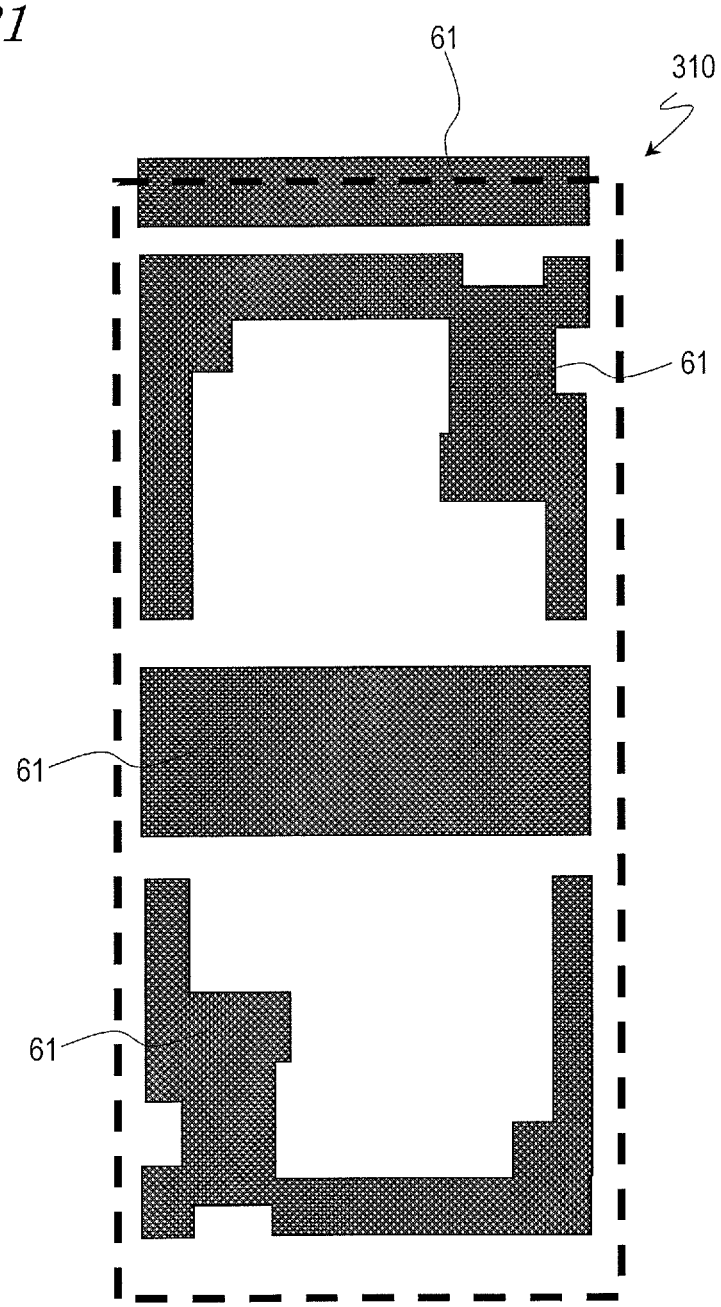
FIG. 21 A plan view showing only the light shielding layer 61 among the component elements of the display device 310 shown in FIG. 18.
Figure 22:
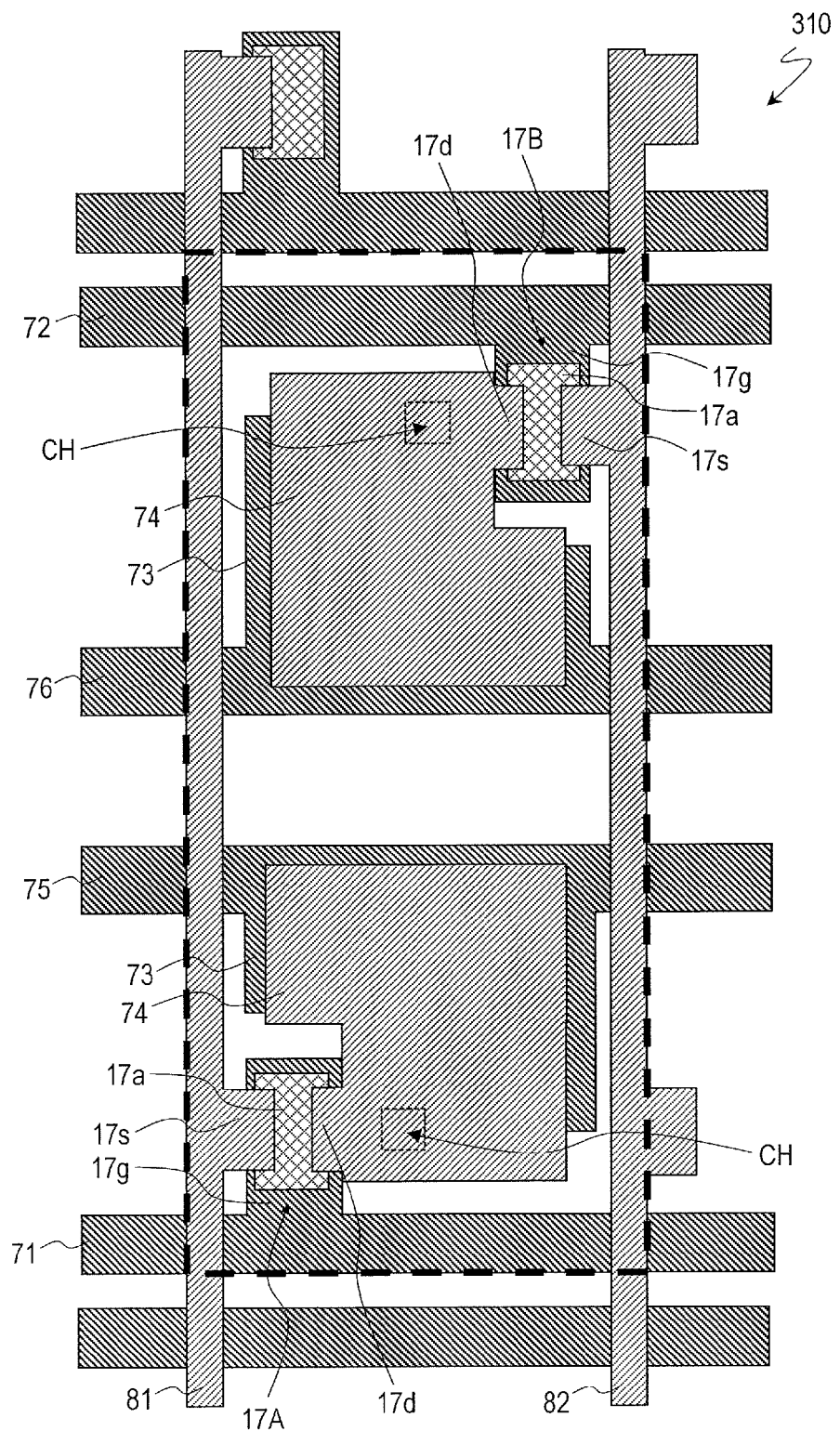
FIG. 22 A plan view showing anything other than the first electrode 11, the second electrode 12, and the light shielding layer 61 among the component elements of the display device 310 shown in FIG. 18.

With reference to FIG. 17 to FIG. 22, a display device 310 according to the present embodiment will be described. FIG. 17 is a plan view schematically showing the entire display device 310. FIG. 18 is a plan view schematically showing a region corresponding to one pixel of the display device 310. FIG. 19 is a cross-sectional view taken along line A-A' in FIG. 18. FIG. 20 is a plan view showing only the first electrode 11 and the second electrode 12 among the component elements shown in FIG. 18. FIG. 21 is a plan view showing only the light shielding layer 61 among the component elements shown in FIG. 18. FIG. 22 is a plan view showing anything other than the first electrode 11, the second electrode 12, and the light shielding layer 61 among the component elements shown in FIG. 18.

As shown in FIG. 17, the display panel 300 of the display device 310 has a displaying region DR and a frame region (non-displaying region) FR located outside the displaying region DR. A sealing portion 60 is formed so as to surround the displaying region DR.

Moreover, the display panel 300 includes plural gate lines 71 and 72 extending along the row direction and plural source lines 81 and 82 extending along the column direction. As can be seen from FIG. 17 and FIG. 18, two gate lines 71 and 72 are provided for each pixel row. Hereinafter, one 71 of the two gate lines 71 and 72 will be referred to as the "first gate line", and the other 72 as the "second gate line". Moreover, two source lines 81 and 82 are provided for each pixel column. Hereinafter, one 81 of the two source lines 81 and 82 will be referred to as the "first source line", and the other 82 as the "second source line".

The first gate line 71 and the second gate line 72 are branched out from a single gate line near the frame region FR. In other words, the first gate line 71 and the second gate line 72 are electrically connected to each other, so that they supply the same gate signal. On the other hand, the first source line 81 and the second source line 82 are not electrically connected to each other, so that they independently supply their respective source signals.

Moreover, in addition to the display panel 300, the display device 310 includes a gate driver 91 and a source driver 92 for supplying driving signals to the display panel 300. The first gate line 71 and the second gate line 72 are connected to the gate driver 91 via terminal portions 78 which are provided in the frame region FR. Moreover, the first source line 81 and the second source line 82 are respectively connected to the source driver 92 via terminal portions 88 provided in the frame region FR. Note that the gate driver 91 and the source driver 92 may be made onto the first substrate 10, which is an active matrix substrate (i.e., formed so as to integral with the first substrate 10).

As shown in FIG. 22, two TFTs (first TFT and second TFT) 17A and 17B are provided for each pixel. Each of the first TFT 17A and the second TFTs 17B includes a gate electrode 17g, a source electrode 17s, a drain electrode 17d, and a semiconductor layer 17a.

The gate electrode 17g, the source electrode 17s, and the drain electrode 17d of the first TFT 17A are electrically connected to the first gate line 71, the first source line 81, and the first electrode 11, respectively. The gate electrode 17g, the source electrode 17s, and the drain electrode 17d of the second TFT 17B are electrically connected to the second gate line 72, the second source line 82, and the second electrode 12, respectively.

As shown in FIG. 20, each of the first electrode 11 and the second electrode 12 includes plural branches 11a and 12a. However, whereas the first electrode 11 and the second electrode 12 in the display device 110 of Embodiment 1 are interdigitated electrodes (see FIG. 2), each of the first electrode 11 and the second electrode 12 according to the present embodiment is a spiral electrode having a swirling shape.

Moreover, two storage capacitor lines (first storage capacitor line and second storage capacitor line) 75 and 76 are provided for each pixel row. Each of the first storage capacitor line 75 and the second storage capacitor line 76 supplies a storage capacitor counter voltage (Cs voltage) to a storage capacitor counter electrode 73 (which herein extends from the first storage capacitor line 75 or the second storage capacitor line 76). Together with the storage capacitor electrode 74, the storage capacitor counter electrode 73 constitute a storage capacitor Cs. The storage capacitor electrode 74 is electrically connected to a drain electrode 17d of the first TFT 17A or the second TFT 17B (extending from the drain electrode 17d herein).

Now, the multilayer structure on the substrate 10a of the first substrate 10 will be described (see FIG. 19).

On the substrate 10a, the gate electrode 17g, the gate lines 71 and 72, the storage capacitor lines 75 and 76, and the storage capacitor counter electrode 73 are provided. These are made of a multilayer film of a titanium layer, an aluminum layer, and a titanium layer (Ti/Al/Ti: these layers having respective thicknesses of 100 nm, 300 nm and 30 nm), for example.

A gate insulating layer 62 is provided so as to cover the gate electrode 17g and the like. The gate insulating layer 62 is made of a silicon nitride (SiNx) film having a thickness of 400 to 1000 nm, for example.

On the gate insulating layer 62, the semiconductor layer 17a, the source electrode 17s, the drain electrode 17d, the source lines 81 and 82, and the storage capacitor electrode 74 are provided. Various known semiconductor materials can be used as the material of the semiconductor layer 17a; for example, amorphous silicon, polycrystalline silicon, continuous grain silicon (CGS), or the like can be used. The contact layer (impurity-added semiconductor layer) and the intrinsic semiconductor layer have respective thicknesses of 50 nm and 230 nm, for example. The source electrode 17s, the drain electrode 17d, the source lines 81 and 82, and the storage capacitor electrode 74 are made of a multilayer film of an aluminum layer and a titanium layer (Al/Ti: these layers having respective thicknesses of 200 nm and 30 nm), for example.

A transparent insulating layer 63 is provided so as to cover the source electrode 17s, the drain electrode 17d, and the like. The transparent insulating layer 63 is made of an SiNx film having a thickness of 250 nm, for example.

A light shielding layer 61 is provided on the transparent insulating layer 63. The light shielding layer 61 is disposed so as to overlap the first TFT 17A and the second TFT 17B, and so on. The light shielding layer 61 is made of a molybdenum (Mo) film having a thickness of 100 nm, for example.

An organic insulating layer 64 made of a photosensitive resin is provided so as to cover the light shielding layer 61. The organic insulating layer 64 has a thickness of e.g. 2.5 µm.

On the organic insulating layer 64, the first electrode 11 and the second electrode 12 are provided. The first electrode 11 and the second electrode 12 are made of an ITO film having a thickness of 100 nm, for example. The width $w_1$ of each branch 11a of the first electrode 11 and the width $w_2$ of each branch 12a of the second electrode 12 is e.g. 10 µm. The interelectrode distance g is e.g. 10 µm. Note that the material of the first electrode 11 and the second electrode 12 does not need to be transparent.

The first electrode 11 and the second electrode 12 are connected to the storage capacitor electrode 74 within a contact hole CH which is formed in the transparent insulating layer 63 and the organic insulating layer 64, and, via the storage capacitor electrode 74, electrically connected to the drain electrodes 17d of the first TFT 17A and the second TFT 17B. The contact hole CH includes an opening 63a which is formed in the transparent insulating layer 63 and an opening 64a which is formed in the organic insulating layer 64. When forming the opening 63a in the transparent insulating layer 63, etching may be conducted by using the organic insulating layer 64 as a mask, thus making it unnecessary to separately provide a mask for the only sake of forming the opening 63a in the transparent insulating layer 63, whereby the number of masks can be reduced.

A vertical alignment film 15 is formed so as to cover the first electrode 11 and the second electrode 12.

Figure 23:
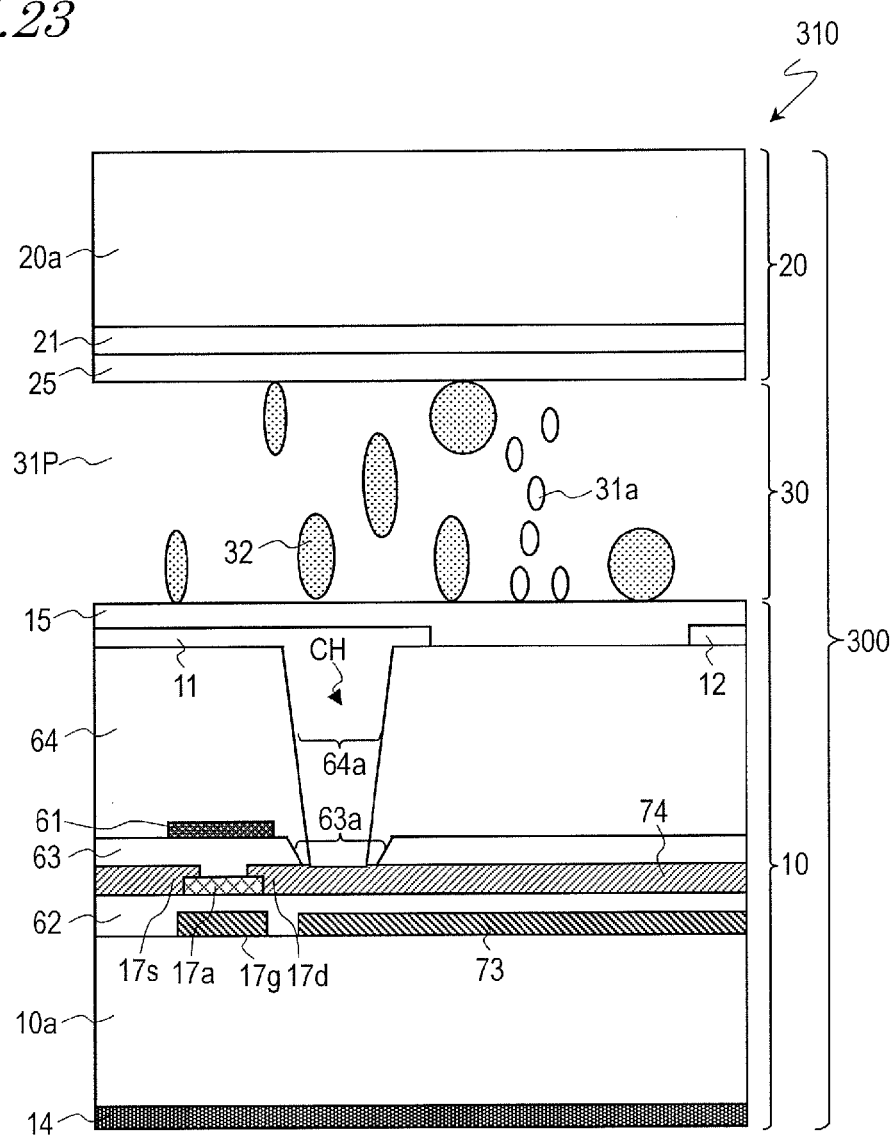
FIG. 23 A diagram showing another construction of the display device 310, which is a cross-sectional view taken along line A-A' in FIG. 18.

FIG. 23 shows another example of the multilayer structure on the substrate 10a. In the structure shown in FIG. 23, after forming the opening 63a in the transparent insulating layer 63 by etching, a film of photosensitive resin to become the organic insulating layer 64 is formed.

Note that the semiconductor layer 17a may be an oxide semiconductor layer which is made of an oxide semiconductor. The oxide semiconductor layer contains an In—Ga—Zn—O-type semiconductor, for example. Herein, the In—Ga—Zn—O-type semiconductor is a ternary oxide of In (indium), Ga (gallium), and Zn (zinc); there is no particular limitation as to the proportion (composition ratio) of In, Ga, and Zn; examples thereof include In:Ga:Zn=2:2:1, In:Ga:Zn=1:1:1, In:Ga:Zn=1:1:2, and so on. The In—Ga—Zn—O-type semiconductor may be amorphous or crystalline. As crystalline In—Ga—Zn—O-type semiconductors, those in which the c axis is essentially vertically aligned with respect to the layer plane are preferable. The crystal structure of such an In—Ga—Zn—O-type semiconductor is disclosed in Japanese Laid-Open Patent Publication No. 2012-134475, for example. The entire disclosure of Japanese Laid-Open Patent Publication No. 2012-134475 is incorporated herein by reference. A TFT that includes an In—Ga—Zn—O-type semiconductor layer has a high mobility (20 times that of a-SiTFT or greater) and a low leak current (less than 1/100 of that of a-SiTFT). Therefore, when an oxide semiconductor layer made of an In—Ga—Zn—O-type semiconductor is used as the semiconductor layer 17a, the first TFT 17A and the second TFT 17B have little off-leak, so that greater memory ability is realized, and further reduction in power consumption can be attained.

Note that the oxide semiconductor layer is not limited to an In—Ga—Zn—O-type semiconductor layer. The oxide semiconductor layer may contain a Zn—O-type semiconductor (ZnO), an In—Zn—O-type semiconductor (IZO), a Zn—Ti—O-type semiconductor (ZTO), a Cd—Ge—O-type semiconductor, a Cd—Pb—O-type semiconductor, an In—

Sn—Zn—O-type semiconductor (e.g. $In_2O_3$—$SnO_2$—ZnO), an In—Ga—Sn—O-type semiconductor, or the like, for example.

Figure 24:
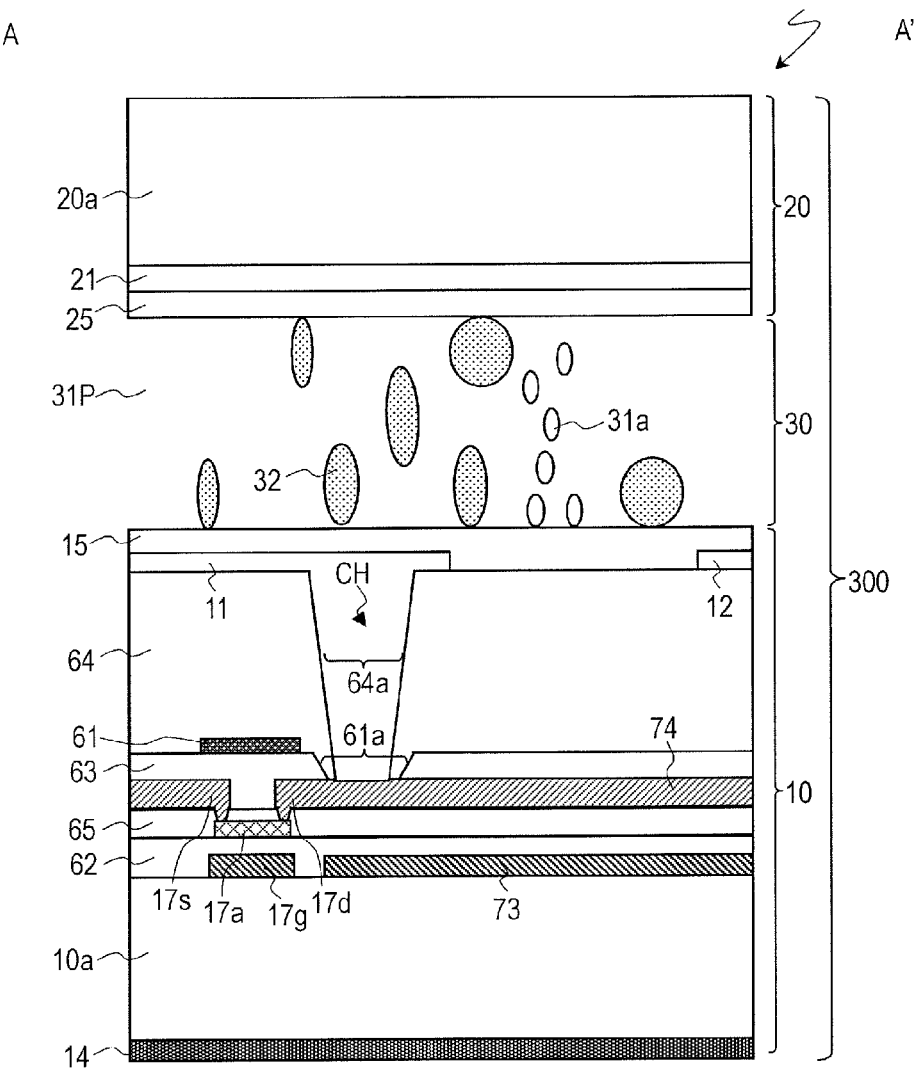
FIG. 24 A diagram showing still another construction of the display device 310, which is a cross-sectional view taken along line A-A' in FIG. 18.

FIG. 24 shows still another example of the multilayer structure on the substrate 10a. In the structure shown in FIG. 24, a further transparent insulating layer (etching stopper film) 65 is provided between the semiconductor layer 17a and the source electrode 17s, drain electrode 17d, etc. The source electrode 17s and the drain electrode 17d are connected to the source region and the drain region of the semiconductor layer 17a within a contact hole which is formed in the transparent insulating layer 65. By adopting this structure, it becomes possible to protect the semiconductor layer 17a from damage resulting from etching when forming the source electrode 17s, drain electrode 17d, etc., whereby the characteristics of the first TFT 17A and the second TFT 17B can be improved. This structure is effective in the case where the semiconductor layer 17a is an oxide semiconductor layer.

Moreover, as in the present embodiment, using spiral electrodes (see FIG. 20) as the first electrode 11 and the second electrode 12 provides an advantage of achieving brighter displaying over the case of using interdigitated electrodes (see FIG. 2). Hereinafter, the reasons thereof will be described with reference to FIGS. 25(a) and (b).

When not only the first electrode 11 and the second electrode 12 of a given pixel, but also the first electrode 11 and the second electrode 12 of a pixel adjoining that pixel is to be considered, if the first electrode 11 and the second electrode 12 are interdigitated electrodes, as shown in FIG. 25(a), regions where first electrodes 11 oppose each other or second electrodes 12 oppose each other (regions surrounded by broken lines in FIG. 25(a)) exist at positions that correspond to almost one side of the four sides of the pixel. Such regions are regions where a lateral field cannot be applied, thus serving to lower the brightness of displaying. On the other hand, if the first electrode 11 and the second electrode 12 are spiral electrodes, as shown in FIG. 25(b), regions where first electrodes 11 oppose each other or second electrodes 12 oppose each other (regions surrounded by broken lines in FIG. 25(b)) only exist at positions corresponding to the four corners of the pixel, whereby brighter displaying can be performed.

Figure 26:
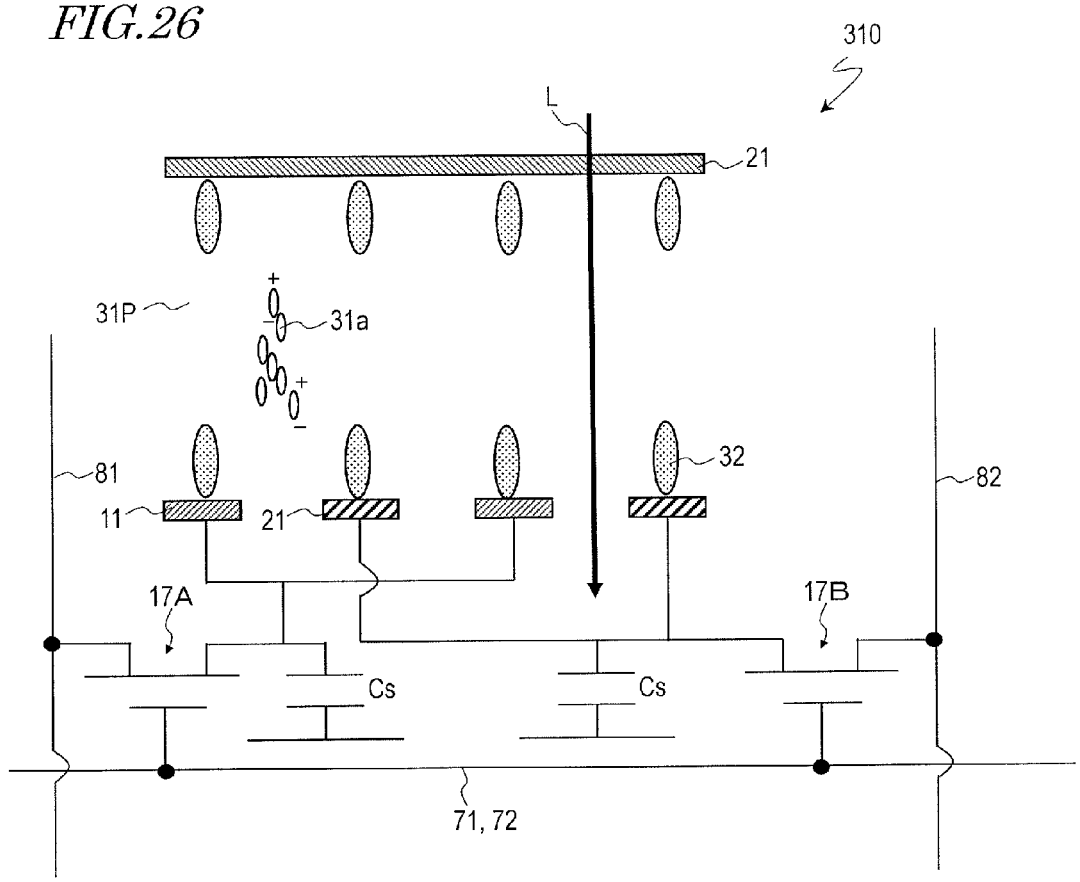
FIG. 26 A diagram showing the display device 310 when a longitudinal field is being applied to the optical layer 30.
Figure 27:
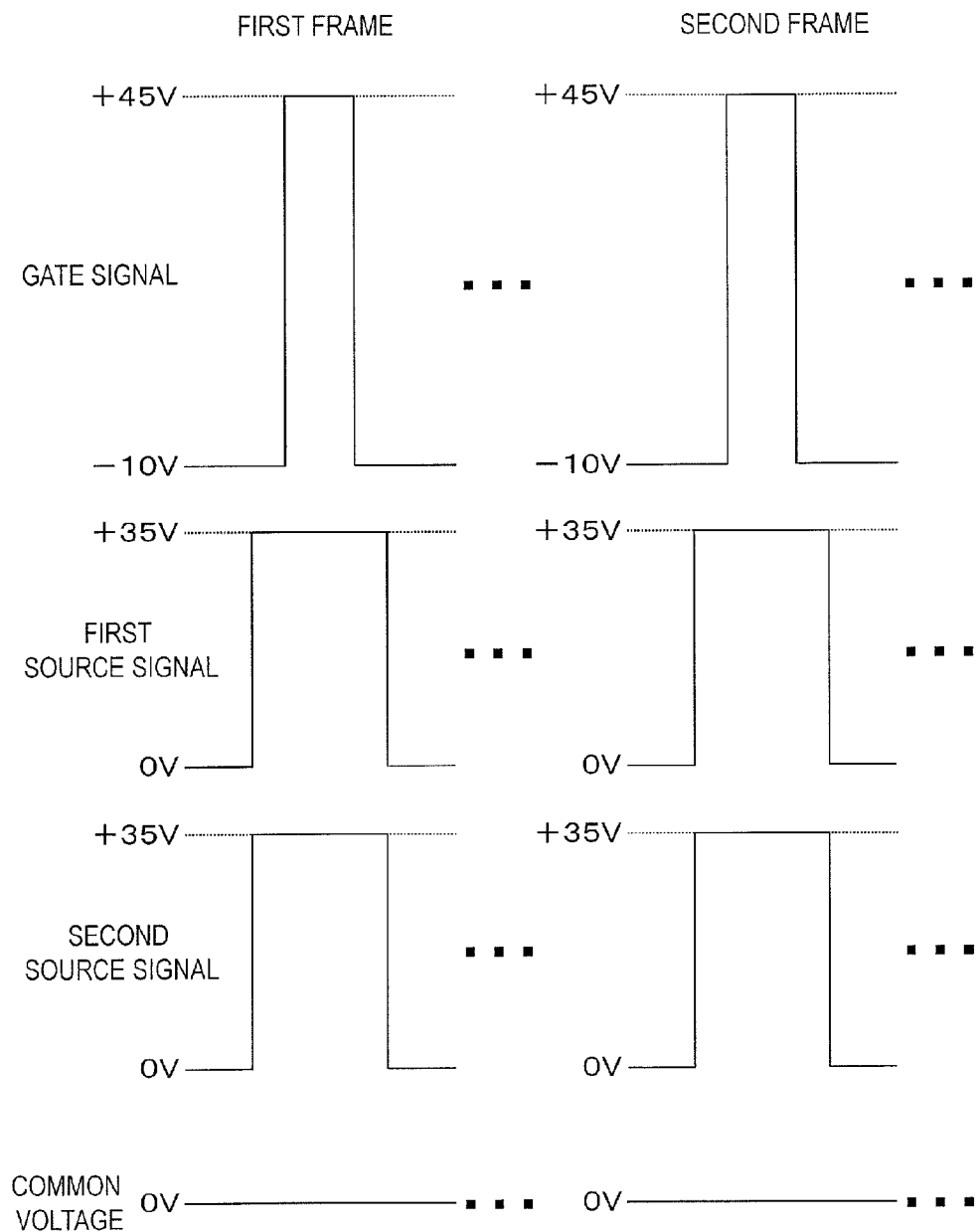
FIG. 27 A diagram showing signal waveforms of a gate signal, a first source signal, a second source signal, and common voltage in the case where a longitudinal field is to be applied to the optical layer 30 of the display device 310.
Figure 28:
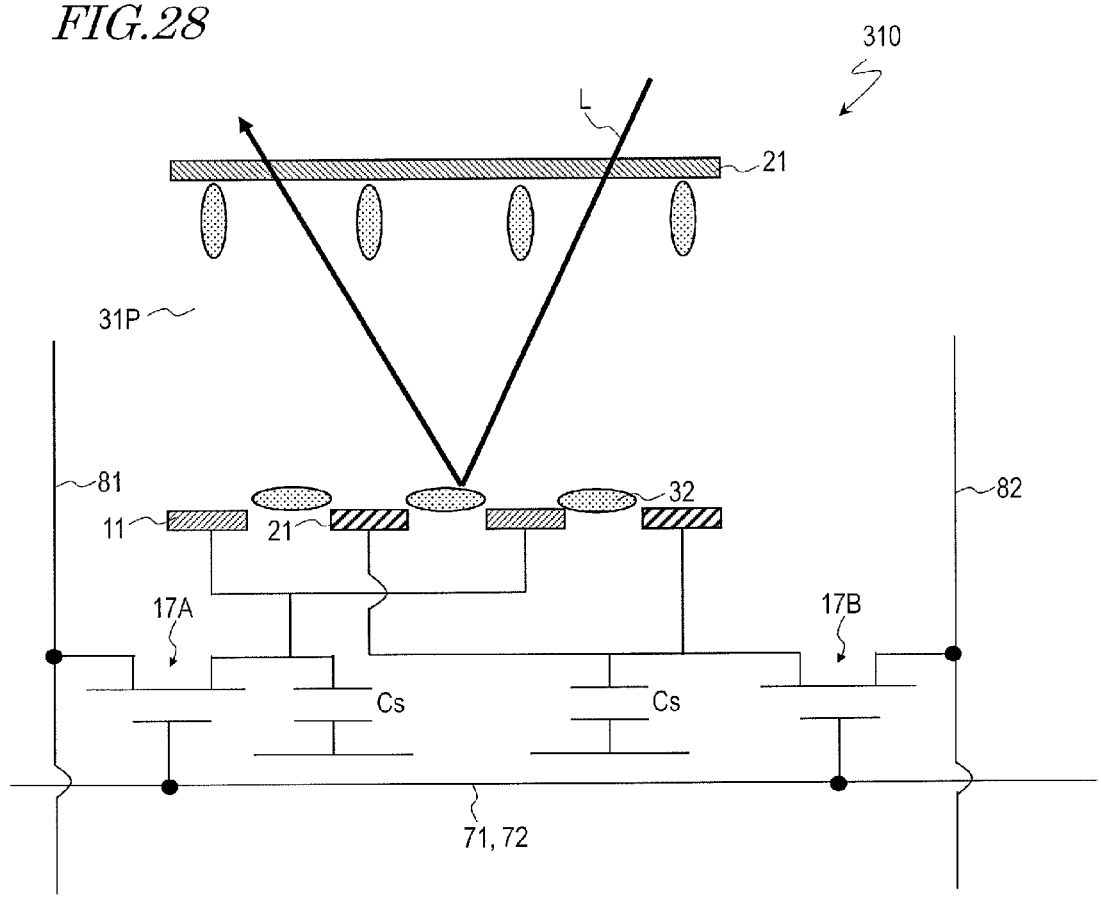
FIG. 28 A diagram showing the display device 310 when a lateral field is being applied to the optical layer 30.
Figure 29:
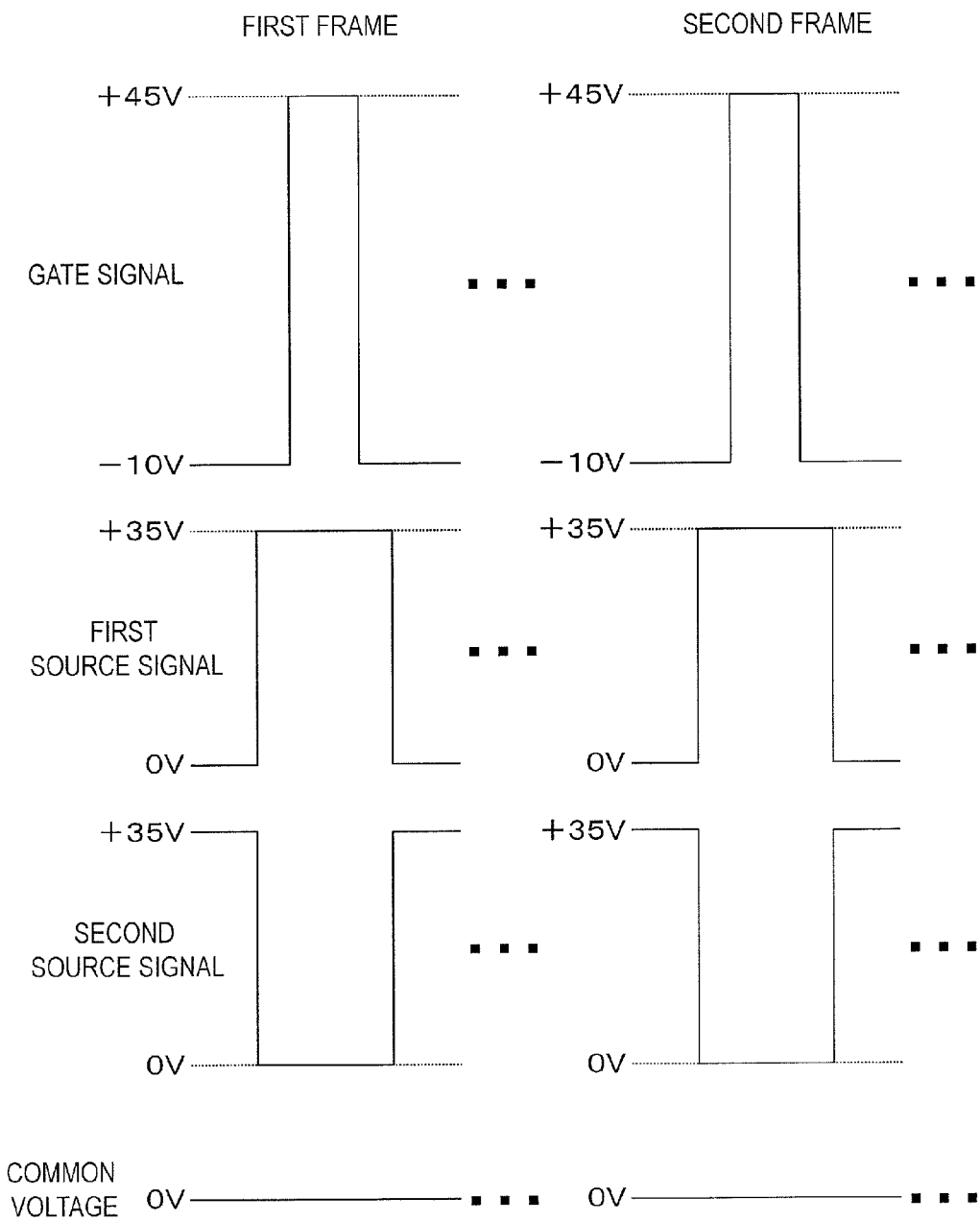
FIG. 29 A diagram showing signal waveforms of a gate signal, a first source signal, a second source signal, and common voltage in the case where a lateral field is to be applied to the optical layer 30 of display device 310.

Next, with reference to FIG. 26 to FIG. 29, a first example of a driving method for the display device 310 will be described. FIG. 26 is a diagram showing the display device 310 when a longitudinal field is being applied to the optical layer 30. FIG. 27 is a diagram in the case where a longitudinal field is to be applied to the optical layer 30, showing the signal waveforms of: a gate signal which is supplied from the first gate line 71 and the second gate line 72, a source signal (first source signal) which is supplied from the first source line 81, a source signal (second source signal) which is supplied from the second source line 82, and a common voltage (Vcom) which is applied to the third electrode 21. FIG. 28 is a diagram showing the display device 310 when a lateral field is being applied to the optical layer 30. FIG. 29 is a diagram showing signal waveforms of a gate signal, a first source signal, a second source signal, and common voltage when a lateral field is to be applied to the optical layer 30.

In the case where a longitudinal field is to be applied to the optical layer 30 (i.e., performing black displaying), in the example shown in FIG. 27, the low level of the gate signal is −10 V, and the high level is +45 V. The first source signal and the second source signal which are supplied when the first TFT 17A and the second TFT 17B is in an ON state (i.e., the gate signal is at the high level) are +35 V in both of a first frame and a second frame. The common voltage is 0 V in both of the first frame and the second frame. In the case of performing gray scale displaying, the first source signal and the second source signal may be varied within the range from 0 V to +35 V (excluding 0 V and +35 V).

In the case where a lateral field is to be applied to the optical layer 30 (i.e., performing white displaying), in the example shown in FIG. 29, the low level of the gate signal is −10 V, and the high level is +45 V. Moreover, the first source signal to be supplied when the first TFT 17A is in an ON state is +35 V in both of the first frame and the second frame, and the second source signal to be supplied when the second TFT 17B is in an ON state is 0 V in both of the first frame and the second frame. The common voltage is 0 V in both of the first frame and the second frame. Note that gray scale displaying can be performed by varying the first source signal within the range from 0 V to +35 V (excluding 0 V and +35 V). Moreover, the source signals in the case where the first TFT 17A and the second TFT 17B are in an OFF state (OFF period) do not affect the voltages of the first electrode 11 and the second electrode 12; therefore, for example, the second source signal does not need to be +35 V during the OFF period indicated in FIG. 29, but may be any level within the range from 0 V to +35 V, for example, or 0 V in order to achieve low voltage configuration. This similarly applies to the examples illustrated hereinbelow.

Since the display device 310 has memory ability, supply of voltage may be stopped after performing the driving illustrated in FIG. 27 and FIG. 29.

Figure 30:
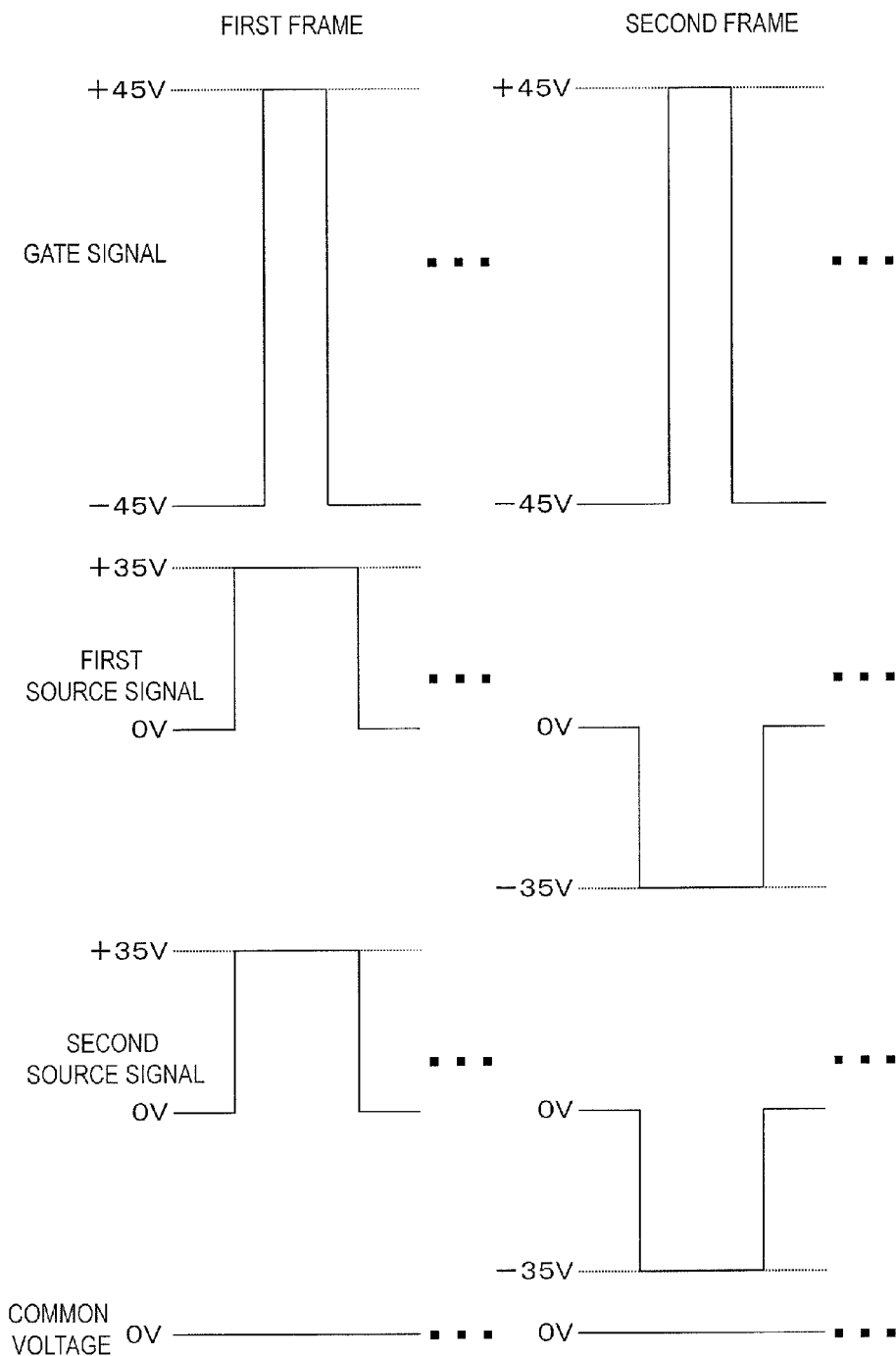
FIG. 30 A diagram showing signal waveforms of a gate signal, a first source signal, a second source signal, and common voltage in the case where a longitudinal field is to be applied to the optical layer 30 of the display device 310.
Figure 31:
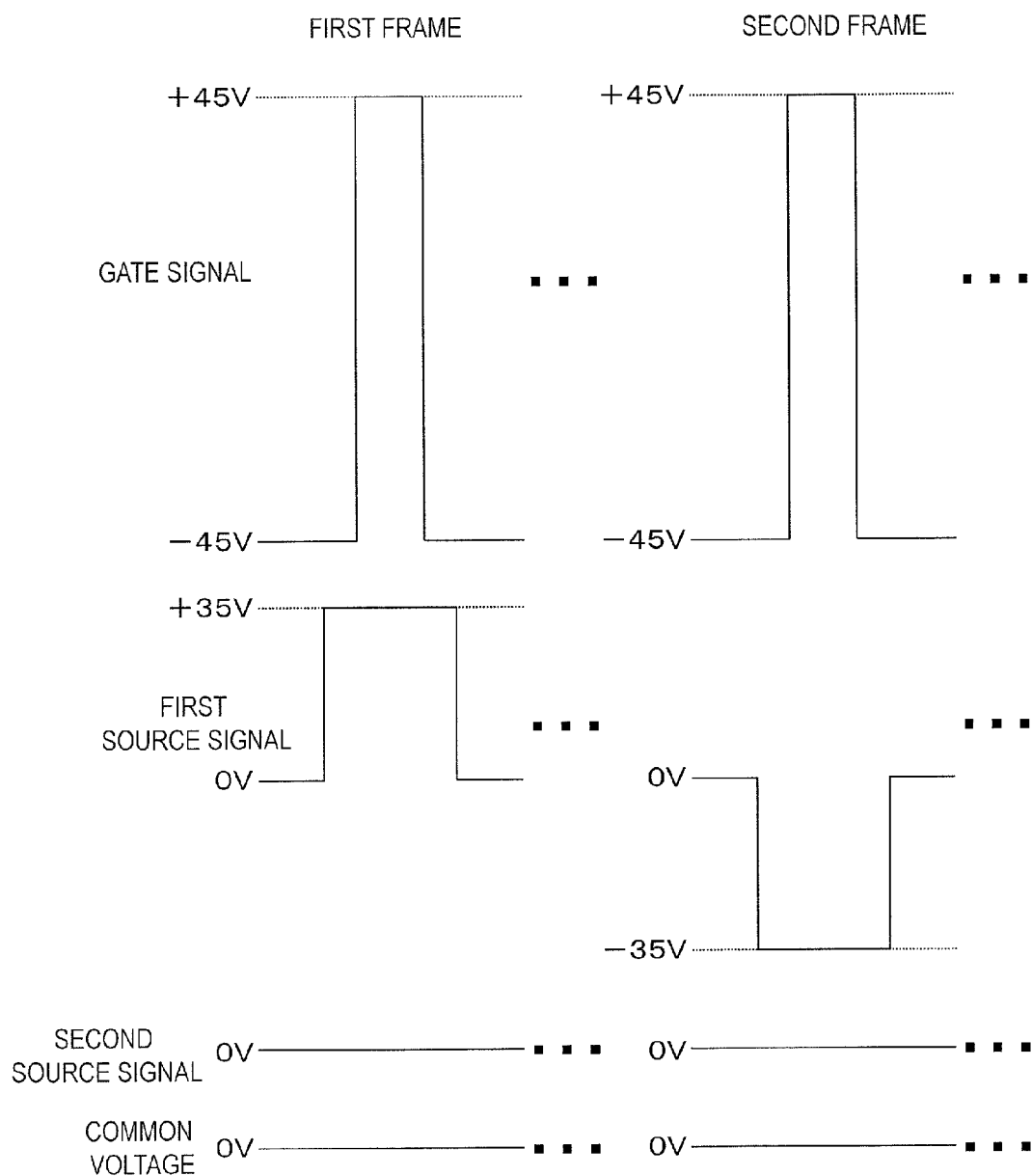
FIG. 31 A diagram showing signal waveforms of a gate signal, a first source signal, a second source signal, and common voltage in the case where a lateral field is to be applied to the optical layer 30 of display device 310.

Next, with reference to FIG. 30 and FIG. 31, a second example of the driving method will be described. FIG. 30 is a diagram showing signal waveforms of a gate signal, a first source signal, a second source signal, and common voltage in the case where a longitudinal field is to be applied to the optical layer 30. FIG. 31 is a diagram showing signal waveforms of a gate signal, a first source signal, a second source signal, and common voltage in the case where a lateral field is to be applied to the optical layer 30.

In the case where a longitudinal field is to be applied to the optical layer 30 (i.e., performing black displaying), in the example shown in FIG. 30, the low level of the gate signal is −45 V, and the high level is +45 V. Moreover, the first source signal and the second source signal to be supplied when the first TFT 17A and the second TFT 17B is in an ON state (i.e., the gate signal is at the high level) are +35 V in the first frame, and −35 V in the second frame. The common voltage is 0 V in both of the first frame and the second frame. In the case of performing gray scale displaying, the first source signal and the second source signal may be varied within the range from 0 V to ±35 V (excluding 0 V and ±35 V).

In the case where a lateral field is to be applied to the optical layer 30 (i.e., performing white displaying), in the example shown in FIG. 31, the low level of the gate signal is −45 V, and the high level is +45 V. Moreover, the first source signal to be supplied when the first TFT 17A is in an ON state is +35 V in the first frame, and −35 V in the second frame. On the other hand, the second source signal to be supplied when the second TFT 17B is in an ON state is 0 V in both of the first frame and the second frame. The common voltage is 0 V in both of the first frame and the second frame. Note that gray scale displaying can be performed by varying the first source signal within the range from 0 V to ±35 V (excluding 0 V and ±35 V).

Since the display device 310 has memory ability, supply of voltage may be stopped after performing the driving illustrated in FIG. 30 and FIG. 31 for a predetermined period.

In the second example, where the polarities of the voltages (source signals) which are supplied to the TFTs 17A and 17B from the source lines 81 and 82 are inverted with a predetermined cycle, deterioration in the liquid crystal material which is the medium 31P can be suppressed.

Figure 32:
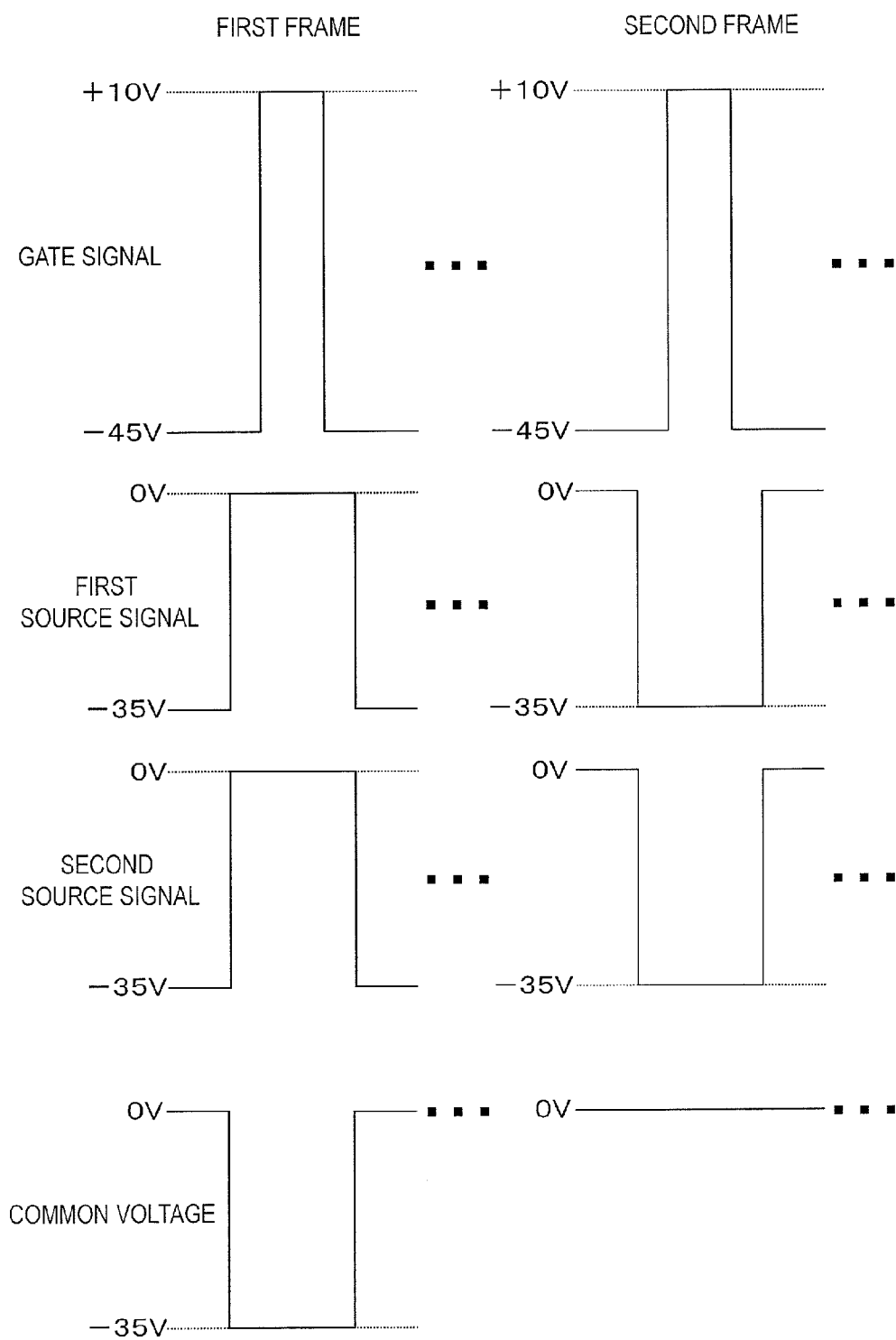
FIG. 32 A diagram showing signal waveforms of a gate signal, a first source signal, a second source signal, and common voltage in the case where a longitudinal field is to be applied to the optical layer 30 of the display device 310.
Figure 33:
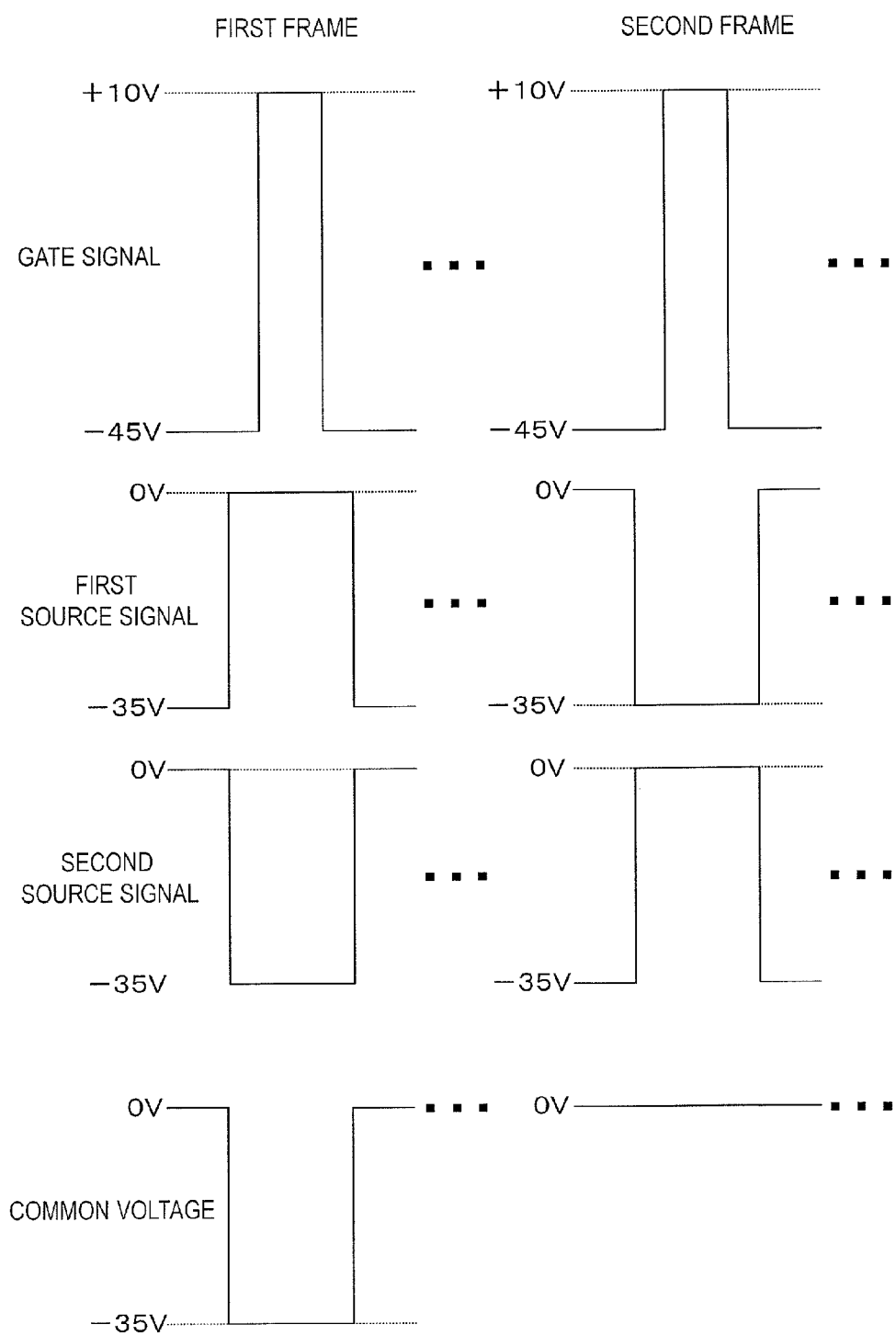
FIG. 33 A diagram showing signal waveforms of a gate signal, a first source signal, a second source signal, and common voltage in the case where a lateral field is to be applied to the optical layer 30 of display device 310.

Next, with reference to FIG. 32 and FIG. 33, a third example of the driving method will be described. FIG. 32 is a diagram showing signal waveforms of a gate signal, a first source signal, a second source signal, and common voltage in the case where a longitudinal field is to be applied to the optical layer 30. FIG. 33 is a diagram showing signal waveforms of a gate signal, a first source signal, a second source signal, and common voltage in the case where a lateral field is to be applied to the optical layer 30.

In the case where a longitudinal field is to be applied to the optical layer 30 (i.e., performing black displaying), in the example shown in FIG. 32, the low level of the gate signal is −45 V, and the high level is +10 V. Moreover, the first source signal and the second source signal to be supplied when the first TFT 17A and the second TFT 17B are in an ON state (i.e., the gate signal is at the high level) are 0 V in the first frame, and −35 V in the second frame. The common voltage is −35 V in the first frame, and 0 V in the second frame. In the case of performing gray scale displaying, the first source signal and the second source signal may be varied within the range from −35 V to 0 V (excluding −35 V and 0 V).

In the case where a lateral field is to be applied to the optical layer 30 (i.e., performing white displaying), in the example shown in FIG. 33, the low level of the gate signal is −45 V, and the high level is +10 V. Moreover, the first source signal to be supplied when the first TFT 17A is in an ON state is 0 V in the first frame, and −35 V in the second frame. On the other hand, the second source signal to be supplied when the second TFT 17B is in an ON state is −35 V in the first frame, and 0 V in the second frame. The common voltage is −35 V in the first frame, and 0 V in the second frame. Note that gray scale displaying can be performed by varying the first source signal and the second source signal within the range from −35 V to 0 V (excluding −35 V and 0 V).

Since the display device 310 has memory ability, supply of voltage may be stopped after performing the driving illustrated in FIG. 32 and FIG. 33 for a predetermined period.

In the third example, the polarities of the voltages (source signals) which are supplied to the TFTs 17A and 17B from the source lines 81 and 82 are inverted with a predetermined cycle, and also the polarity of the voltage (common voltage) which is supplied to the third electrode 13 is inverted with the predetermined cycle. As a result, deterioration in the liquid crystal material which is the medium 31P can be suppressed while keeping the source signals at low amplitude. This permits even lower power consumption.

In the present specification, to "invert voltage polarity" also encompasses any voltage change from zero to a positive value (or a negative value), and any voltage change from a positive value (or a negative value) to zero.

Embodiment 4

Figure 34:
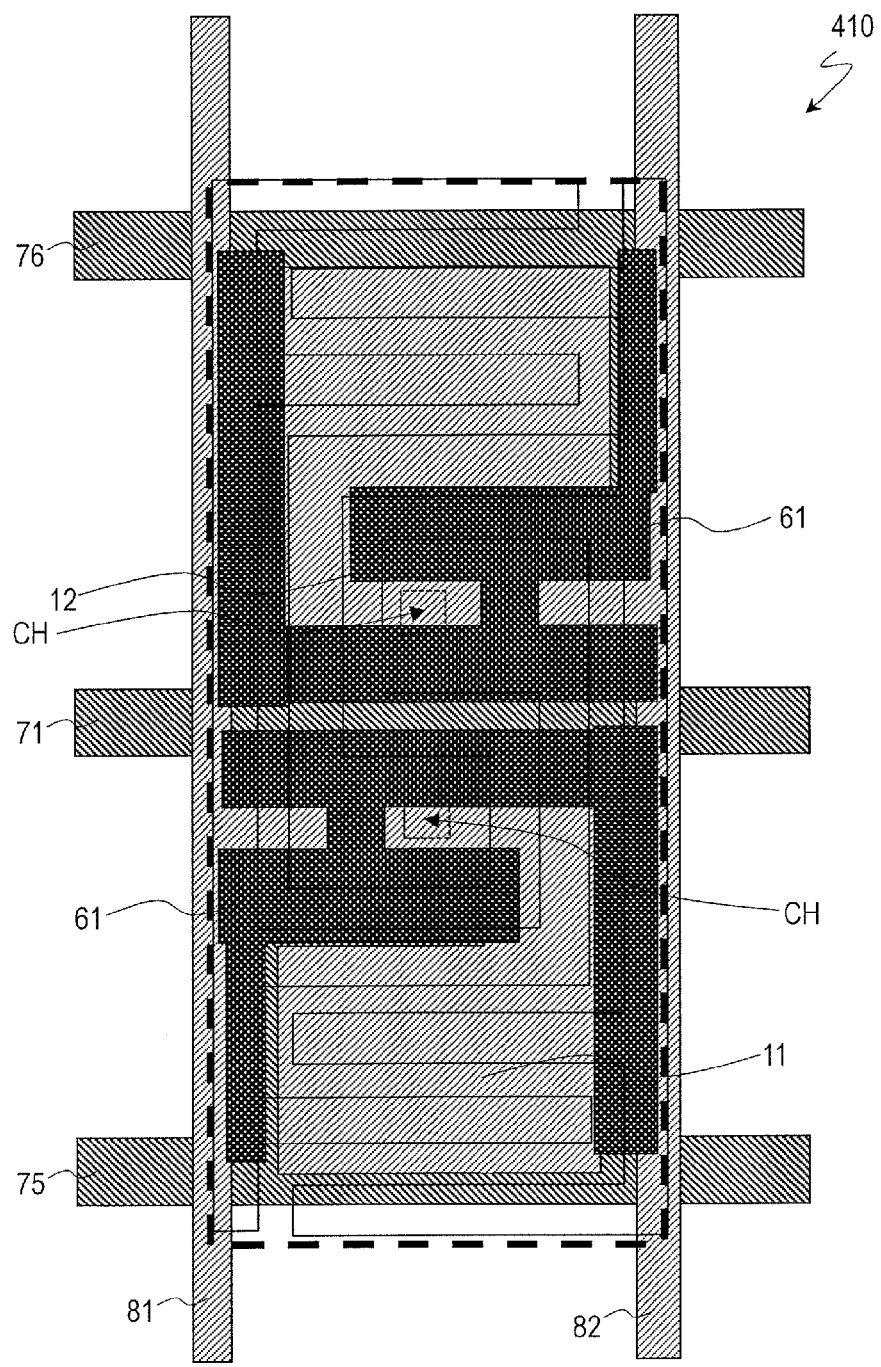
FIG. 34 A plan view schematically showing a pixel corresponding to one region of a display device 410 according to an embodiment of the present invention.
Figure 35:
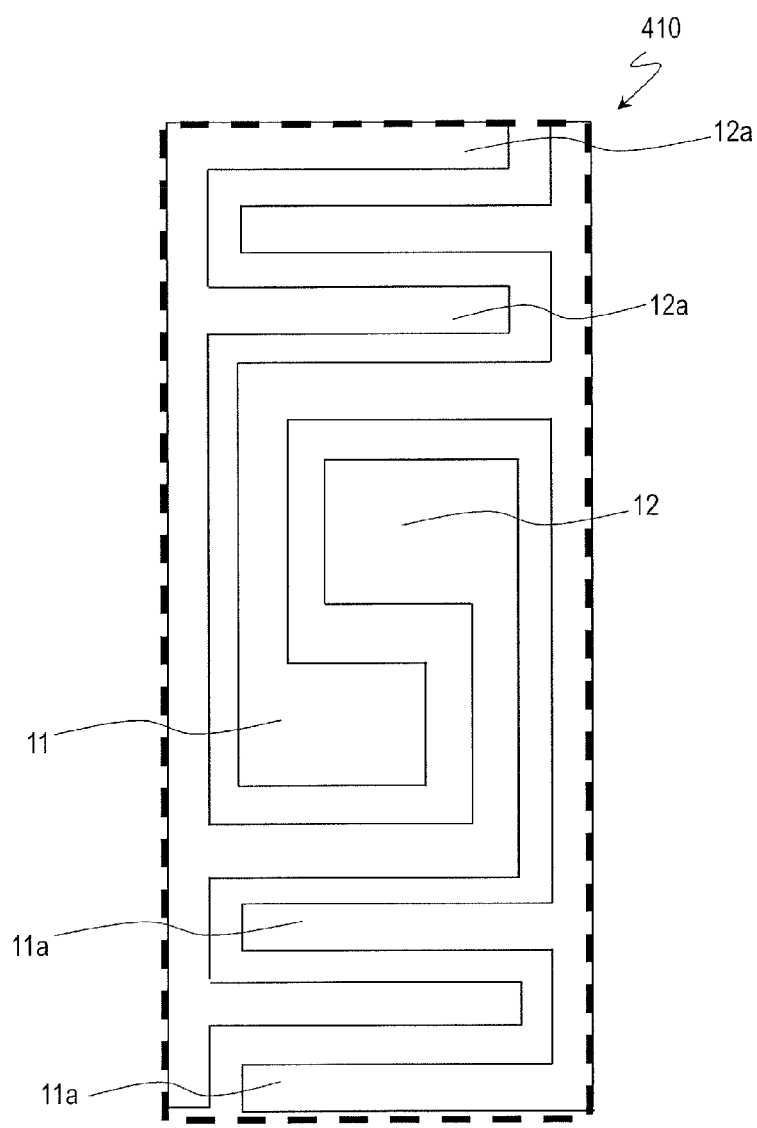
FIG. 35 A plan view showing only the first electrode 11 and the second electrode 12 among the component elements of the display device 410 shown in FIG. 34.
Figure 36:
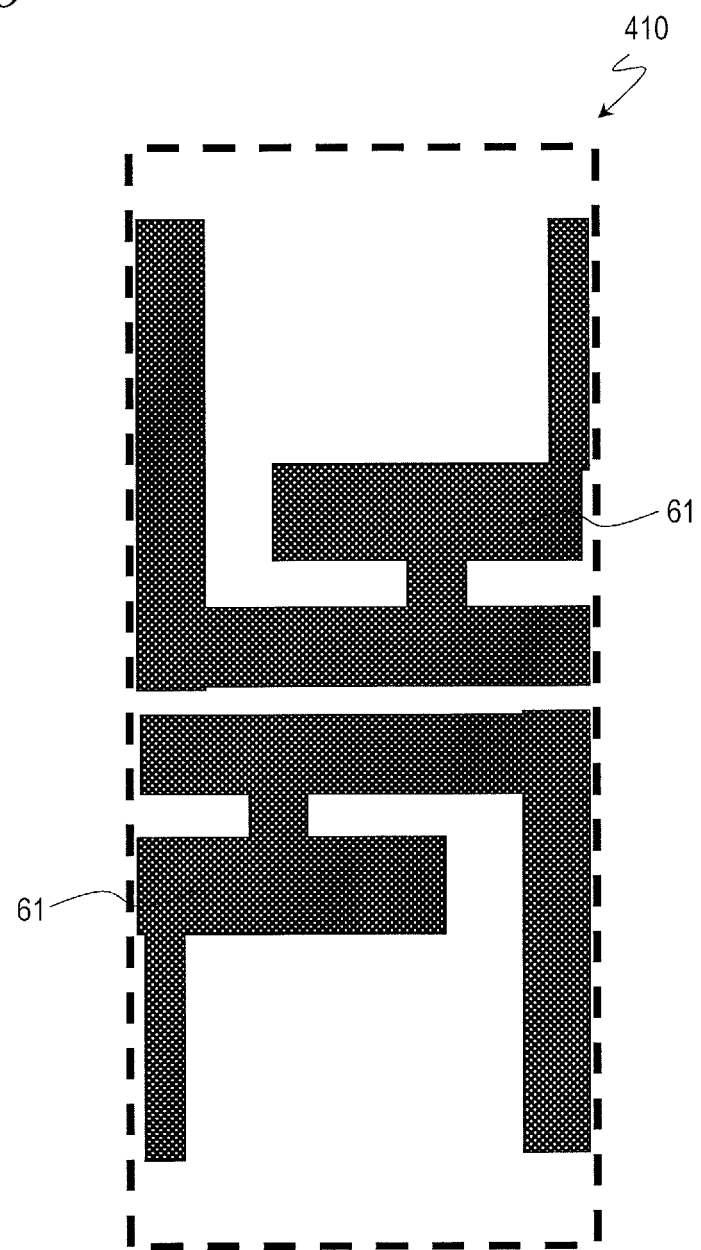
FIG. 36 A plan view showing only the light shielding layer 61 among the component elements of the display device 410 shown in FIG. 34.
Figure 37:
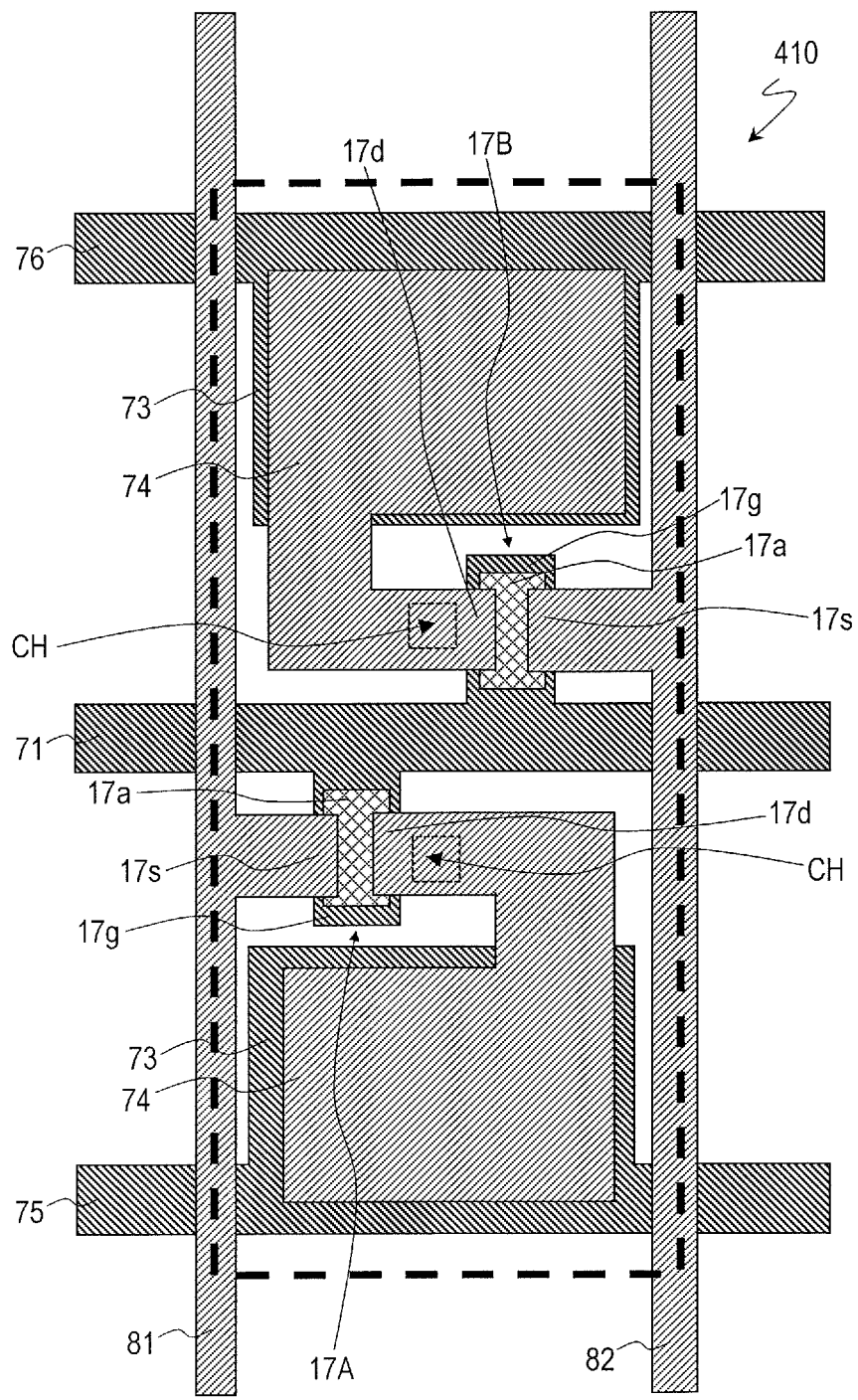
FIG. 37 A plan view showing anything other than the first electrode 11, the second electrode 12, and the light shielding layer 61 among the component elements of the display device 410 shown in FIG. 34.

With reference to FIG. 34 to FIG. 37, a display device 410 according to the present embodiment will be described. FIG. 34 is a plan view schematically showing a pixel corresponding to one region of the display device 410. FIG. 35 is a plan view showing only the first electrode 11 and the second electrode 12 among the component elements shown in FIG. 34. FIG. 36 is a plan view showing only the light shielding layer 61 among the component elements shown in FIG. 34. FIG. 37 is a plan view showing anything other than the first electrode 11, the second electrode 12, and the light shielding layer 61 among the component elements shown in FIG. 34.

As shown in FIG. 34 and FIG. 37, the display device 410 differs from the display device 310 of Embodiment 3 in that only one gate line 71 is provided for each pixel row. The gate line 71 traverses the center of the pixel. In the display device 410, because of the different positioning of the gate line 71, the first TFT 17A and the second TFT 17B are also positioned differently from those in the display device 310 of Embodiment 3, as will be seen from FIG. 37. Furthermore, in the display device 410, as will be seen from FIG. 35 and FIG. 36, the shapes of the first electrode 11 and the second electrode 12 and the positioning of the light shielding layer 61 are also different from those in the display device 310 of Embodiment 3.

Thus, there may only be one gate line 71 provided for each pixel row. In this case, the footprint of the wiring lines within the pixel is reduced as compared to a construction where two gate lines 71 and 72 are provided for each pixel row, thereby allowing a large geometric area for the storage capacitor Cs. Moreover, in a construction where two gate lines 71 and 72 are provided for each pixel row, a discrepancy in signal delay may possibly occur between the gate lines 71 and 72, due to fluctuations of line widths between the two gate lines 71 and 72 or the like. Such a problem will not occur in a construction where there is only one gate line 71 provided for each pixel row.

Moreover, in a construction where two gate lines 71 and 72 are provided for each pixel row, four (i.e., two sides×2) end faces (i.e., end faces extending along the length direction) of the gate lines 71 and 72 exist for each pixel row, thus resulting in large fluctuations in the etching amount when forming the gate lines 71 and 72 through patterning. On the other hand, in a construction where there is only one gate line 71 provided for each pixel row, there are two end faces of the gate line 71 for each pixel row, so that the aforementioned fluctuations in the etching amount are small.

Moreover, as shown in FIG. 35, when the first electrode 11 and the second electrode 12 of adjoining pixels are also taken into consideration, the first electrode 11 and the second electrode 12 according to the present embodiment are shaped so that regions where first electrodes 11 oppose each other or second electrodes 12 oppose each other only exist at positions corresponding to the four corners of the pixel; therefore, brighter displaying can be performed as in the case of using spiral electrodes as shown in FIG. 20. For example, in the case where white displaying is performed in all pixels, a large number of anisotropically-shaped particles 32 existing in between pixels can be horizontally aligned, thereby preventing dark lines from occurring.

Embodiment 5

Figure 38:
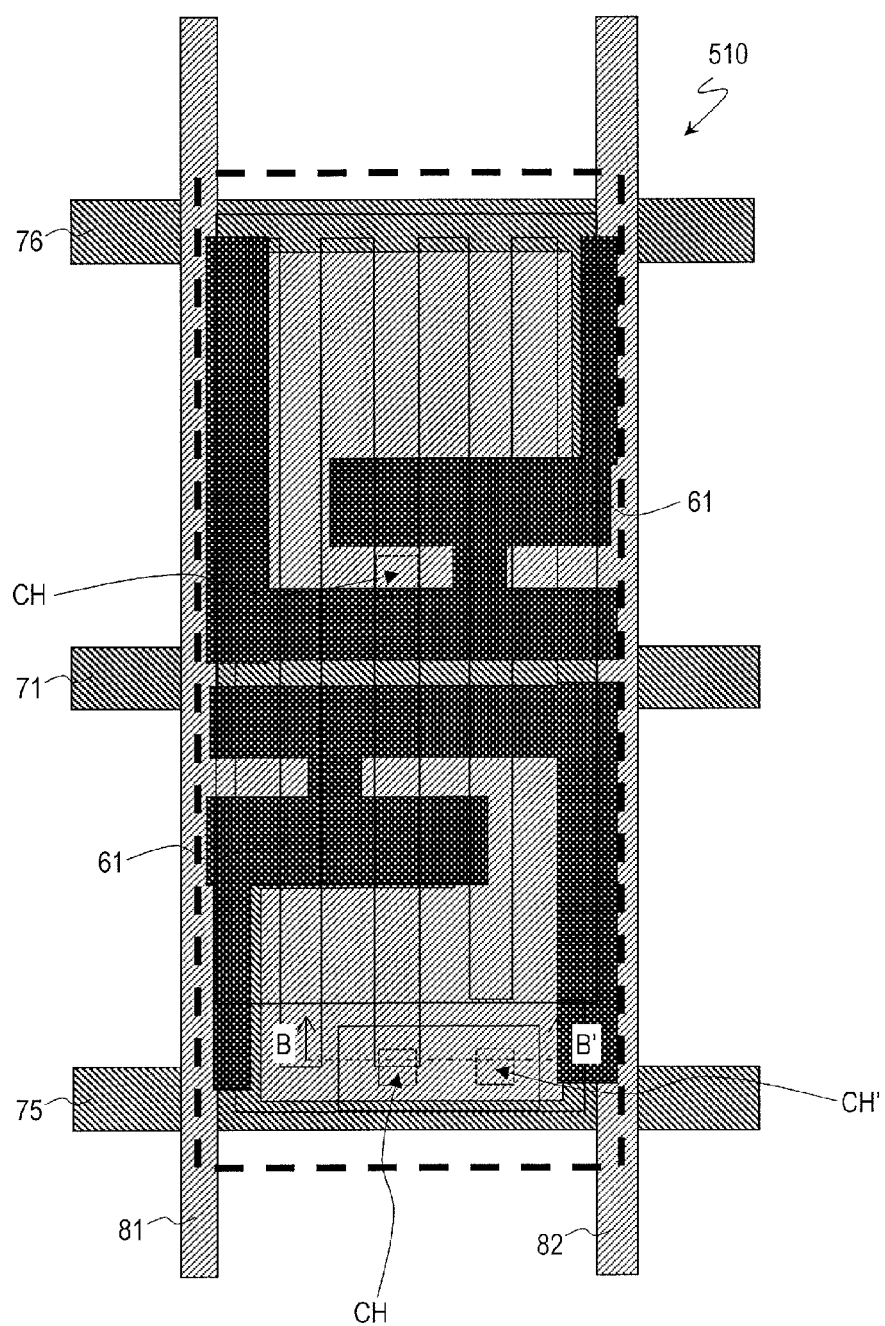
FIG. 38 A plan view schematically showing a pixel corresponding to one region of a display device 510 according to an embodiment of the present invention.
Figure 39:
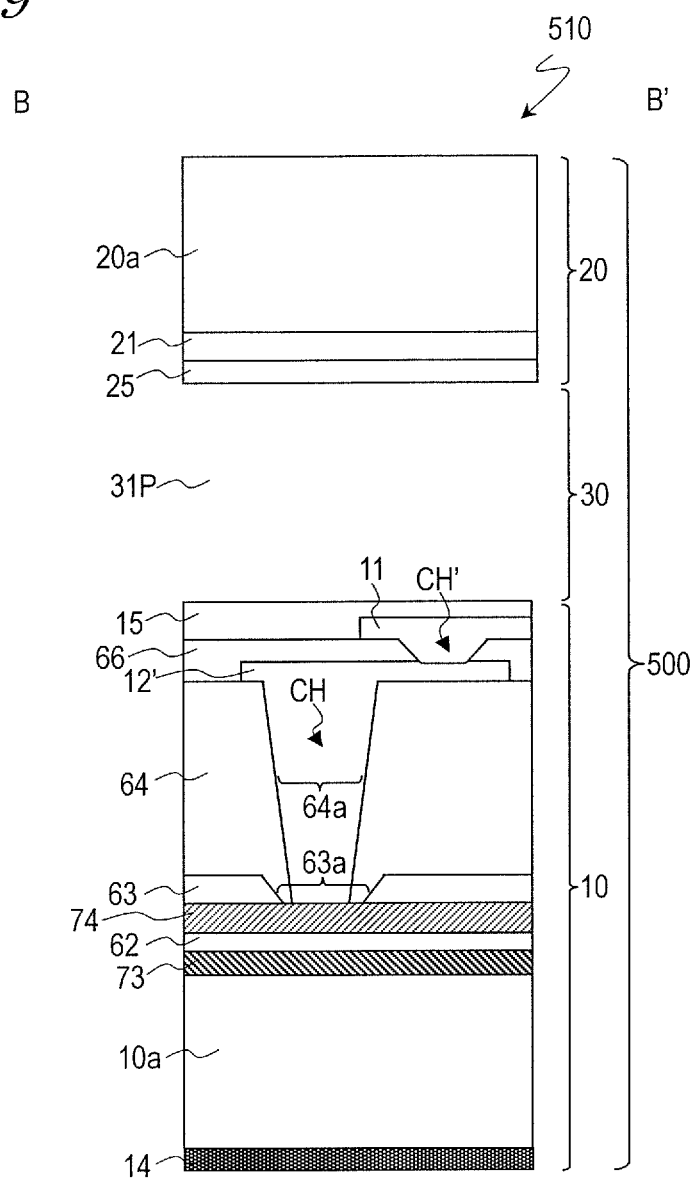
FIG. 39 A cross-sectional view taken along line B-B' in FIG. 38.
Figure 40:
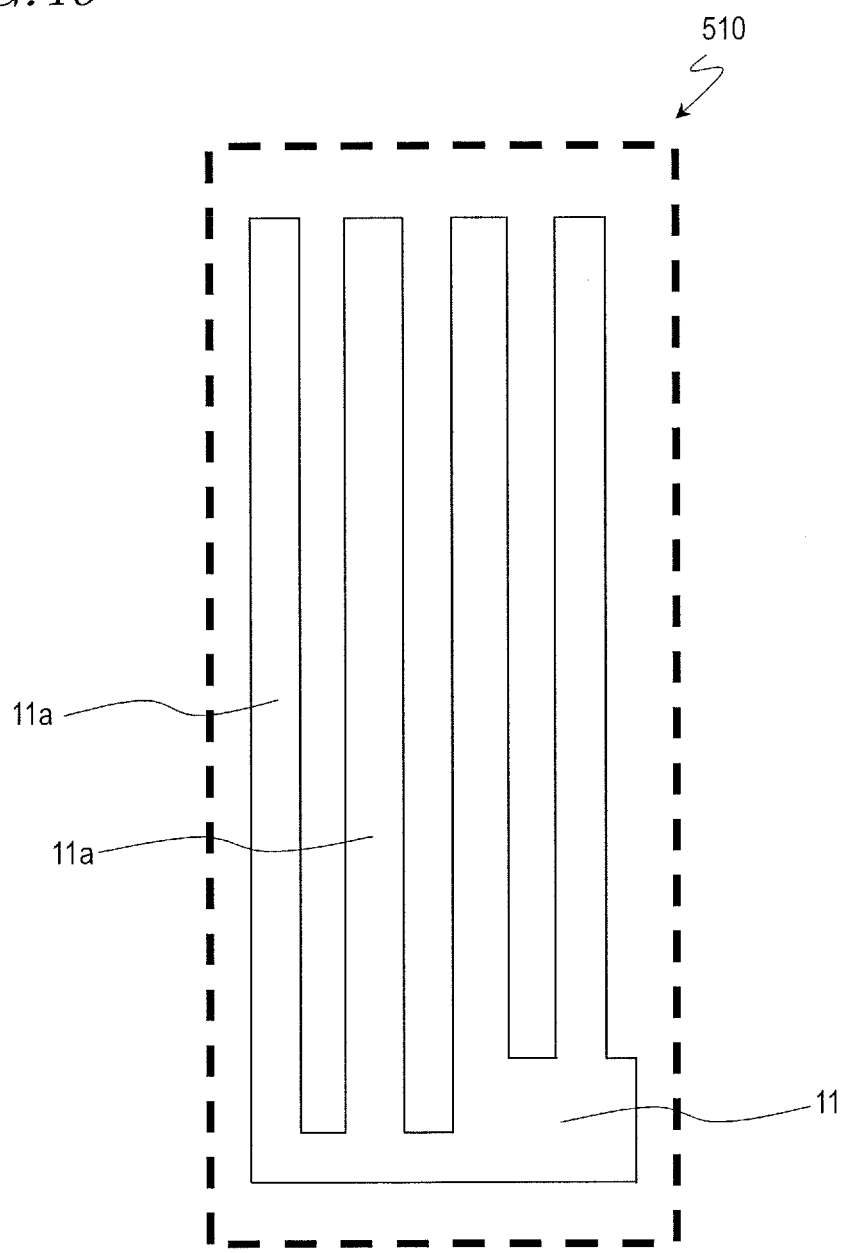
FIG. 40 A plan view showing only the first electrode 11 among the component elements of the display device 510 shown in FIG. 38.
Figure 41:
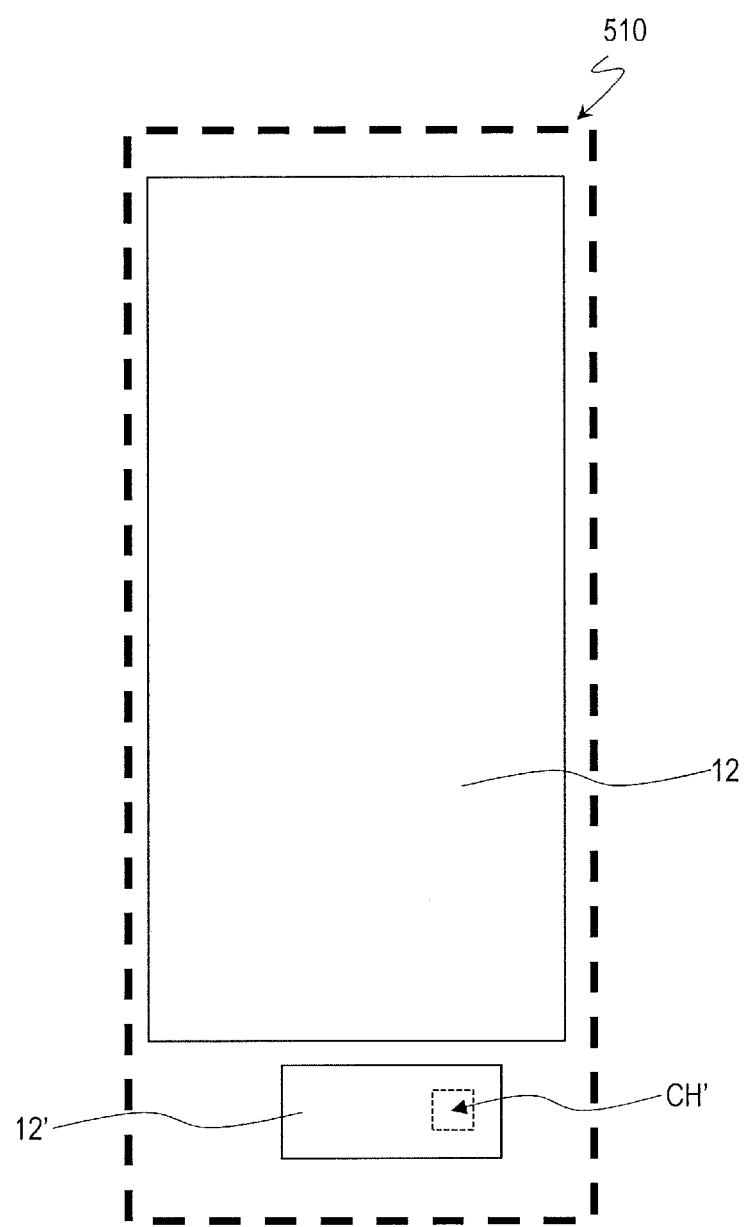
FIG. 41 A plan view showing only the second electrode 12 and a connection electrode 12' among the component elements of the display device 510 shown in FIG. 38.
Figure 42:
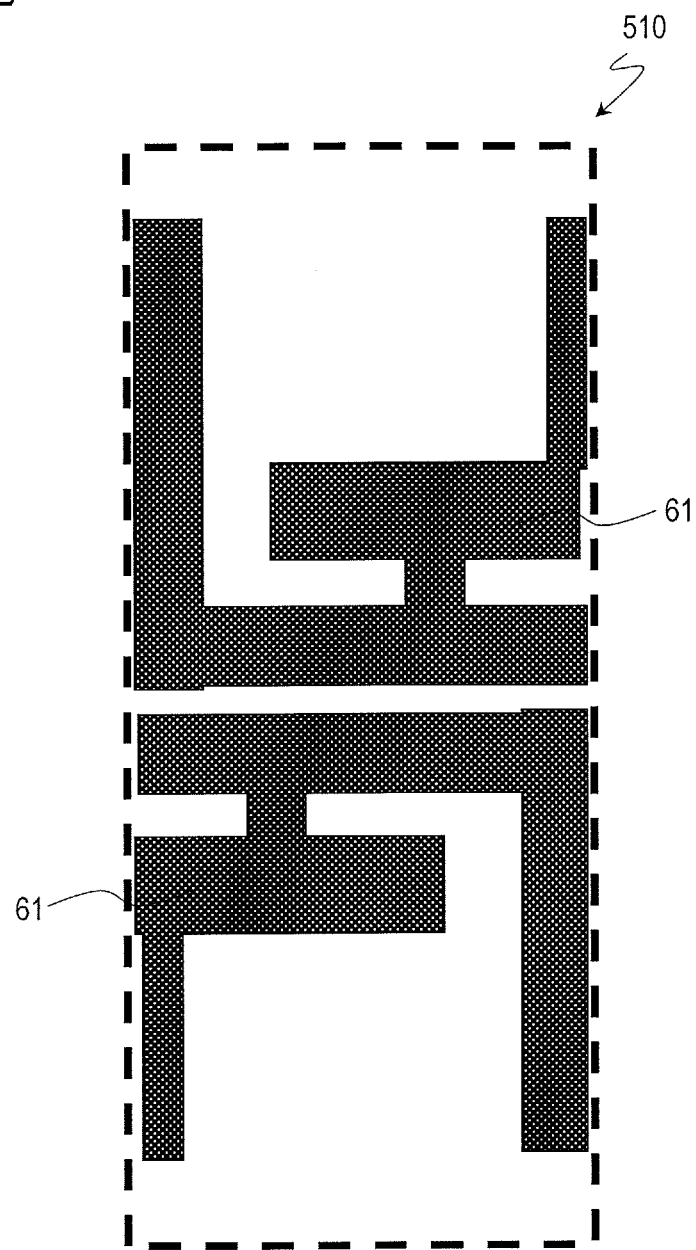
FIG. 42 A plan view showing only the light shielding layer 61 among the component elements shown in FIG. 38.
Figure 43:
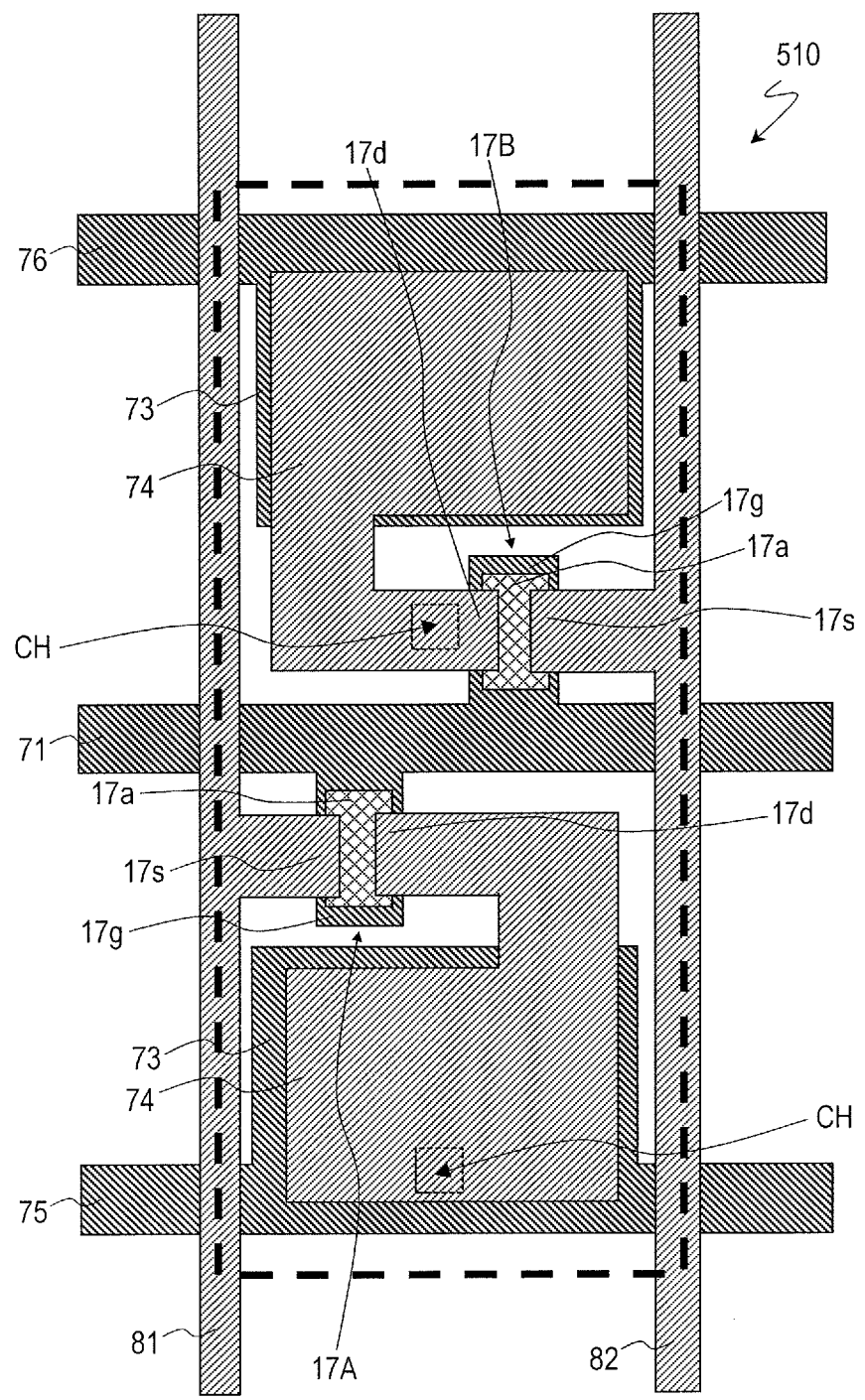
FIG. 43 A plan view showing anything other than the first electrode 11, the second electrode 12, the connection electrode 12', and the light shielding layer 61 among the component elements shown in FIG. 38.

With reference to FIG. 38 to FIG. 43, a display device 510 according to the present embodiment will be described. FIG. 38 is a plan view schematically showing a pixel corresponding to one region of the display device 510. FIG. 39 is a cross-sectional view taken along line B-B' in FIG. 38. FIG. 40 is a plan view showing only the first electrode 11 among the component elements shown in FIG. 38. FIG. 41 is a plan view showing only the second electrode 12 and a connection electrode 12' among the component elements shown in FIG. 38. FIG. 42 is a plan view showing only the light shielding layer 61 among the component elements shown in FIG. 38. FIG. 43 is a plan view showing anything other than the first electrode 11, the second electrode 12, the connection electrode 12', and the light shielding layer 61 among the component elements shown in FIG. 38.

In the display panels of the display devices 110 to 410 according to Embodiments 1 to 4, the first electrode 11 and the second electrode 12 are provided in the same level. That is, the first electrode 11 and the second electrode 12 are formed through the same step by using the same material.

On the other hand, in the display panel 500 of the display device 510 according to the present embodiment, as shown in FIG. 39, the first electrode 11 and the second electrode 12 are provided in different levels. That is, the first electrode 11 and the second electrode 12 are formed through different steps. Specifically, a dielectric layer (transparent insulating layer) 66 is provided so as to cover the second electrode 12, and the first electrode 11 is provided on the second electrode 12 via the dielectric layer 66. The dielectric layer 66 is an SiNx film having a thickness of 200 nm, for example.

The first electrode (upper electrode) 11 includes a plurality of branches 11a, as shown in FIG. 40. On the other hand, the second electrode (lower electrode) 12 is a so-called spread electrode, as shown in FIG. 41.

The first electrode 11 is electrically connected to the storage capacitor electrode 74 and the drain electrode 17d of the first TFT 17A via the connection electrode 12'. The connection electrode 12' is made of the same electrically conductive film as the second electrode 12 (i.e., through the same step as the second electrode 12), and is connected to the storage capacitor electrode 74 within a contact hole CH which is formed in the transparent insulating layer 63 and the organic insulating layer 64. The first electrode 11 is connected to the connection electrode 12' within a contact hole CH' which is formed in the dielectric layer 66.

In a construction where the first electrode 11 and the second electrode 12 are provided in the same level, e.g., the display devices 110 to 410 of Embodiments 1 to 4, there are relatively many regions where neither the first electrode 11 nor the second electrode 12 exists within the pixel when viewed from the normal direction of the substrate plane. In such regions, it is difficult to apply a longitudinal field near the interface between the first substrate 10 and the optical layer 30.

On the other hand, in a construction where the first electrode 11 is provided as the upper electrode and the second electrode 12 as the lower electrode, e.g., the display device 510 of the present embodiment, the regions where neither the first electrode 11 nor the second electrode 12 exists within the pixel when viewed from the normal direction of the substrate plane can be made fewer (i.e., the second electrode 12 may be a spread electrode). This provides an advantage in that a longitudinal field can be uniformly applied within a plane which is parallel to the substrate plane, thus making it easier to vertically align the anisotropically-shaped particles 32.

INDUSTRIAL APPLICABILITY

According to an embodiment of the present invention, there is provided an optical device which is capable of active matrix driving, excels in low power consumption characteristics, and realizes a high efficiency of light utilization and a high contrast ratio. An optical device according to an embodiment of the present invention is suitably used as a display panel of a display device. Moreover, an optical device according to an embodiment of the present invention is also usable as various optical devices (e.g., optical switches) other than display panels.

REFERENCE SIGNS LIST 10 first substrate
10a substrate
11 first electrode
11a branch of first electrode
11b stem of first electrode
12 second electrode
12a branch of second electrode
12b stem of second electrode
12' connection electrode
14 optical absorption layer
15, 25 vertical alignment film
17A, 17B thin film transistor (TFT)
17a semiconductor layer
17d drain electrode
17g gate electrode
17s source electrode
20 second substrate
20a substrate
21 third electrode
30 optical layer (display medium layer)
31P, 31N medium (liquid crystal material)
31a, 31b liquid crystal molecule
32 anisotropically-shaped particles
40 power source
51 first switch
52 second switch
53 third switch
54 fourth switch
60 sealing portion
63, 65 transparent insulating layer
64 organic insulating layer
66 dielectric layer
71, 72 gate line
73 storage capacitor counter electrode
74 storage capacitor electrode
75, 76 storage capacitor line
78, 88 terminal portion
81, 82 source line
91 gate driver
92 source driver
100, 200, 300, 500 display panel (optical device)
110, 210, 210A, 310, 410, 510 display device

The invention claimed is:

1. An optical device comprising:
a first substrate and a second substrate opposing each other; and
an optical layer between the first substrate and the second substrate,
the first substrate including a first electrode and a second electrode, the first electrode and second electrode being capable of having respectively different potentials applied thereto,
the optical layer containing a medium and anisotropically-shaped particles dispersed in the medium, the anisotropically-shaped particles having shape anisotropy, wherein,
an alignment direction of the anisotropically-shaped particles changes in accordance with a direction of an electric field applied to the optical layer;

the medium is a liquid crystal material having a negative dielectric anisotropy;

when no electric field is applied to the optical layer, the anisotropically-shaped particles are aligned substantially vertically with respect to the substrate plane, and the second substrate includes no electrode opposing the first electrode or the second electrode.

2. The optical device of claim 1, wherein at least one of the first substrate and the second substrate includes a vertical alignment film provided on the optical layer side.

3. The optical device of claim 1, wherein, when a lateral field is generated in the optical layer by the first electrode and the second electrode, the anisotropically-shaped particles are aligned substantially in parallel to the substrate plane.

4. The optical device of claim 1, wherein the first substrate is an active matrix substrate including a thin film transistor.

5. The optical device of claim 4, wherein, the first substrate further includes a gate line and a source line which are electrically connected to the thin film transistor; and a voltage which is supplied from the source line to the thin film transistor is inverted in polarity with a predetermined cycle.

6. The optical device of claim 4, wherein the thin film transistor comprises an oxide semiconductor layer.

7. The optical device of claim 6, wherein the oxide semiconductor layer is made of an In—Ga—Zn—O-type semiconductor.

8. A display device comprising the optical device of claim 1.

9. The display device of claim 8 capable of displaying in a reflection mode by utilizing light which is incident from the exterior.

10. The display device of claim 9, wherein, the anisotropically-shaped particles are light reflective; and one of the first substrate and the second substrate that is located on a rear face side includes an optical absorption layer which absorbs light.

* * * * *